(12) United States Patent
Flinn et al.

(10) Patent No.: US 12,093,983 B2
(45) Date of Patent: *Sep. 17, 2024

(54) ADAPTIVE AND RECURSIVE SYSTEM AND METHOD

(71) Applicant: World Assets Consulting AG, LLC, Wilmington, DE (US)

(72) Inventors: Steven Dennis Flinn, Houston, TX (US); Naomi Felina Moneypenny, Houston, TX (US)

(73) Assignee: World Assets Consulting AG, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,825

(22) Filed: Jun. 8, 2023

(65) Prior Publication Data

US 2024/0046311 A1 Feb. 8, 2024

Related U.S. Application Data

(63) Continuation of application No. 14/226,190, filed on Mar. 26, 2014, now Pat. No. 11,715,132, which is a (Continued)

(51) Int. Cl.
| | |
|---|---|
| *G06Q 30/0251* | (2023.01) |
| *G06N 20/00* | (2019.01) |
| *G06Q 30/0241* | (2023.01) |

(52) U.S. Cl.
CPC ......... *G06Q 30/0269* (2013.01); *G06N 20/00* (2019.01); *G06Q 30/0255* (2013.01); *G06Q 30/0267* (2013.01); *G06Q 30/0277* (2013.01)

(58) Field of Classification Search
CPC .................................................. G06Q 30/0269
See application file for complete search history.

(56) References Cited

U.S. PATENT DOCUMENTS

| | | | |
|---|---|---|---|
| 5,099,426 A | 3/1992 | Carlgren | |
| 5,132,915 A | 7/1992 | Goodman | |

(Continued)

FOREIGN PATENT DOCUMENTS

| | | |
|---|---|---|
| EP | 1311980 A2 | 5/2003 |
| EP | 1397252 A1 | 3/2004 |

(Continued)

OTHER PUBLICATIONS

A quality preserving exact histogram specification, Ananaki, A.N .; Telecommunications, 2008. IST 2008. International Symposium on Digital Object Identifier: 10.1109/ISTEL.2008.4651409 Publication Year: 2008; pp. 798-803.

(Continued)

*Primary Examiner* — Mario C. Iosif
(74) *Attorney, Agent, or Firm* — Schwabe, Williamson & Wyatt, P.C.

(57) ABSTRACT

A system and method of advertising based on the automatic determination of an advertising recipient's location and inferences of preferences derived from usage behaviors is disclosed. The advertising recipient's location that is considered in delivering a specific advertisement may be the current location or one or more historical locations. Proximity considerations with regard to other people, locations, or physical objects may influence the advertisement that is to be delivered. The advertisement may be delivered to a mobile device that has location-aware capabilities such as a Global Positioning System-based system.

19 Claims, 45 Drawing Sheets

Related U.S. Application Data continuation of application No. 12/179,053, filed on Jul. 24, 2008, now abandoned, and a continuation of application No. 12/172,236, filed on Jul. 13, 2008, now abandoned, said application No. 12/179,053 is a continuation of application No. 11/419,563, filed on May 22, 2006, now Pat. No. 7,526,459, said application No. 12/172,236 is a continuation of application No. 11/419,563, filed on May 22, 2006, now Pat. No. 7,526,459, which is a continuation of application No. PCT/US2004/037176, filed on Nov. 4, 2004.

(60) Provisional application No. 60/525,120, filed on Nov. 28, 2003.

(56) References Cited

U.S. PATENT DOCUMENTS

| | | |
|---|---|---|
| 5,206,951 A | 4/1993 | Khoyi |
| 5,375,244 A | 12/1994 | McNair |
| 5,499,366 A | 3/1996 | Rosenberg |
| 5,600,835 A | 2/1997 | Garland |
| 5,706,497 A | 1/1998 | Takahashi |
| 5,754,939 A | 5/1998 | Herz |
| 5,788,504 A | 8/1998 | Rice |
| 5,790,426 A | 8/1998 | Robinson |
| 5,809,506 A | 9/1998 | Copeland |
| 5,812,691 A | 9/1998 | Udupa |
| 5,815,710 A | 9/1998 | Martin |
| 5,842,199 A | 11/1998 | Miller |
| 5,867,799 A | 2/1999 | Lang |
| 5,875,446 A | 2/1999 | Brown |
| 5,893,085 A | 4/1999 | Phillips |
| 5,899,992 A | 5/1999 | Lyer |
| 5,903,478 A | 5/1999 | Fintel |
| 5,907,846 A | 5/1999 | Berner |
| 5,918,014 A * | 6/1999 | Robinson .............. H04L 9/40 709/219 |
| 5,950,200 A | 9/1999 | Sudai |
| 5,963,965 A | 10/1999 | Vogel |
| 5,966,126 A | 10/1999 | Szabo |
| 5,974,415 A | 10/1999 | Schreiber |
| 5,983,214 A | 11/1999 | Lang |
| 5,987,415 A | 11/1999 | Breese |
| 5,999,942 A | 12/1999 | Talati |
| 6,012,070 A | 1/2000 | Cheng |
| 6,016,394 A | 1/2000 | Walker |
| 6,024,505 A | 2/2000 | Shinohara |
| 6,029,195 A | 2/2000 | Herz |
| 6,038,668 A | 3/2000 | Chipman |
| 6,041,311 A | 3/2000 | Chislenko |
| 6,049,799 A | 4/2000 | Mangat |
| 6,134,532 A | 10/2000 | Lazarus |
| 6,134,559 A | 10/2000 | Brumme |
| 6,154,723 A | 11/2000 | Cox |
| 6,173,261 B1 | 1/2001 | Arai |
| 6,195,657 B1 | 2/2001 | Rucker |
| 6,266,649 B1 | 7/2001 | Linden |
| 6,285,999 B1 | 9/2001 | Page |
| 6,308,175 B1 | 10/2001 | Lang |
| 6,314,420 B1 | 11/2001 | Lang |
| 6,321,221 B1 | 11/2001 | Bieganski |
| 6,326,946 B1 | 12/2001 | Moran |
| 6,374,290 B1 | 4/2002 | Scharber |
| 6,438,579 B1 | 8/2002 | Hosken |
| 6,466,918 B1 | 10/2002 | Spiegel |
| 6,468,210 B2 | 10/2002 | Lliff |
| 6,556,951 B1 | 4/2003 | Deleo |
| 6,571,279 B1 | 5/2003 | Herz |
| 6,611,822 B1 | 8/2003 | Beams |
| 6,647,257 B2 | 11/2003 | Owensby |
| 6,675,237 B1 | 1/2004 | Asaad |
| 6,721,706 B1 | 4/2004 | Strubbe |
| 6,757,691 B1 | 6/2004 | Welsh |
| 6,766,366 B1 | 7/2004 | Schäfer |
| 6,771,765 B1 | 8/2004 | Crowther |
| 6,775,664 B2 | 8/2004 | Lang |
| 6,795,826 B2 | 9/2004 | Flinn |
| 6,801,227 B2 | 10/2004 | Bocionek |
| 6,826,534 B1 | 11/2004 | Gupta |
| 6,834,195 B2 | 12/2004 | Bramndenberg |
| 6,845,374 B1 | 1/2005 | Oliver |
| 6,871,163 B2 | 3/2005 | Hiller |
| 6,873,967 B1 | 3/2005 | Kalagnanam |
| 6,904,408 B1 | 6/2005 | McCarthy |
| 6,912,505 B2 | 6/2005 | Linden |
| 6,922,672 B1 | 7/2005 | Hailpern |
| 6,934,748 B1 | 8/2005 | Louviere |
| 6,947,922 B1 | 9/2005 | Glance |
| 6,970,871 B1 | 11/2005 | Rayburn |
| 6,981,040 B1 | 12/2005 | Konig |
| 7,023,979 B1 | 4/2006 | Wu |
| 7,065,532 B2 | 6/2006 | Elder |
| 7,071,842 B1 | 7/2006 | Brady, Jr. |
| 7,073,129 B1 | 7/2006 | Robarts |
| 7,080,082 B2 | 7/2006 | Elder |
| 7,081,849 B2 | 7/2006 | Collins |
| 7,103,609 B2 | 9/2006 | Elder |
| 7,110,989 B2 | 9/2006 | Lemoto |
| 7,130,844 B2 | 10/2006 | Elder |
| 7,149,736 B2 | 12/2006 | Chkodrov |
| 7,162,508 B2 | 1/2007 | Messina |
| 7,167,844 B1 | 1/2007 | Leong |
| 7,188,153 B2 | 3/2007 | Lunt |
| 7,212,983 B2 | 5/2007 | Redmann |
| 7,231,419 B1 * | 6/2007 | Gheorghe .............. G06Q 30/02 707/999.01 |
| 7,272,586 B2 | 9/2007 | Nauck |
| 7,324,963 B1 | 1/2008 | Ruckart |
| 7,343,364 B2 | 3/2008 | Bram |
| 7,366,759 B2 | 4/2008 | Trevithick |
| 7,373,389 B2 | 5/2008 | Rosenbaum |
| 7,375,838 B2 | 5/2008 | Moneypenny |
| 7,401,121 B2 | 7/2008 | Wong |
| 7,403,901 B1 | 7/2008 | Carley |
| 7,433,876 B2 | 10/2008 | Spivack |
| 7,454,464 B2 | 11/2008 | Puthenkulam |
| 7,461,058 B1 | 12/2008 | Rauser |
| 7,467,212 B2 | 12/2008 | Adams |
| 7,493,294 B2 | 2/2009 | Flinn |
| 7,512,612 B1 | 3/2009 | Akella |
| 7,519,912 B2 | 4/2009 | Moody |
| 7,526,458 B2 | 4/2009 | Flinn |
| 7,526,459 B2 | 4/2009 | Flinn |
| 7,526,464 B2 | 4/2009 | Flinn |
| 7,539,652 B2 | 5/2009 | Flinn |
| 7,558,748 B2 | 7/2009 | Ehring |
| 7,567,916 B1 | 7/2009 | Koeppel |
| 7,568,148 B1 | 7/2009 | Bharat |
| 7,571,183 B2 | 8/2009 | Renshaw |
| 7,596,597 B2 | 9/2009 | Liu |
| 7,606,772 B2 | 10/2009 | Flinn |
| 7,630,986 B1 | 12/2009 | Herz |
| 7,676,034 B1 | 3/2010 | Wu |
| 7,680,770 B1 | 3/2010 | Buyukkokten |
| 7,739,231 B2 | 6/2010 | Flinn |
| 7,818,392 B1 | 10/2010 | Martino |
| 7,831,535 B2 | 11/2010 | Flinn |
| 7,860,811 B2 | 12/2010 | Flinn |
| 7,890,871 B2 | 2/2011 | Etkin |
| 7,904,341 B2 | 3/2011 | Flinn |
| 7,904,511 B2 | 3/2011 | Ryan |
| 7,921,036 B1 | 4/2011 | Sharma |
| 7,958,457 B1 | 6/2011 | Brandenberg |
| 7,966,224 B1 | 6/2011 | Wagner |
| 7,979,880 B2 | 7/2011 | Hosea |
| 8,001,008 B2 | 8/2011 | Engle |
| 8,010,458 B2 | 8/2011 | Galbreath |
| 8,015,119 B2 | 9/2011 | Buyukkokten |
| 8,046,797 B2 | 10/2011 | Bentolila |
| 8,060,462 B2 | 11/2011 | Flinn |
| 8,060,463 B1 | 11/2011 | Spiegel |
| 8,065,383 B2 | 11/2011 | Carlson |
| 8,069,076 B2 | 11/2011 | Oddo |

(56) References Cited

U.S. PATENT DOCUMENTS

| | | | |
|---|---|---|---|
| 8,108,245 | B1 | 1/2012 | Hosea |
| 8,224,756 | B2 | 7/2012 | Roberts |
| RE43,768 | E | 10/2012 | Flinn |
| 8,302,127 | B2 | 10/2012 | Klarfeld |
| 8,373,741 | B2 | 2/2013 | Roberts |
| 8,380,579 | B2 | 6/2013 | Flinn |
| 8,458,120 | B2 | 6/2013 | Flinn |
| 8,478,716 | B2 | 7/2013 | Flinn |
| 8,495,679 | B2 | 7/2013 | Labeeb |
| 8,495,680 | B2 | 7/2013 | Bentolila |
| 8,515,900 | B2 | 8/2013 | Flinn |
| 8,515,901 | B2 | 8/2013 | Flinn |
| RE44,559 | E | 10/2013 | Flinn |
| 8,566,263 | B2 | 10/2013 | Flinn |
| 8,600,920 | B2 | 12/2013 | Flinn |
| 8,600,926 | B2 | 12/2013 | Flinn |
| 8,615,484 | B2 | 12/2013 | Flinn |
| 8,645,292 | B2 | 2/2014 | Flinn |
| 8,645,312 | B2 | 2/2014 | Flinn |
| RE44,966 | E | 6/2014 | Flinn |
| RE44,967 | E | 6/2014 | Flinn |
| RE44,968 | E | 6/2014 | Flinn |
| 8,938,758 | B2 | 1/2015 | Klarfeld |
| RE45,770 | E | 10/2015 | Flinn |
| 9,781,478 | B2 | 10/2017 | Klarfeld |
| 11,715,132 | B2 * | 8/2023 | Flinn ............... G06Q 30/0255 705/14.66 |
| 2001/0047290 | A1 | 11/2001 | Petras |
| 2001/0047358 | A1* | 11/2001 | Flinn ............... H04L 41/22 |
| 2001/0049623 | A1 | 12/2001 | Aggarwal |
| 2002/0016786 | A1 | 2/2002 | Pitkow |
| 2002/0032564 | A1 | 3/2002 | Ehsani |
| 2002/0049617 | A1 | 4/2002 | Lencki |
| 2002/0049738 | A1 | 4/2002 | Epstein |
| 2002/0052873 | A1 | 5/2002 | Delgado |
| 2002/0062368 | A1 | 5/2002 | Holtzman |
| 2002/0065721 | A1 | 5/2002 | Lema |
| 2002/0069102 | A1 | 6/2002 | Vellante |
| 2002/0093537 | A1 | 7/2002 | Bocionek |
| 2002/0099812 | A1 | 7/2002 | Davis |
| 2002/0161664 | A1 | 8/2002 | Shaya |
| 2002/0178257 | A1 | 11/2002 | Cerrato |
| 2002/0180805 | A1 | 12/2002 | Checkering |
| 2002/0186133 | A1* | 12/2002 | Loof ............... G06Q 30/06 340/5.2 |
| 2002/0194161 | A1 | 12/2002 | McNamee |
| 2003/0023427 | A1 | 1/2003 | Cassin |
| 2003/0028498 | A1 | 2/2003 | Hayes-Roth |
| 2003/0050977 | A1* | 3/2003 | Puthenkulam ...... H04W 76/10 709/204 |
| 2003/0055666 | A1 | 3/2003 | Roddy |
| 2003/0101449 | A1 | 5/2003 | Bentolila |
| 2003/0101451 | A1 | 5/2003 | Bentolila |
| 2003/0105682 | A1 | 6/2003 | Dicker |
| 2003/0126600 | A1* | 7/2003 | Heuvelman ........ H04N 21/4333 725/35 |
| 2003/0154126 | A1 | 8/2003 | Geholt |
| 2003/0216960 | A1 | 11/2003 | Postrel |
| 2003/0225550 | A1 | 12/2003 | Hiller |
| 2003/0229896 | A1 | 12/2003 | Buczak |
| 2003/0233374 | A1 | 12/2003 | Spinola |
| 2004/0068552 | A1 | 4/2004 | Kotz |
| 2004/0107125 | A1 | 6/2004 | Guheen |
| 2004/0122803 | A1 | 6/2004 | Dom |
| 2004/0148275 | A1 | 7/2004 | Achlioptas |
| 2004/0186776 | A1 | 9/2004 | Llach |
| 2005/0033657 | A1 | 2/2005 | Herrington |
| 2005/0091245 | A1 | 4/2005 | Chickering |
| 2005/0197922 | A1 | 5/2005 | Horowitz |
| 2005/0267973 | A1 | 12/2005 | Carlson |
| 2006/0004680 | A1 | 1/2006 | Robarts |
| 2006/0036476 | A1 | 2/2006 | Kelm |
| 2006/0041548 | A1 | 2/2006 | Parsons |
| 2006/0042483 | A1 | 3/2006 | Work |
| 2006/0069749 | A1* | 3/2006 | Herz ............... G06Q 30/02 709/219 |
| 2006/0092074 | A1 | 5/2006 | Collins |
| 2006/0112098 | A1 | 5/2006 | Renshaw |
| 2006/0136589 | A1 | 6/2006 | Konig |
| 2006/0143214 | A1 | 6/2006 | Teicher |
| 2006/0184482 | A1 | 8/2006 | Flinn |
| 2006/0200432 | A1 | 9/2006 | Flinn |
| 2006/0200433 | A1 | 9/2006 | Flinn |
| 2006/0200434 | A1 | 9/2006 | Flinn |
| 2006/0200435 | A1 | 9/2006 | Flinn |
| 2006/0230021 | A1 | 10/2006 | Diab |
| 2007/0150470 | A1 | 6/2007 | Brave |
| 2007/0156614 | A1 | 7/2007 | Flinn |
| 2007/0174220 | A1 | 7/2007 | Flinn |
| 2007/0203872 | A1 | 8/2007 | Flinn |
| 2007/0208729 | A1 | 9/2007 | Martino |
| 2007/0250653 | A1 | 10/2007 | Jones |
| 2007/0287473 | A1 | 12/2007 | Dupray |
| 2008/0097821 | A1 | 4/2008 | Chickering |
| 2008/0104624 | A1 | 5/2008 | Narasinham |
| 2008/0172461 | A1 | 7/2008 | Thattai |
| 2008/0249967 | A1 | 10/2008 | Flinn |
| 2008/0249968 | A1 | 11/2008 | Flinn |
| 2009/0018918 | A1 | 1/2009 | Moneypenny |
| 2009/0144075 | A1 | 6/2009 | Flinn |
| 2009/0307182 | A1 | 12/2009 | Eytchison |
| 2011/0153452 | A1 | 6/2011 | Flinn |
| 2014/0207582 | A1 | 7/2014 | Flinn |

FOREIGN PATENT DOCUMENTS

| | | | |
|---|---|---|---|
| EP | 1630700 | A1 | 3/2006 |
| EP | 1630701 | A1 | 3/2006 |
| WO | 1998/058473 | A2 | 12/1998 |
| WO | 2000/014625 | A1 | 3/2000 |
| WO | 2000/075798 | A1 | 12/2000 |
| WO | 2001/093112 | A2 | 12/2001 |
| WO | 2002/094566 | A1 | 11/2002 |
| WO | 2005/052738 | A2 | 6/2005 |
| WO | 2005/054982 | A2 | 6/2005 |
| WO | 2005/103983 | A2 | 11/2005 |
| WO | 2005/116852 | A2 | 12/2005 |

OTHER PUBLICATIONS

Adopting user profiles and behavior patterns in a Web-TV recommendation system Kuan-Chung Chen; Wei-Guang Teng; Consumer Electronics; 2009; ISCE '09; IEEE 13th International Symposium on May 25-28, 2009; pp. 320-324; Digital Object Identifier 10.1109/ISCE.2009.5157045.

Aguilera, M., et al., Matching Events in a Content-based Subscription System (1999) In PODS'99; Atlanta, GA; pp. 53-61.

Applying similarity metrics to 3D acquisition in structured-light systems Jay, G.T.; Smith, R; Pattern Recognition; 2008. ICPR 2008. 19th International Conference on Digital Object Identifier: 10.1109/ICPR.2008.4761305 Publication Year: 2008; pp. 1-4.

Automatic 3D face verification from range data, Gange Pan; Zhaohui Wu; Yunhe Pan; Multimedia and Expo, 2003. ICME '03. Proceedings. 2003 International Conference on vol. 3 Digital Object Identifier: 10.1109/ICME.2003.1221266 Publication Year: 2003; pp. 111-133; col. 3.

Babowal, D., et al.: From information to knowledge: introducing WebStract's knowledge engineering approach, Electrical and Computer Engineering; 1999 IEEE Canadian Conference on Edmonton, Alta, Canada; May 9-12, 1999, Piscataway, NJ, USA; IEEE; pp. 1525-1530; XP010359717; ISBN: 078035579-2.

Barra, Maria, et al.; Common Web Paths in a Group Adaptive System; 2003 Proceedings of the Fourteenth ACM Conference on Hypertext and Hypermedia; 2003; 2 pages.

Bilgic, Mustafa, et al.; Explaining Recommendations: Satisfaction vs. Promotion; Jan. 9, 2005; pp. 1-6.

Bollen, Johan; "Group User Models for Personalized Hyperlink Recommendations"; 1892 Lecture Notes in Computer Science; 2000; pp. 38-50.

(56) References Cited

OTHER PUBLICATIONS

Boughanem, M. et al.; "Query modification based on relevance back-propagation in an ad hoc environment"; Information Processing & Management, Elsevier, Barking, GB; vol. 35, No. 2; Mar. 1999; pp. 121-139; XP004164720 ISSN: 0306-4573.

Cheung et al., "Mining customer product ratings for personalized marketing" Decision Support Systems; 2003; pp. 231-243.

Cooper, J.W., et al.; "Lexical navigation: visually prompted query expansion and refineement"; ACM 0-89791-868-1; Jul. 1997; XP002265696.

Cowie, R., et al.; "Emotion Recognition in Human-Computer Interaction"; IEEE Signal Processing Magazine; pp. 32-80; 2001.

Dieberger, A., et al.; "Social Navigation: Techniques for Building More Useable Systems"; Interactions; 2000; pp. 36-45.

Doulamis, N.D., et al.; "A neural network approach to interactive content-based retrieval of video databases"; Image Processing; 1999. ICIP 99. Proceedings. 1999 International Confrerence On Kobe, Japan; Oct. 24-28, 1999; Piscataway, NJ, USA, IEEE; vol. 2, Oct. 24, 1999; pp. 116-120; XP010369099; ISBN: 0-7803-5467-2.

Fisher et al., Accurate retail testing of fashion merchandise: Methodology and application. Fisher, Marshall; Kumar Rajaram. Marketing Science 19.3 (Summer 2000)' pp. 266-278.

Frey and Dueck; "Clustering by Passing Messages Between Data Points"; Science, Feb. 16, 2007; pp. 972-976, vol. 315; AAAS, USA.

Frey and Dueck; Supporting Online Material for "Clustering by Passing Messages Between Data Points"; Science Express; Jan. 11, 2007; AAAS, USA.

Frey, et al., "Mixture Modeling by Affinity Propagation"; Neural Information Processing Systems 18; Jan. 2006; pp. 379-386.

Guoqing Chen, et al., Extending ER/EER concepts towards fuzzy conceptual data modeling; Fuzzy Systems Proceedings; 1998. IEEE World Congress on Computational Intelligence; The 1998 IEEE International Conference on Anchorage, AK, US; May 4-9, 1998; New York, USA; IEEE; pp. 1320-1325; XP010287458; ISBN: 0-7803-4863-X; Section 4.

Helmy, Tarek, et al.; "Adaptive Expoloiting User Profile and Interpretation Policy for Seraching and Browsing the Web on Kodama System"; Graduate School of Information Science and Electrical Engineering; Kyushu University; 2000; 5 pages.

Herlocker, Jonathan L., et al.; Explaining Collaborative Filtering Recommendations; Dec. 2000; pp. 1-6.

Hsieh-Chang Tu et al.; An architecture and category knowledge for intelligent information retrieval agents; System Sciene; 1998; Proceedings of the Thirty-First Hawaii International Conference on Kohala Coast, HI, USA; Jan. 6-9, 1998; Los Alamitos, CA, USA; IEEE Comput. Soc., US; pp. 405-414; XP010263101.

Implicit Social Network Model for Predicting and Tracking the Location of Faults Ing-Xiang Chen; Cheng-Zen Yang; Ting-Kun Lu; Jaygark, H.; Computer Software and Applications; 2008; COMPSAC '08. 32nd Annual IEEE International Jul. 28, 2008-Aug. 1, 2008; pp. 136-143; Digital Ibject Identifier 10.1109/COMPSAC; 2008.162.

Improving cooperation in peer-to-peer systems using social networks; Wenyu Wang; Lu Zhao; Ruixi Yuan; Parallel and Distributed Processing Symposium; 2006. IPDPS 2006. 20th International Apr. 25-29, 2006; p. 8; Digital Object Identifier 10.1109/IPDPS. 2006. 1639703.

Improving the Readability of Clustered Social Network using Node Duplicatio Henr, N; Bezerianos, A.; Fekete, J-D; Visualization and Computer Garphics, IEEEE Transaction s on vol. 14, Isssue 6, Nov-Dec. 2008; pp. 13-17-1324; Digital Object Identifier 1031109/TVGG, 2008.141.

Intelligent social network modeling and analysis Yager, R.R.; Intelligent System and Knowledge Engineering; 2008. ISKE 2008. 3rd International Conference on vol. 1, Nov. 17-19, 2008; pp. 5-6 Digital Object Identifier 10.1109/ISKE.2008.4730886.

International Preliminary Examination Report for PCT/US2001/007990; mailed Jan. 22, 2007.

International Search Report and Written Opinion for PCT/US2005/011951; mailed Jun. 20, 2008.

International Search Report for PCT/US2001/007990; mailed Nov. 26, 2002 4 pages.

International Search Report for PCT/US2002/0016208; mailed Aug. 28, 2002.

Jain, Ajay; Let's Connect—Using LinkedIn to get ahead at work; 2006; 3 pages.

Kazienko, Przemyslaw, et al.; Recommenation Framework for Online Social Networks; 2006; pp. 111-120.

Kim, Jinmook, et al.; "Using Implicit Feedback for User Modeling in Internet and Internet Searching"; College Park: College of Library and Information Services, University of Maryland; 2000.

Lagoze, C.; "The Warwick Framework: A Container Architecture for Diverse sets of Metadata"; DLIB Magazine, Corporation for National Research Initiatives, Reston, VA, US; Jul./Aug. 1996; XP002086110; ISSN: 1082-9873.

LinkedIn Blog; Learn more about "People you may know"; Apr. 11, 2008; 18 pages.

LinkedIn Blog; LinkedIn Groups You Might Like (Late); Sep. 26, 2008; 4 pages.

LinkedIn Blog; News Recommendation and Discovery Improvements (Late); Jun. 26, 2008; 6 pages.

LinkedIn Blog; Viewers of this Profile Also Viewed; Jan. 23, 2008; 8 pages.

Liu, Hugo, et al.; Interest Map-Harvesting Social Network Profiles for Recommendations; Jan. 2005; 6 pages.

Lukose, R., et al., Shock: Communicating with Computational Messages and Automatic Private Profiles; May 20-24, 2003; Budapest, Hungary; [pp. 291-300, 10 pages].

Mezard; "Where are they Exemplars?"; Sciene; Feb. 16, 2007; pp. 949-951; vol. 315; AAAS, USA.

Mining User's Interest from Reading Behavior in E-learning System, Yongquan Liang; Zhongying Zhao; Qingtian Zeng; Software Engineering, Artificial Intelligence, Networking, and Parallel/Distributed Computing, 2007. SNPD 2007. Eighth ACIS International Conference on vol. 2 Digital Object Identifier: 10.1109/SNPD. 2007.330 pp. 417-422.

Hell, Anne P.; MySpace to Debut "People You May Know" Feature; Oct. 27, 2008; 2 pages.

Mobasher, Bamshad, et al.; "Creating Adaptive Web Sites Through Usage-Based Clustering of URLs"; 1999 Workshop on Knowledge and Dataa Engineering Exchange; pp. 19-25.

Niu, Nan; "Understanding Web Usage for Dynamic Web-Site Adaptation: A Case Study"; 2002 Proceedings of the Fourth International Workshop on Web Site Evolution; 10 pages.

Orkut Blog, Finding friends made easy with Orkut friend suggestions; Sep. 8, 2009; 2 pages.

PCT International Search Report and Written Opinion for PCT/US2004/037176; Mar. 27, 2006.

PCT International Search Report Opinion for PCT/US2004/037176; May 29, 2006.

Perkowitz, Mike; Etzioni, Oren "Towards adaptive Websites: conceptual framework and case study" Computer Networks 31; 1999; pp. 1245-1258; XP4304552; PII:S1389-1286 (99) 00017-1.

Picard, Rosalind W. & Klein, Jonathan; "Computers that Recognize and Respond to User Emotion: Theoretical and Practical Implictions"; MIT Media Lab Tech Report; p. 538; 2001.

Pierrakos et al.; Web Usage Mining as a Tool for Personalization: A Survey; published in User Modeling and User-Adapted Interaction vol. 13; pp. 311-372; 2003; DOI: 10.1023/A:1026238916441; posted at https://www.researchgate.net/publication/220116345 (63 pages).

Pleasure and Pain blog; People You May Know; Mar. 30, 2008; pp. 1-14.

PR Newswire, Planet All Plans to Make a World of Difference in Busy Lives; Nov. 14, 1996; pp. 43-45.

Prithviraj Dasgupta, P. Michael Melliar-Smith; Dynamic Consumer Profiling and Tiered Pricing Using Software Agents; Electronic Commerce Research; Boston; Jul.-Oct. 2003, vol. 3, Issue 3-4; p. 277; downloaded from Pro-Quest Direct.

Reddy, Mike & Fletcher, Graham; "An Adaptive Mechanism for Web Browser Cache Management"; IEEE Internet Computing; pp. 78-81; Jan.-Feb. 1998.

(56) References Cited

OTHER PUBLICATIONS

Schubert, Petra et al.; "Collaboration Platforms for Virtual Student Communities"; IEEE 2002; 10 Pages.
Shahabi, Cyrus & Chen, Yi-Shin; "An Adaptive Recommendation System without Explicit Acquisition of User Relevance Feedback"; 14 Distributed and Parallel Databases; pp. 173-192; 2003.
Situation-Aware Adaptive Recommendation to Assist Mobile Users in a Campus Environment Bouzeghoub, A.; Kien Ngoc Do; Wives, L.K.; Advanced Information Networking and Applications; 2009, AINA '09. International Conference on May 26-29, 2009; pp. 503-509; Digital Ibject Identified 10.1109/AINA.2009.120.
Spertus, Ellen, et al.; Evaluating Similarity Measures: A Large-Scale Study in the Orkut Social Network; Aug. 21-24, 2005; pp. 678-684.
Stolowitz Ford Cowger LLP Listing of Related Cases Dec. 5, 2011.
Stolowitz Ford Cowger LLP Listing of Related Cases Jan. 21, 2012.
Stolowitz Ford Cowger LLP Listing of Related Cases Oct. 25, 2011.
Stolowitz Ford Cowger LLP Listing of Related Cases; Feb. 29, 2012; 2 pages.
Stolowitz Ford Cowger LLP Listing of Related Cases; Jun. 4, 2912; 2 pages.
Stolowitz Ford Cowger LLP, Listing of Related Cases; Aug. 22, 2011.
Stolowitz Ford Cowger LLP, Listing of Related Cases; Aug. 25, 2011.
Stolowitz Ford Cowger LLP, Listing of Related Cases; Jun. 20, 2011.
Stolowitz Ford Cowger LLP, Portland, OR Listing of Related Cases; Mar. 18, 2014; 2 pages.
Schwabe, Williamson & Wyatt, PC Listing of Related Cases; Jan. 28, 2016; 2 pages.
Terry et al., "Social Net: Using Patterns of Physical Proximity Over Time to Infer Shared Interests"; 2002.
Tinatrev, Nava et al.; "A Survey of Explanations in Recommender Systems"; IEEE: 2007 IEEE 23rd International Conference on Data Engineering Workshop; Aberdeen Scotland; pp. 801-810.
Tintarev, Nava; "Explanations of Recommendations"; ACM 2007; Conference on Recommender Systems; Scotland; pp. 203-206.
Towards a Model for Inferring Trust in Heterogeneous Social Networks Akhoondi, M.; Habibi, J.; Sayyadi, M.; Modeling & Simulation; 2008. AICMS '08. Second Asia International Conference on May 13-15, 2008; pp. 52-58; Digital Ibject Identifier 10.1109/AMS. 2008.167.
Vander Veer, Facebook—The Missing Manual; O'Reilly Media, Inc.; Canada; 2008; pp. 105-109.
Vlachakis, Joannis, et al.; "IKUM: An Integrated Web Personalization Platform Based on Content Structures and Usage Behavior"; 2000; 7 pages.
Wiesner, S. et al.; "SemaLink: an approach for semantic browsing through large distributed document spaces"; Digital Libraries; 1996 ADL '96; Proceedings of the Third Forum on Research and Technology Advacnes in Washington, DC; USA May 13-15, 1996; Los Alamitos, Ca; USA IEEE Comput. Soc., US; pp. 86-94; XP010164913; ISBM: 0-8186-7402-4.
Yan-Wen Wu; Qi Luo; Min Liu; Zheng-Hong Wu; Li-Yong Wan; Research on Personalized Service System in E-Supermarket by Using Adaptive Recommendation Algorithm; Machine Learning and Cybernetics; 2006 International Conference Aug. 13-16, 2006; pp. 4507-4510; Digital Object Identifier 10.1109/ICMLC.2006.259167.
M Liu; Zhi Yang; Xiayu Deng; Jiajun Bu; Chun Chen; Media Browsing for Mobile Devices Based on Resolution Adaptive Recommendation; Communications and Mobile Computing; CMC '09; WRI International Conference on vol. 3; Jan. 6-8, 2009; pp. 285-290; Digital Object Identifier 10.1109/CMC.2009.124.
Zaiane, Osmar R.; "Building a Recommender Agent for e-Learning Systems"; Proceedings of the International Conference on Computers in Education; 2002; 5 pages.
Su, Xiaoyuan, et al.; "A Survey of Collaborative Filtering Techniques"; Advances in Artificial Intelligence vol. 2009, Article ID 421425; Aug. 3, 2009; 20 pages.
Ungar and Foster, Clustering Methods for Collaborative Filtering, AAAI Technical Report WS-98-08, 1998, p. 114-129 [retrieved from https://www.aaai.org/Papers/Workshops/1998/WS-98-08/WS98-08-029.pdf on Oct. 7, 2020)].
Sarwar et al, Item-Based Collaborative Filtering Recommendation Algorithms, WWW10, May 1-5, 2001, Hong Kong, ACM 1-58113-348-0/01/0005, pp. 285-295 [retrieved from http://www.ra.ethz.ch/cdstore/www10/papers/pdf/p519.pdf on Oct. 7, 2020].

\* cited by examiner

Fractional Degrees of Separation
(Scaling Factor = 0.5)

Network Subset
(Node X + 2 degrees of separation)

Network Subset
(Node X + 2.5 FREES)

FREES Structure of Extended Fuzzy Objects

ADAPTIVE AND RECURSIVE SYSTEM AND METHOD

CROSS-REFERENCE TO RELATED APPLICATIONS

This application is a continuation of and claims priority to pending U.S. patent application Ser. No. 14/226,190, filed Mar. 26, 2014, which is a continuation of U.S. patent application Ser. No. 12/172,236, filed Jul. 13, 2008 and pending U.S. patent application Ser. No. 12/179,053, filed Jul. 24, 2008, both of which are continuations of and claim priority to U.S. patent application Ser. No. 11/419,563 filed on May 22, 2006, now issued as U.S. Pat. No. 7,526,459, which is a continuation of and claims priority under 35 U.S.C. § 120 to PCT International Application PCT/US2004/037176, filed Nov. 4, 2004, which claims priority under 35 U.S.C. § 119(e) to U.S. Provisional Patent Application 60/525,120, filed Nov. 28, 2003, all of which are incorporated by reference in their entirety herein.

FIELD OF THE INVENTION

This invention relates to software programs that adapt according to their use over time, and that may be distributed and recombined as a whole or in part across one or more computer systems.

BACKGROUND OF THE INVENTION

Current general purpose computer-based information management approaches include flat files, hypertext models (e.g., World Wide Web), and relational database management systems (RDBMS). A fundamental problem with all of these approaches is "brittleness"—they have limited inherent ability to adapt to changing circumstances without direct human intervention. For the more robust of these information management approaches (e.g., relational database management system, or RDBMS), the human intervention may be somewhat reduced compared to that of less sophisticated approaches (e.g., flat files), but the need for direct, manual effort is certainly not eliminated.

Likewise, specific computer applications that are underpinned by the prior art information management approaches are generally very limited in their ability to adapt to changing circumstances and user requirements over time. In addition to prior art information management approaches and the computing applications built on them generally being too brittle, they also can be criticized for being monolithic—that is, it is generally not possible to dynamically separate subsets of a computing application and recombine them with other subsets of a plurality of computing applications to form new and useful applications. In other words, prior art computing systems and applications are very limited in their ability to usefully evolve without directed human programming or content management attention. This is a significant root cause of the well-known and well-discussed "software bottleneck."

SUMMARY OF INVENTION

An adaptive recombinant system is disclosed to address the problems of limited adaptation and extensibility associated with prior art computing applications by incorporating an information management and computing system paradigm that has built-in capabilities to facilitate adaptation to changing circumstances and user requirements and preferences. The adaptive recombinant system can track, store and make user preference and interest inferences from a broad array of system usage behaviors. These inferencing capabilities may be applied to not only assist system users in more effectively navigating the system, but may also be applied to modify system structure and content so as to embed adaptation directly within the system and content, thereby enabling the system to evolve to become ever more effective over time.

Furthermore, users of the system may themselves be represented or explicitly referenced within system content. Fundamentally, the adaptive recombinant system represents a computer-based systems architecture in which system users may be represented directly within the system content and structure, and the usage behaviors over time of the users may be embedded directly in the system structure. Thus, the adaptive recombinant system explicitly integrates the system, users of the system, and usage of the system in a way that extends beyond the less integrative, and more ad hoc approaches of prior art; thereby enabling a higher degree of computer-based system adaptiveness and extensibility. The adaptive recombinant system can complement current information management and computer application approaches to enable the resulting overall system to be more adaptive to individual and community user requirements.

In some embodiments, a network (where the term "network" is used as a term denoting a general system topology, not to be confused with specific application or use of the term, such as, for example, a "telecommunications network") system structure is employed to facilitate adequate structural plasticity to enable system adaptation, and to enable syndication and combinations of system subsets. The network-based system structure may furthermore be based on a fuzzy network or fuzzy content network architecture.

DETAILED DESCRIPTION

In accordance with the embodiments described herein, an adaptive system, an adaptive recombinant system, and methods for establishing the systems are disclosed. The adaptive system includes algorithms for tracking user interactions with a collection of system objects, and generates adaptive recommendations based on the usage behaviors associated with the system objects. The adaptive recommendations may be explicitly represented to the user or may be used to automatically update the collection of system objects and associated relationships. In either case, the collection of objects and associated relationships become more useful to the user over time.

The adaptive recombinant system, which includes the adaptive system, may further be syndicated to other computer applications, including other adaptive systems. The adaptive recombinant system may recombine and re-syndicate indefinitely. Both the adaptive system and the adaptive recombinant system may be based on a fuzzy network or a fuzzy content network structure.

The adaptive system may be implemented on a single computer or on multiple computers that are connected through a network, such as the Internet. The software and data storage associated with the adaptive system may reside on the single computer, or may be distributed across the multiple computers. The adaptive system may be implemented on stationary computers, on mobile computing devices, on processing units architected according to Von Neumann designs, or on those designed according to non-Von Neumann architectures. The adaptive system may integrate with existing types of computer software, such as computer operating systems, including mobile device operating systems and special purpose devices, such as television "set-top boxes," network operating systems, database software, application middleware, and application software, such as enterprise resource planning (ERP) applications, desktop productivity tools, Internet applications, and so on.

In the following description, numerous details are set forth to provide an understanding of the present invention. However, it will be understood by those skilled in the art that the present invention may be practiced without these details and that numerous variations or modifications from the described embodiments may be possible.

Adaptive System

Figure 1:
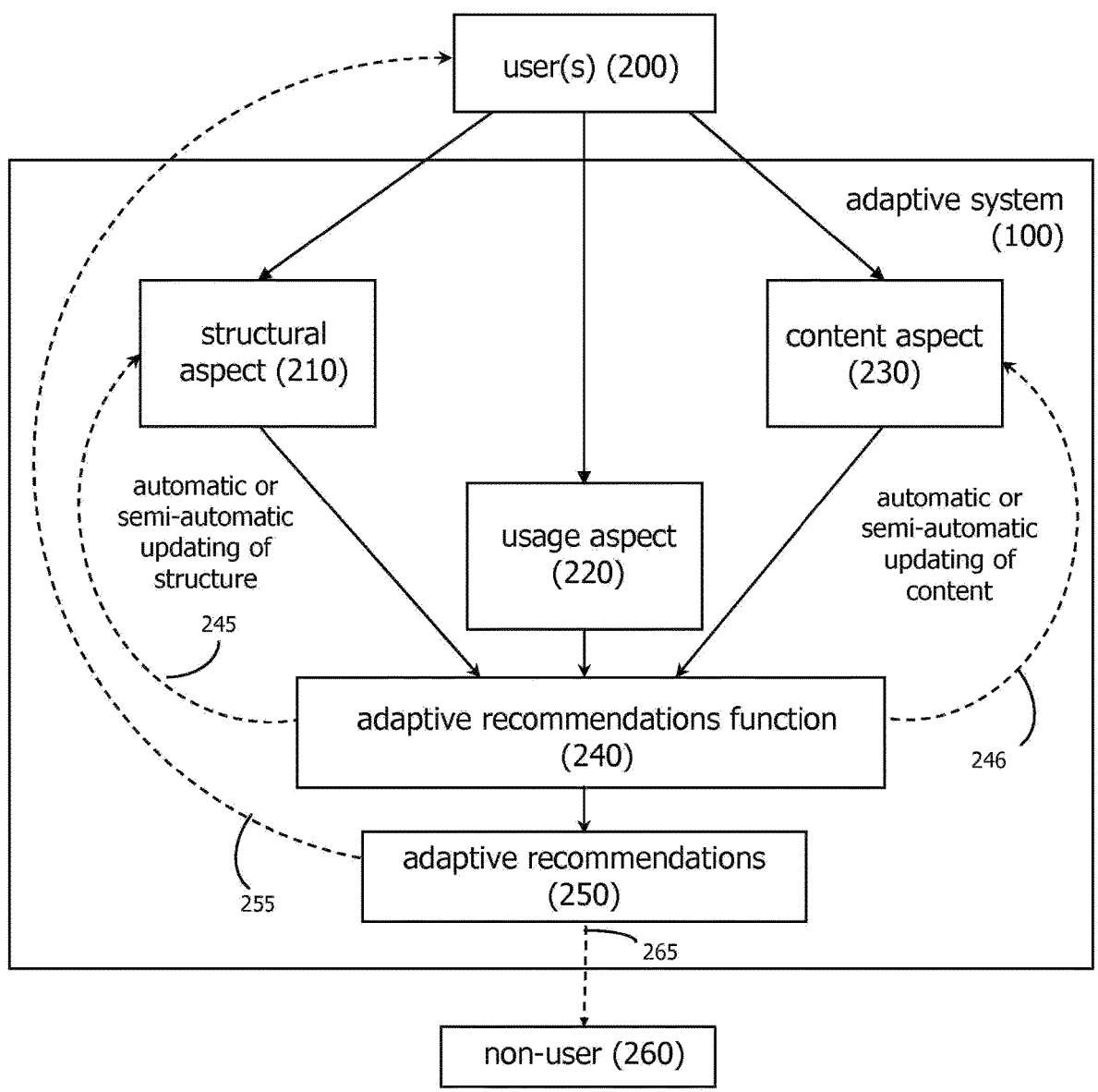
FIG. 1 is a block diagram of an adaptive system, according to some embodiments.

FIG. 1 is a generalized depiction of an adaptive system 100, according to some embodiments. The adaptive system 100 includes three aspects: 1) a structural aspect 210, a usage aspect 220, and a content aspect 230. One or more users 200 interact with the adaptive system 100. An adaptive recommendations function 240 may produce adaptive recommendations 250, based upon the user interactions that are either delivered to the user 200 or applied to the adaptive system 100.

As used herein, one or more users 200 may be a single user or multiple users. As shown in FIG. 1, the one or more users 200 may receive the adaptive recommendations 250. Non-users 260 of the adaptive system 100 may also receive adaptive recommendations 250 from the adaptive system 100.

A user 200 may be a human entity, a computer system, or a second adaptive system (distinct from the adaptive system 100) that interacts with, or otherwise uses the adaptive system. The one or more users 200 may include non-human users of the adaptive system 100. In particular, one or more other adaptive systems may serve as virtual system "users." These other adaptive systems may operate in accordance with the architecture of the adaptive system 100. Thus, multiple adaptive systems may be mutual users for one another.

Figure 2:
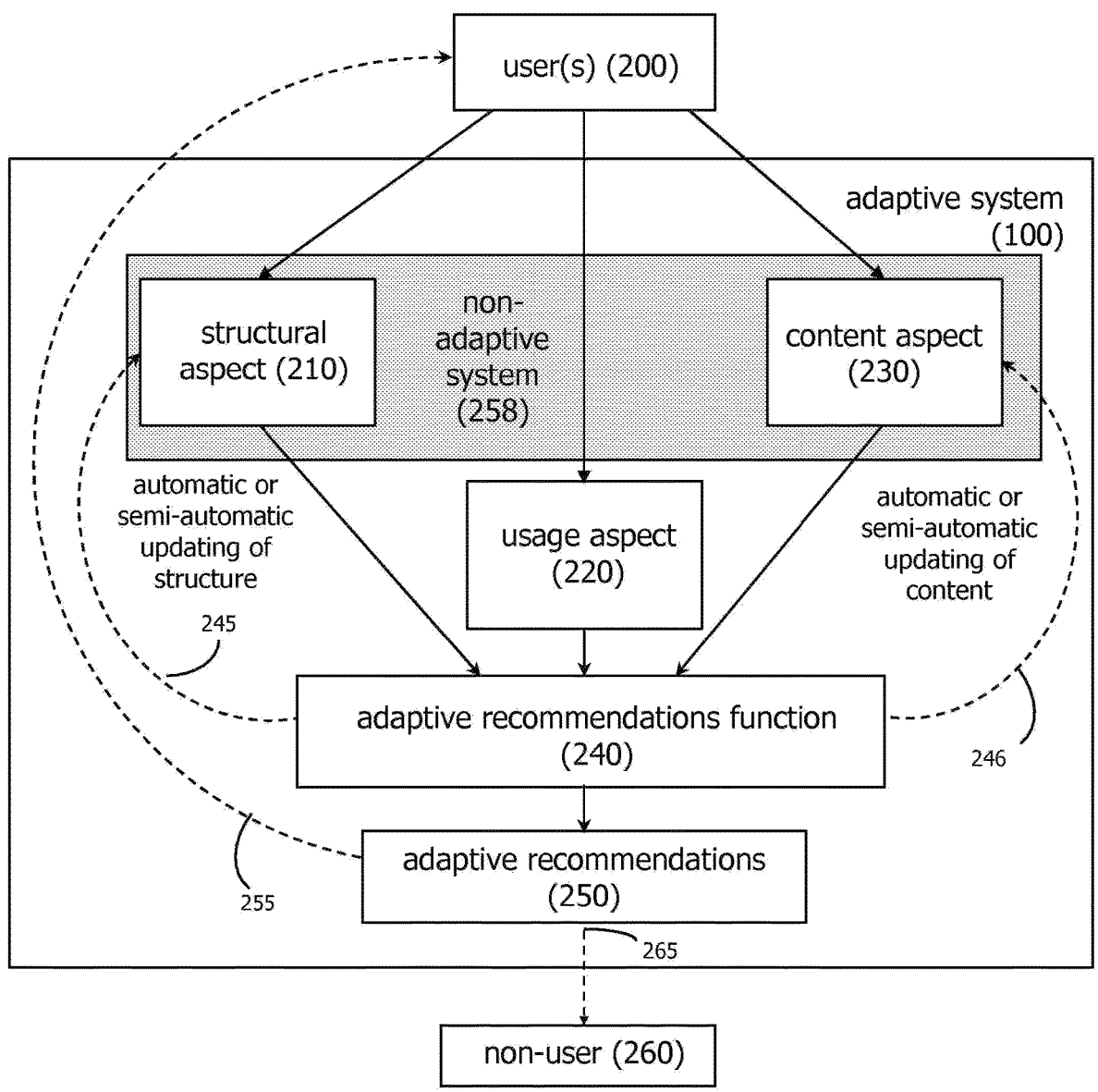
FIG. 2 is a block diagram contrasting the adaptive system of FIG. 1 with a non-adaptive system, according to some embodiments.

FIG. 2 distinguishes between the adaptive system 100 of FIG. 1 and a non-adaptive system, as used herein. A non-adaptive system 258 is a computer-based system including at least the structural aspect 210 and the content aspect 230, but without the usage aspect 220 and adaptive recommendations function 240. (These terms are defined with more specificity below.) The adaptive system 100 is a computer-based system including at least a structural aspect 210, a content aspect 230, a usage aspect 220, and an adaptive recommendations function 240.

It should be understood that the structural aspect 210, the content aspect 230, the usage aspect 220, and the recommendations function 240 of the adaptive system 100, and elements of each, may be contained within one computer, or distributed among multiple computers. Furthermore, one or more non-adaptive systems 258 may be modified to become one or more adaptive systems 100 by integrating the usage aspect 220 and the recommendations function 240 with the one or more non-adaptive systems 258.

The term "computer system" or the term "system," without further qualification, as used herein, will be understood to mean either a non-adaptive or an adaptive system. Likewise, the terms "system structure" or "system content," as used herein, will be understood to refer to the structural aspect 210 and the content aspect 230, respectively, whether associated with the non-adaptive system 258 or the adaptive system 100. The term "system structural subset" or "structural subset," as used herein, will be understood to mean a portion or subset of the structural aspect 210 of a system.

Structural Aspect

Figure 3A:
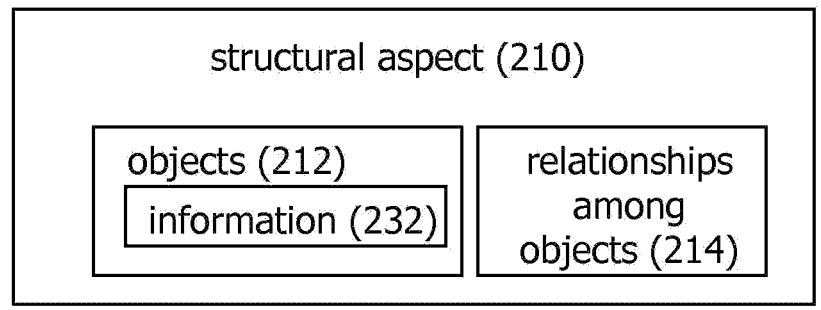
FIG. 3A is a block diagram of the structural aspect of the adaptive system of FIG. 1, according to some embodiments.
Figure 3B:
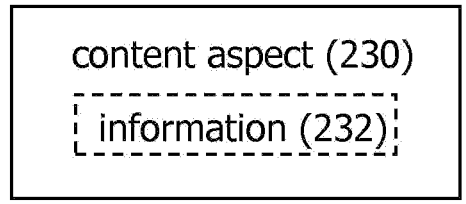
FIG. 3B is a block diagram of the content aspect of the adaptive system of FIG. 1, according to some embodiments.

The structural aspect 210 of the adaptive system 100 is depicted in the block diagram of FIG. 3A. The structural aspect 210 denotes a collection of system objects 212 that are part of the adaptive system 100, as well as the relationships among the objects 214. The relationships among objects 214 may be persistent across user sessions, or may be transient in nature. The objects 212 may include or reference items of content, such as text, graphics, audio, video, interactive content, or embody any other type or item of information. The objects 212 may also include references to content, such as pointers. Computer applications, executable code, or references to computer applications may also be stored as objects 212 in the adaptive system 100. The content of the objects 212 is known herein as information 232. The information 232, though part of the object 214, is also considered part of the content aspect 230, as depicted in FIG. 3B, and described below.

The objects 212 may be managed in a relational database, or may be maintained in structures such as flat files, linked lists, inverted lists, hypertext networks, or object-oriented databases. The objects 212 may include meta-information 234 associated with the information 232 contained within, or referenced by the objects 212.

As an example, in some embodiments, the World-wide Web could be considered a structural aspect, where web pages constitute the objects of the structural aspect and links between web pages constitute the relationships among the objects. Alternatively, or in addition, in some embodiments, the structural aspect could be comprised of objects associated with an object-oriented programming language, and the relationships between the objects associated with the protocols and methods associated with interaction and communication among the objects in accordance with the object-oriented programming language.

The one or more users 200 of the adaptive system 100 may be explicitly represented as objects 212 within the system 100, therefore becoming directly incorporated within the structural aspect 210. The relationships among objects 214 may be arranged in a hierarchical structure, a relational structure (e.g. according to a relational database structure), or according to a network structure.

Content Aspect

The content aspect 230 of the adaptive system 100 is depicted in the block diagram of FIG. 3B. The content aspect 230 denotes the information 232 contained in, or referenced by the objects 212 that are part of the structural aspect 210. The content aspect 230 of the objects 212 may include text, graphics, audio, video, and interactive forms of content, such as applets, tutorials, courses, demonstrations, modules, or sections of executable code or computer programs. The one or more users 200 interact with the content aspect 230.

The content aspect 230 may be updated based on the usage aspect 220, as well as associated metrics. To achieve this, the adaptive system 100 may employ the usage aspect of other systems. Such systems may include, but are not limited to, other computer systems, other networks, such as the World Wide Web, multiple computers within an organization, other adaptive systems, or other adaptive recombinant systems. In this manner, the content aspect 230 benefits from usage occurring in other environments.

Usage Aspect

Figure 3C:
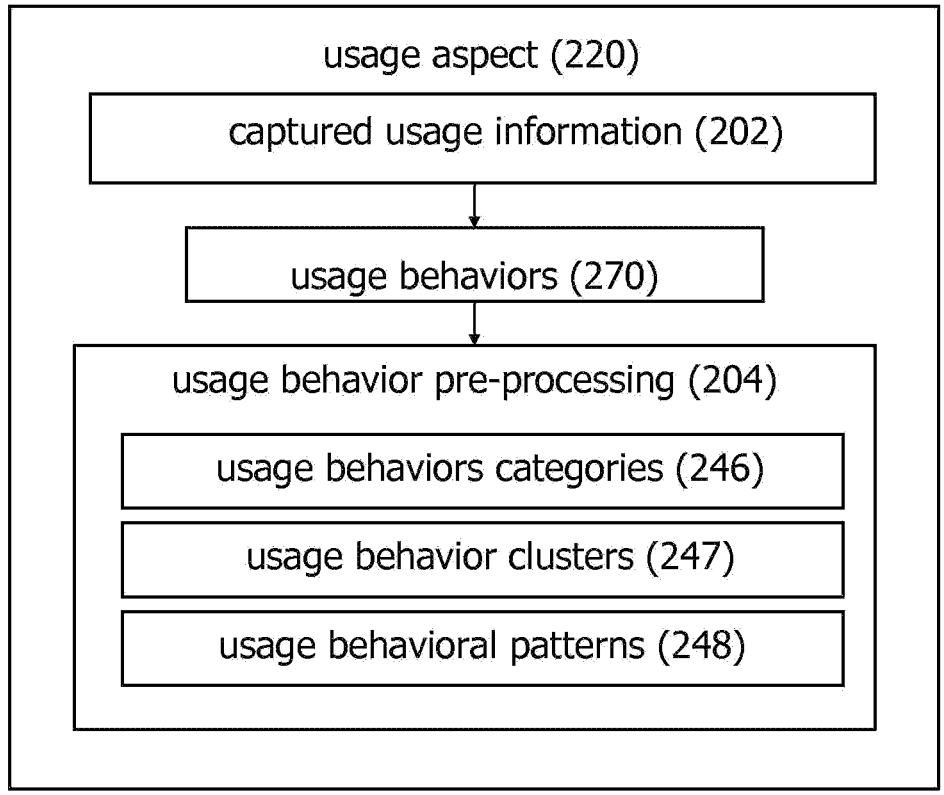
FIG. 3C is a block diagram of the usage aspect of the adaptive system of FIG. 1, according to some embodiments.

The usage aspect 220 of the adaptive system 100 is depicted in the block diagram of FIG. 3C. The usage aspect 220 denotes captured usage information 202, further identified as usage behaviors 270, and usage behavior pre-processing 204. The usage aspect 220 thus reflects the tracking, storing, categorization, and clustering of the use and associated usage behaviors of the one or more users 200 interacting with the adaptive system 100.

The captured usage information 202, known also as system usage or system use 202, includes any interaction by the one or more users 200 with the system. The adaptive system 100 tracks and stores user key strokes and mouse clicks, for example, as well as the time period in which these interactions occurred (e.g., timestamps), as captured usage information 202. From this captured usage information 202, the adaptive system 100 identifies usage behaviors 270 of the one or more users 200 (e.g., web page access or email transmission). Finally, the usage aspect 220 includes usage-behavior pre-processing, in which usage behavior categories 246, usage behavior clusters 247, and usage behavioral patterns 248 are formulated for subsequent processing of the usage behaviors 270 by the adaptive system 100. Some usage behaviors 270 identified by the adaptive system 100, as well as usage behavior categories 246 designated by the adaptive system 100, are listed in Table 1, and described in more detail, below.

The usage behavior categories 246, usage behaviors clusters 247, and usage behavior patterns 248 may be interpreted with respect to a single user 200, or to multiple users 200, in which the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 246 include types of usage behaviors 270, such as accesses, referrals to other users, collaboration with other users, and so on. These categories and more are included in Table 1, below. Usage behavior clusters 247 are groupings of one or more usage behaviors 270, either within a particular usage behavior category 246 or across two or more usage categories. The usage behavior pre-processing 204 may also determine new "clusterings" of user behaviors 270 in previously undefined usage behavior categories 246, across categories, or among new communities. Usage behavior patterns 248, also known as "usage behavioral patterns" or "behavioral patterns," are also groupings of usage behaviors 270 across usage behavior categories 246. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, or physical location of the user 200. The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering. Usage behaviors 270 may also be derived from the use or explicit preferences 252 associated with other adaptive or non-adaptive systems.

Adaptive Recommendations Function

Returning to FIG. 1, the adaptive system 100 includes an adaptive recommendations function 240, which interacts with the structural aspect 210, the usage aspect 220, and the content aspect 230. The adaptive recommendations function 240 generates adaptive recommendations 250 based on the integration and application of the structural aspect 210, the usage aspect 220, and, optionally, the content aspect 230.

The term "recommendations" associated with the adaptive recommendations function 240 is used broadly in the adaptive system 100. The adaptive recommendations 250 may be displayed to a recommendations recipient. As used herein, a recommendations recipient is an entity who receives the adaptive recommendations 250. Thus, the recommendations recipient may include the one or more users 200 of the adaptive system 100, as indicated by the dotted arrow 255 in FIG. 1, or a non-user 260 of the system (see dotted arrow 265). However, the adaptive recommendations 250 may also be used internally by the adaptive system 100 to update the structural aspect 210 (see dotted arrow 245). In this manner, the usage behavior 270 of the one or more users 200 may be influenced by the system structural alterations that are automatically or semi-automatically applied. Or, the adaptive recommendations 250 may be used by the adaptive system 100 to update the content aspect 230 (see dotted arrow 246).

Figure 5:
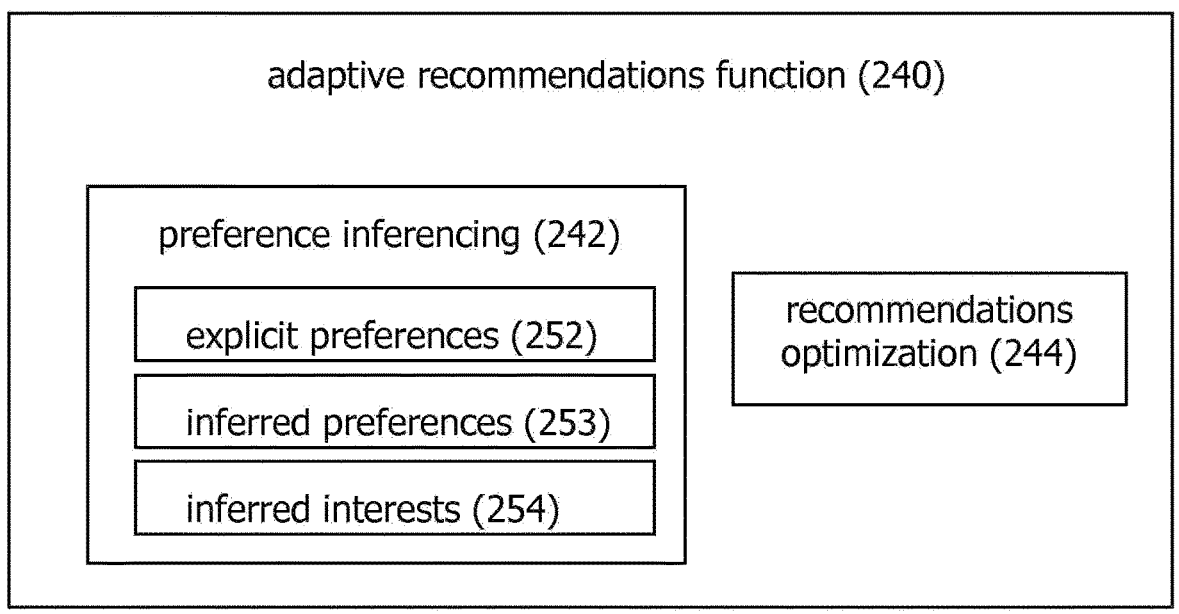
FIG. 5 is a block diagram of the adaptive recommendations function used by the adaptive system of FIG. 1, according to some embodiments.

FIG. 5 is a block diagram of the adaptive recommendations function 240 used by the adaptive system 100 of FIG. 1. The adaptive recommendations function 240 includes two algorithms, a preference inferencing algorithm 242 and a recommendations optimization algorithm 244. These algorithms (which actually many include many more than two algorithms) are used by the adaptive system 100 to generate adaptive recommendations 250.

Preferably, the adaptive system 100 identifies the preferences of the user 200 and adapts the adaptive system 100 in view of the preferences. Preferences describe the likes, tastes, partiality, and/or predilection of the user 200 that may be inferred during access of the objects 212 of the adaptive system 100. In general, user preferences exist consciously or sub-consciously within the mind of the user. Since the adaptive system 100 has no direct access to these preferences, they are generally inferred by the preference inferencing algorithm 242 of the adaptive recommendations function 240.

The preference inferencing algorithm 242, infers preferences based on information that may be obtained as the user 200 accesses the adaptive system 100. The preference inferencing algorithm and associated output 242 is also described herein generally as "preference inferencing" or "preference inferences" of the adaptive system 100. The preference inferencing algorithm 242 identifies three types of preferences: explicit preferences 252, inferred preferences 253, and inferred interests 254. Unless otherwise stated, the use of the term "preferences" herein is meant to include any or all of the elements 252, 253, and 254 depicted in FIG. 5.

As used herein, explicit preferences 252 describe explicit choices or designations made by the user 200 during use of the adaptive system 100. The explicit preferences 252 may be considered to more explicitly reveal preferences than inferences associated with other types of usage behaviors. A response to a survey is one example where explicit preferences 252 may be identified by the adaptive system 100.

Inferred preferences 253 describe preferences of the user 200 that are based on usage behavioral patterns 248. Inferred preferences 253 are derived from signals and cues made by the user 200. (The derivation of inferred preferences 253 by the adaptive system 100 is included in the description of FIG. 7, below.)

Inferred interests 254 describe interests of the user 200 that are based on usage behavioral patterns 248. In general, the adaptive recommendations 250 produced by the preference inferencing algorithm 242 combine inferences from overall user community behaviors and preferences, inferences from sub-community or expert behaviors and preferences, and inferences from personal user behaviors and preferences. As used herein, preferences (whether explicit 252 or inferred 253) are distinguishable from interests (254) in that preferences imply a ranking (e.g., object A is better than object B) while interests do not necessarily imply a ranking.

A second algorithm 244, designated recommendations optimization 244, optimizes the adaptive recommendations 250 produced by the adaptive system 100. The adaptive recommendations 250 may be augmented by automated inferences and interpretations about the content within individual and sets of objects 232 using statistical pattern matching of words, phrases or representations, in written or audio format, or in pictorial format, within the content. Such statistical pattern matching may include, but is not limited to, semantic network techniques, Bayesian analytical techniques, neural network-based techniques, support vector machine-based techniques, or other statistical analytical techniques. Relevant statistical techniques that may be applied by the present invention include those found in Vapnik, The Nature of Statistical Learning Theory, 1999.

Adaptive Recommendations

As shown in FIG. 1, the adaptive system 100 generates adaptive recommendations 250 using the adaptive recommendations function 240. The adaptive recommendations 250, or suggestions, enable users to more effectively use and navigate through the adaptive system 100.

Figure 4:
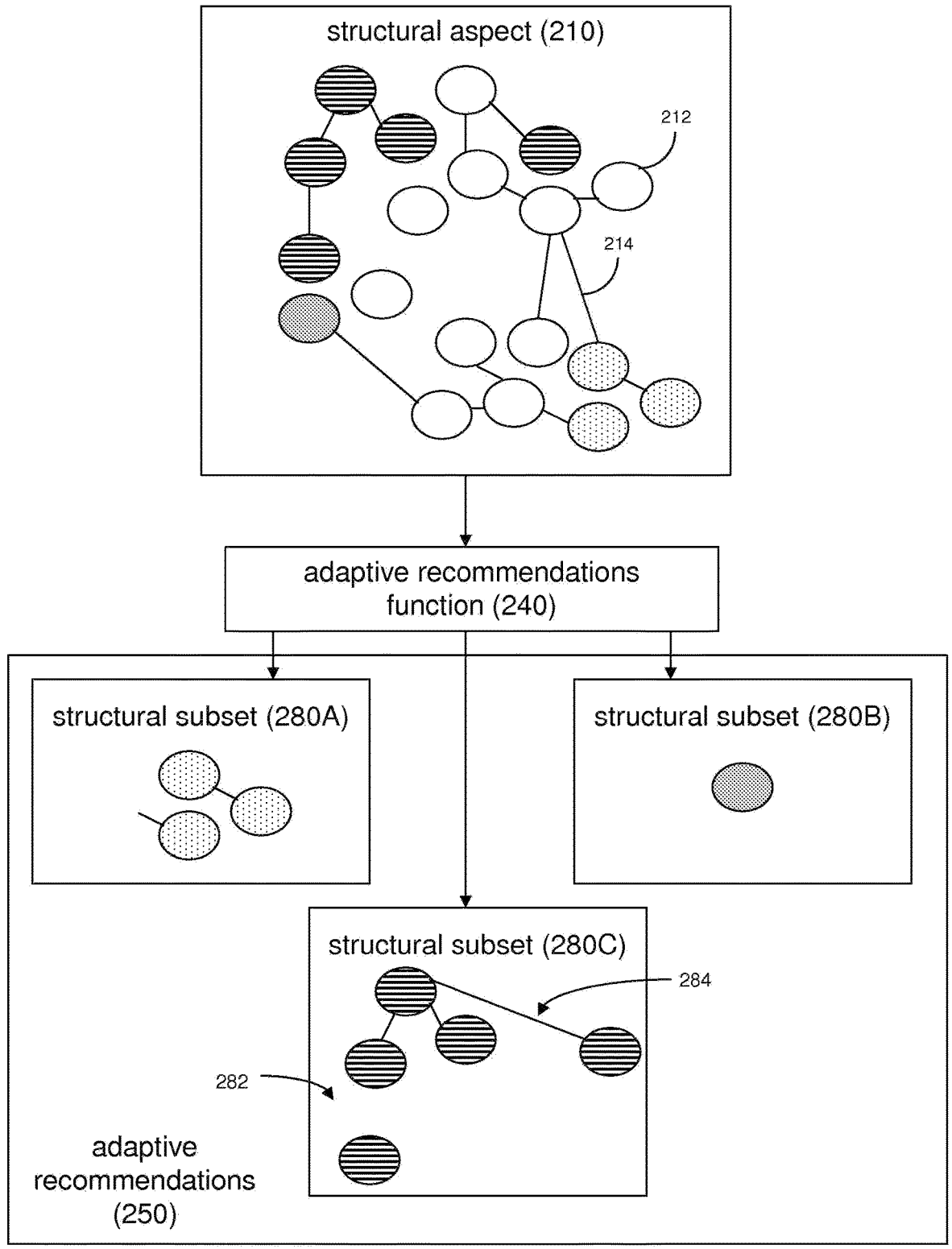
FIG. 4 is a block diagram showing structural subsets generated by the adaptive recommendations function of FIG. 1, according to some embodiments.

The adaptive recommendations 250 are presented as structural subsets of the structural aspect 210. FIG. 4 depicts a hypothetical structural aspect 210, including a plurality of objects 212 and associated relationships 214. The adaptive recommendations function 240 generates adaptive recommendations 250 based on usage of the structural aspect 210 by the one or more users 200, possibly in conjunction with considerations associated with the structural aspect and the content aspect.

Three structural subsets 280A, 280B, and 280C (collectively, structural subsets 280) are depicted. The structural subset 280A includes three objects 212 and one associated relationship, which are reproduced by the adaptive recommendations function 240 in the same form as in the structural aspect 210 (objects are speckle shaded). The structural subset 280B includes a single object (object is shaded), with no associated relationships (even though the object originally had a relationship to another object in the structural aspect 210).

The third structural subset 210C includes five objects (striped shading), but the relationships between objects has been changed from their orientation in the structural aspect 210. In the structural subset 280C, a relationship 282 has been eliminated while a new relationship 284 has been formed by the adaptive recommendations function 240. The structural subsets 280 depicted in FIG. 4 represent but three of a myriad of possibilities from the original network of objects.

The illustration in FIG. 4 shows a simplified representation of structural subsets 280 being generated from objects 212 and relationships 214 of the structural aspect 210. Although not shown, the structural subset 280 may also have corresponding associated subsets of the usage aspect 220, such as usage behaviors and usage behavioral patterns. As used herein, references to structural subsets 280 are meant to include the relevant subsets of the usage aspect, or usage subsets, as well.

The adaptive recommendations 250 may be in the context of a currently conducted activity of the system 100, a currently accessed object 232, or a communication with another user 200. The adaptive recommendations 250 may also be in the context of a historical path of executed system activities, accessed objects 212, or communications during a specific user session or across user sessions. The adaptive recommendations 250 may be without context of a current activity, currently accessed object 212, current session path, or historical session paths. Adaptive recommendations 250 may also be generated in response to direct user requests or queries. Such user requests may be in the context of a current system navigation, access or activity, or may be outside of any such context.

Usage Behavior Categories

In Table 1, several different usage behaviors 270 identified by the adaptive system 100 are categorized. The usage behaviors 270 may be associated with the entire user community, one or more sub-communities, or with individual users of the adaptive system 100.

TABLE 1

Usage behavior categories and usage behaviors.

| usage behavior category | usage behavior |
| --- | --- |
| navigation and access | activity, content and computer application accesses, including buying/selling paths of accesses or click streams |
| subscription and self-profiling | personal or community subscriptions to process topical areas interest and preference self-profiling affiliation self-profiling (e.g., job function) |
| collaborative | referral to others discussion forum activity direct communications (voice call, messaging) content contributions or structural alterations |
| reference | personal or community storage and tagging personal or community organizing of stored or tagged information |
| direct feedback | user ratings of activities, content, computer applications and automatic recommendations user comments |
| physical location | current location location over time relative location to users/object references |

A first category of usage behaviors 270 is known as system navigation and access behaviors. System navigation and access behaviors include usage behaviors 270 such as accesses to, and interactions with, objects 212, such as activities, content, topical areas, and computer applications. These usage behaviors may be conducted through use of a keyboard, a mouse, oral commands, or using any other input device. Usage behaviors 270 in the system navigation and access behaviors category may include, but are not limited to, the viewing or reading of displayed information, typing written information, interacting with online objects orally, or combinations of these forms of interactions with the adaptive system 100.

System navigation and access behaviors may also include executing transactions, including commercial transactions, such as the buying or selling of merchandise, services, or financial instruments. System navigation and access behaviors may include not only individual accesses and interactions, but the capture and categorization of sequences of object accesses and interactions over time.

A second category of usage behaviors 270 is known as subscription and self-profiling behaviors. Subscriptions may be associated with specific topical areas of the adaptive system 100, or may be associated with any other structural subset 280 of the system 100. Subscriptions may thus indicate the intensity of interest (inferred interests 254) with regard to system objects 212, including specific topical areas. The delivery of information to fulfill subscriptions may occur online, such as through electronic mail (email), on-line newsletters, XML feeds, etc., or through physical delivery of media.

Self-profiling refers to other direct, persistent (unless explicitly changed by the user) indications explicitly designated by the one or more users 200 regarding their preferences and interests, or other meaningful attributes. The user 200 may explicitly identify interests or affiliations, such as job function, profession, or organization, and preferences, such as representative skill level (e.g., novice, business user, advanced). Self-profiling enables the adaptive system 100 to infer explicit preferences 252. For example, a self-profile may contain information on skill levels or relative proficiency in a subject area, organizational affiliation, or a position held in an organization. Self-profiling information may be used to infer preferences and interests with regard to system use and associated topical areas, and with regard to degree of affinity with other user community subsets. The user 200 may identify preferred methods of information receipt or learning style, such as visual or audio, as well as relative interest levels in other communities.

A third category of usage behaviors 270 is known as collaborative behaviors. Collaborative behaviors are interactions among the one or more users 200 of the adaptive system 100, or between users 200 and non-system users. Collaborative behaviors may thus provide information on areas of interest and intensity of interest. Interactions including online referrals of objects 212, such as through email, or structural subsets 280 of the system 100, whether to other system users 200 or to non-users 260, are types of collaborative behaviors obtained by the adaptive system 100.

Other examples of collaborative behaviors include, but are not limited to, online discussion forum activity, contributions of content or other types of objects 212 to the structural aspect 210 of the adaptive system 100, or any other alterations of the structural aspect 210 for the benefit of others. Collaborative behaviors may also include general user-to-user communications, whether synchronous or asynchronous, such as email, instant messaging, interactive audio communications, and discussion forums, as well as other user-to-user communications that can be tracked by the adaptive system 100.

A fourth category of usage behaviors 270 is known as reference behaviors. Reference behaviors refer to the saving or tagging of specific objects 212 or structural subsets 280 of the system 100 by the user 200 for recollection or retrieval at a subsequent time. The saved or tagged objects 212, or structural subsets 280, may be organized in a manner customizable by the user 200. The referenced objects 212 (structural subsets 280), as well as the manner in which they are organized by the user 200, may provide information on inferred interests 254 and intensity of interest.

A fifth category of usage behaviors 270 is known as direct feedback behaviors. Direct feedback behaviors include ratings or other indications of perceived quality by individuals of specific objects 212 or their attributes. The direct feedback behaviors may reveal the explicit preferences 252 of the user 200. In the adaptive system 100, the adaptive recommendations 250 produced by the adaptive recommendations function 240 (see FIG. 1) may be rated. This enables a direct, adaptive feedback loop, based on explicit preferences 252 specified by the user 200. Direct feedback also includes user-written comments and narratives associated with objects 212 in the system 100.

A sixth category of usage behaviors 270 is known as physical location behaviors. Physical location behaviors identify physical location and mobility behaviors of the user 200. Location of the user 200 may be inferred from, for example, information associated with a Global Positioning System or any other positionally aware system or device. The physical location of physical objects referenced by objects 212 may be stored in the system 100. Proximity of users 200 to other users 200, or to physical objects referenced by objects 212, may be inferred. The length of time, or duration, at which the user 200 resides in a particular location may be used to infer intensity of interests associated with the particular location, or associated with objects 212 that have a relationship to a physical location.

In addition to the usage behavior categories 246 depicted in Table 1, usage behaviors 270 may be categorized over time and across user behavioral categories 246. Temporal patterns may be associated with each of the usage behavioral categories 246. Temporal patterns associated with each of the categories may be tracked and stored by the adaptive system 100. The temporal patterns may include historical patterns, including how recently an object 212 is accessed. For example, more recent behaviors may be inferred to indicate more intense current interest than less recent behaviors.

Another temporal pattern that may be tracked and contribute to preference inferences made is the duration associated with the access of objects 212, the interaction with the objects 212, or the user's physical proximity to objects 212 that refer to physical objects, or the user's physical proximity to other users 200 of the adaptive system 100. For example, longer durations may generally be inferred to indicate greater interest than short durations. In addition, trends over time of the behavior patterns may be captured to enable more effective inference of interests and relevancy. Since adaptive recommendations 250 may include a combination of structural aspects 210 and content aspects 230, the usage pattern types and preference inferencing may also apply to interactions of the one or more users 200 with the adaptive recommendations 250 themselves.

Adaptive System is Recursive and Iterative

Figure 6:
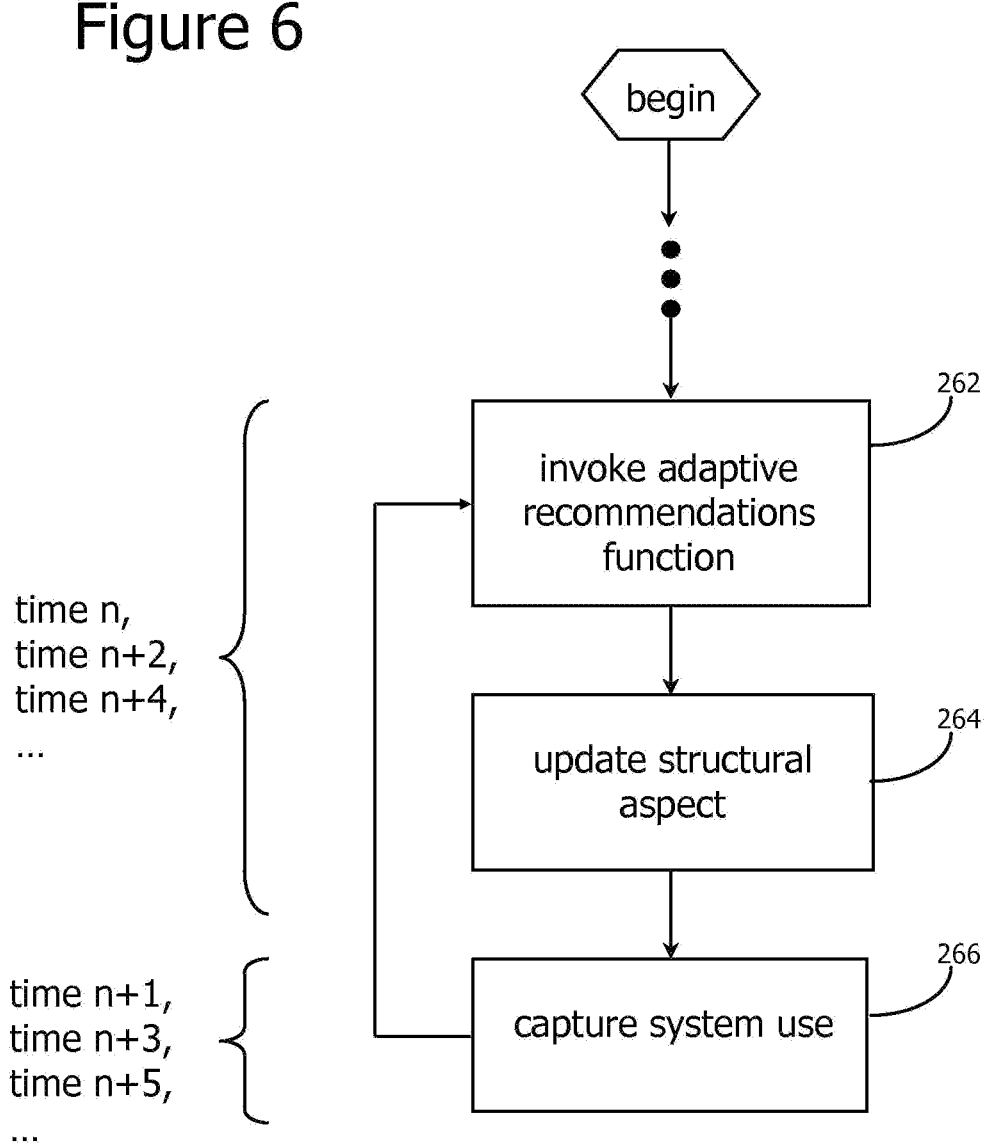
FIG. 6 is a block diagram describing a generalized adaptive system feedback flow, according to some embodiments.

FIG. 6 is a flow diagram depicting the processing flow of the adaptive system 100, to illustrate its iterative, recursive nature. Prior to invoking the adaptive recommendations function 240 (see FIG. 1), one or more users 200 will have used the adaptive system 100. At a first time following usage (time n), the adaptive recommendations function 240 is invoked (block 262). The adaptive recommendations function 240 may automatically or semi-automatically update the structural aspects 210 of the adaptive system 100 (block 264). The update may, for example, include a change to the relationship among objects 214.

At a subsequent time to the structural aspect update (time n+1), the system use 202 is captured by the adaptive system 100 (block 266). Recall that system use 202, or captured usage information 202, includes any interaction by the one or more users 200 of the adaptive system 100. The use of the system, and hence the captured usage information 202 may be influenced by the updated structural aspects 210 from the previous time period (time n).

As shown in FIG. 6, the adaptive recommendations function 240 may be iteratively invoked following each capture of the system use 202. Thus, at time n+2, the adaptive recommendations function 240 is invoked (block 262), the adaptive recommendations being based on, among other things, the captured usage information 202 from the previous time period (time n+1). Based on the invocation of the adaptive recommendations function 240, the structural aspect 210 may again be updated (block 264). Once the users 200 again use the adaptive system 100, the system use 202 is captured (block 266), such that the adaptive recommendations function 240 can again be invoked. Thus, an iterative, feedback loop may be established between system usage 202 and the system structure (the structural aspect 210), which may continue indefinitely.

Multiple invocations of the adaptive recommendations function 240 may be run, automatically or through direct user invocations, synchronously or asynchronously. Each invocation of the adaptive recommendations function 240 performs one or more of the following: 1) providing adaptive recommendations directly to individual users or to or groups of users (communities); 2) updating or modifying the system aspect 210; and, 3) updating or modifying the content aspect 230. The result of this process is multiple, distributed, feedback loops enabling adaptation of the adaptive system 100.

Public Information Framework

Figure 7:
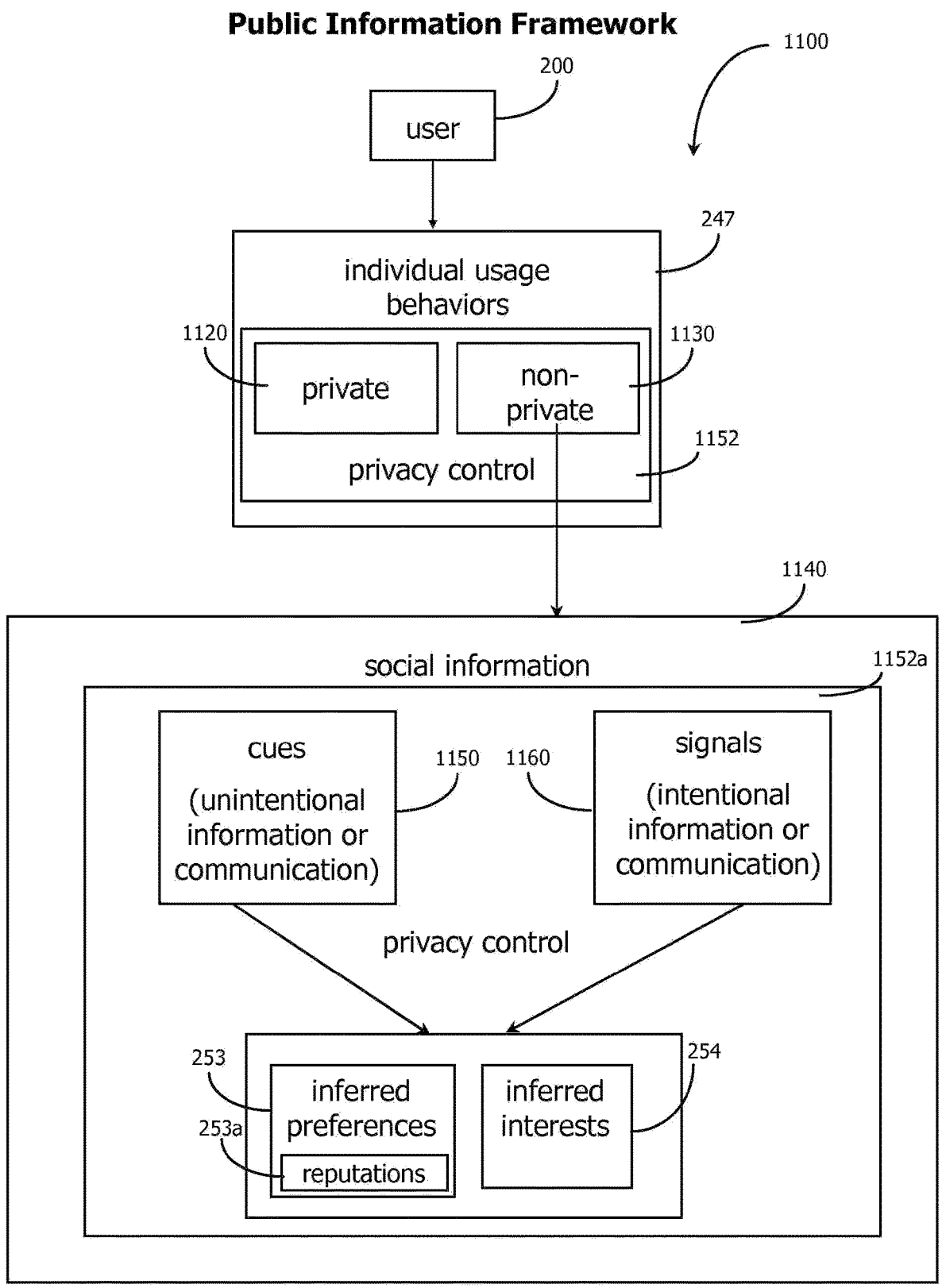
FIG. 7 is a block diagram of a public information framework used by the adaptive system of FIG. 1, according to some embodiments.

FIG. 7 depicts a framework 1100 that summarizes the use of individual and social information used by the adaptive system 100 to produce adaptive recommendations 250. The framework 1100 has analogies in evolutionary biology, see for example, Danchin et al, Public Information: From Nosy Neighbors to Cultural Evolution, Science, July 2004.

Recall from FIG. 3C that usage behaviors 270 are part of the usage aspect 220 of the adaptive system 100. Usage behaviors 270 include categorizations of system usage 202 over time and across usage categories 246, whether at an individual user or community level. In FIG. 7, additional details associated with individual usage behaviors 270 are depicted.

The individual usage behaviors 270 can be divided into private behaviors 1120, and non-private behaviors 1130. Private behaviors 1120 are behaviors of a user 200 that are unavailable to other users while non-private behaviors 1130 are behaviors that may be available to other users. As illustrated in FIG. 7, the non-private behaviors 1130 may become socially available information 1140.

The social information 1140 includes unintentional information or communications, or "cues" 1150, as well as intentional information or communications, or "signals" 1160. Cues 1150 may include by-product information from the intentional communications 1160, whether the cues are derived by the user or users to whom the intentional communications were directed, or by a user or users other than to whom the intentional communications were directed.

Recall from FIG. 1 that the adaptive recommendations function 240 employs a preference inferencing algorithm 242 to derive explicit preferences 252, inferred preferences 253, and inferred interests 254 based on the captured usage information 202. As shown in FIG. 7, inferred preferences 253 and interests 254 are specifically derived from signals 1160 and cues 1150. The social information 1140 thus further includes inferred preferences 253, such as reputations 253a, and interests 254. Inferred preferences 253 and interests 254 may be formed from both signals 1160 and cues 1150, or from combinations thereof.

An added feature of the adaptive system 100 enables users to specify the level of privacy associated with the derivation of inferred preferences 253 and interests 254. Users 200 may be able to adjust the level of privacy, through a privacy control 1152, associated with the private information 1120 and non-private information 1130 being used by the adaptive system 100 to produce inferred preferences 253 and interests 254. A privacy control 1152a allows the user to enable or disable non-private cues 1150 and signals 1160 from being used to infer preferences and interests. The adjusted level of privacy may be with regard to the tracking of, or the forming of inferences from, the cues 1150 or the signals 1160, to beneficially adapt to the preferences of the user 200. Or, the adjusted level of privacy may be with regard to the tracking of, or the forming of inferences from, the cues 1150 or the signals 1160 that might be used by the adaptive system 100 to provide more effective adaptation to other user's requirements. In other words, the user 200 may choose to wholly or partially "opt out" of the preference inferencing 242 performed by the adaptive system 100, with respect to some or all of the usage behaviors 247 of the user 200.

Usage Framework

Figure 8:
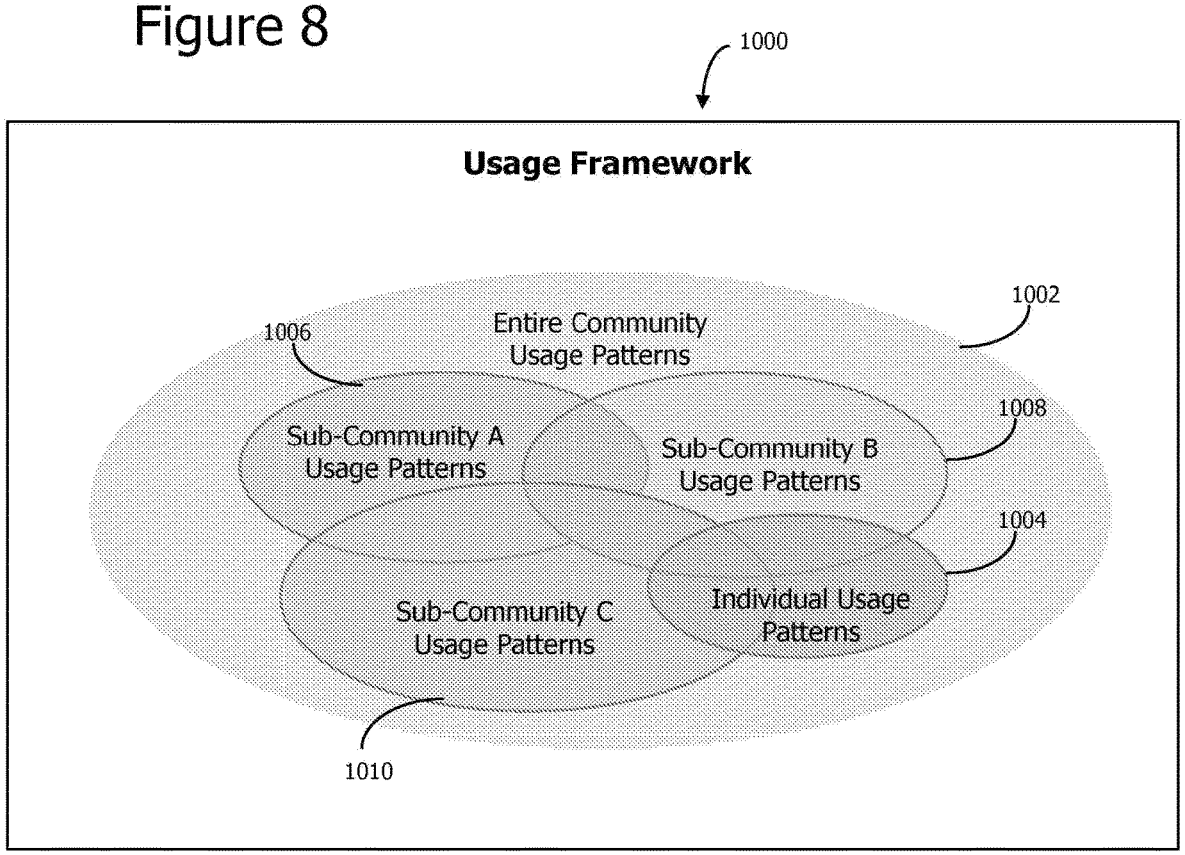
FIG. 8 is a diagram of user communities, according to some embodiments.

FIG. 8 depicts a usage framework 1000 for performing preference inferencing 242 of captured usage information 102 by the adaptive system 100 of FIG. 1. The usage framework 1000 summarizes the manner in which usage patterns 248 are managed within the adaptive system 100. Usage behavior patterns 248 associated with an entire community, affinity group, or segment of users 1002 are captured by the adaptive system 100. In another case, usage patterns 248 specific to an individual, shown in FIG. 8 as individual usage patterns 1004, are captured by the adaptive system 100. Various sub-communities of usage may also be defined, as for example sub-community A usage patterns 1006, sub-community B usage patterns 1008, and sub-community C usage patterns 1010.

Memberships in the communities are not necessarily mutually exclusive, as depicted by the overlaps of the sub-community A usage patterns 1006, sub-community B usage patterns 1008, and sub-community C usage patterns 1010 (as well as and the individual usage patterns 1004) in the usage framework 1000. Recall that a community may include a single user 200 or multiple users. Sub-communities may likewise include one or more users 200. Thus, the individual usage patterns 1004 in FIG. 8 may also be described as representing the usage patterns of a community or a sub-community. For the adaptive system 100, usage behavior patterns 248 may be segmented among communities and individuals so as to effectively enable adaptive recommendations 250 for each sub-community or individual.

The communities identified by the adaptive system 100 may be determined through self-selection, through explicit designation by other users or external administrators (e.g., designation of certain users as "experts"), or through automatic determination by the adaptive system 100. The communities themselves may have relationships between each other, of multiple types and values. In addition, a community may be comprised not of human users, or solely of human users, but instead may include one or more other computer-based systems, which may have reason to interact with the adaptive system 100. Or, such computer-based systems may provide an input into the adaptive system 100, such as by being the output from a search engine. The interacting computer-based system may be another instance of the adaptive system 100.

The usage behaviors 270 included in Table 1 may be categorized by the adaptive system 100 according to the usage framework 1000 of FIG. 8. For example, categories of usage behavior may be captured and categorized according to the entire community usage patterns 1002, sub-community usage patterns 1006, and individual usage patterns 1004. The corresponding usage behavior information 247 may be used to infer preferences and interests at each of the user levels.

Multiple usage behavior categories 246 shown in Table 1 may be used by the adaptive system 100 to make reliable inferences based on the preferences, of the user 200 with regard to the content aspect 230 and the structural aspect 210. There are likely to be different preference inferencing 242 results for different users 200. In addition, preference inferencing 242 may be different with regard to optimizing the content aspect 230 for display to the user 200 versus inferred preferences that are used for updating the structural aspect 210 or the content aspect 230, as updates to the structural aspect 210 are likely to be persistent and affect many users.

As an example, simply using the sequences of content accesses as the sole relevant usage behavior on which to base updates to the structure will generally yield unsatisfactory results. This is because the structure itself, through navigational proximity, will create a tendency toward certain navigational access sequence biases. Using just object or content access sequence patterns as the basis for updates to the structural aspect 210 will therefore tend to reinforce the pre-existing structure of the system 100, which may limit the adaptiveness of the adaptive system 100.

By introducing different or additional behavioral characteristics, such as the duration of access of an object 212 or item of content (information 232), on which to base updates to the structural aspect 210 of the system 100 (system structural updates), a more adaptive system is enabled. For example, duration of access will generally be much less correlated with navigational proximity than access sequences will be, and therefore provide a better indicator of true user preferences. Therefore, combining access sequences and access duration will generally provide better inferences and associated system structural updates than using either usage behavior alone. Effectively utilizing additional usage behaviors as described above will generally enable increasingly effective system structural updating. In addition, the adaptive system 100 may employ user affinity groups to enable even more effective system structural updating than are available merely by applying either individual (personal) usage behaviors or entire community usage behaviors.

Furthermore, relying on only one or a limited set of usage behavioral cues 1150 and signals 1160 mitigates against potential "spoofing" or "gaming" of the system 100. "Spoofing" or "gaming" the adaptive system 100 refers to conducting consciously insincere or otherwise intentional usage behaviors 270 so as to influence the adaptive recommendations 250 or changes to the structural aspect 210 by the adaptive system 100. Utilizing broader sets of system usage behavioral cues 1150 and signals 1160 may lessen the effects of spoofing or gaming. One or more algorithms may be employed to detect such contrived usage behaviors, and when detected, such behaviors may be compensated for by the preference and interest inferencing algorithm 242.

User Communities

As described above, the user 200 of the adaptive system 100 may be a member of one or more communities of interest, or affinity groups, with a potentially varying degree of affinity associated with the respective communities. These affinities may change over time as interests of the user 200 and communities evolve over time. The affinities or relationships among users and communities may be categorized into specific types. An identified user may be considered a member of a special sub-community containing only one member, the member being the identified user. A user can therefore be thought of as just a specific case of the more general notion of user segments, communities, or affinity groups.

Figure 9:
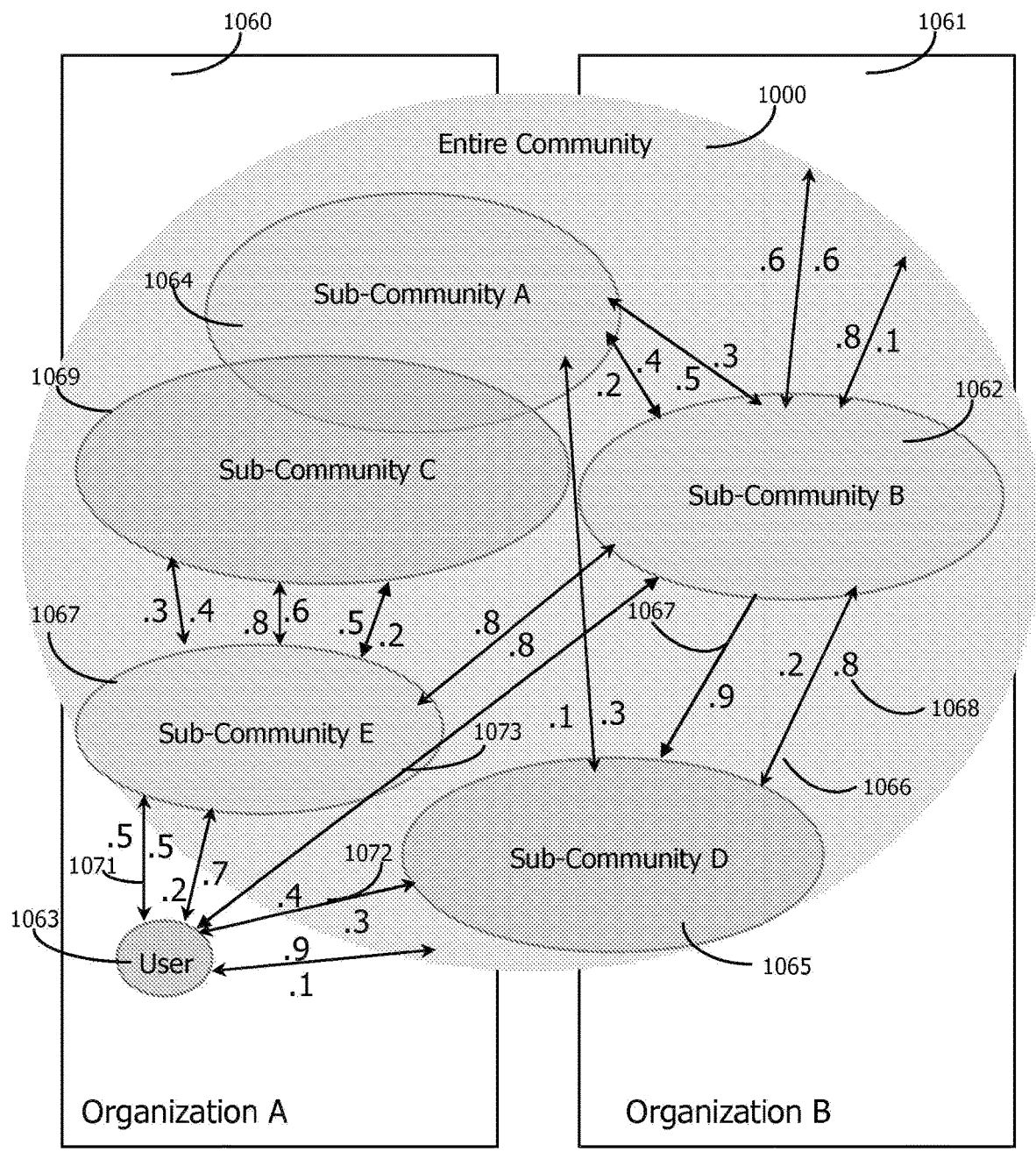
FIG. 9 is a diagram of user communities and associated relationships, according to some embodiments.

FIG. 9 illustrates the affinities among user communities and how these affinities may automatically or semi-automatically be updated by the adaptive system 100 based on user preferences which are derived from system usage 202. An entire community 1000 is depicted in FIG. 9. For the adaptive system 100, the community may extend across organizational or functional boundaries. The entire community 1000 extends across organization A 1060 and organization B 1061. An "organization" may be a business, an institution, or any other collection of individuals. The entire community 1000 includes sub-community A 1064, sub-community B 1062, sub-community C 1069, sub-community D 1065, and sub-community E 1067. A user 1063 who is not part of the entire community 1000 is also featured in FIG. 9.

Sub-community B 1062 is a community which has many relationships or affinities to other communities. These relationships may be of different types and differing degrees of relevance or affinity. (The relationships between communities depicted in FIG. 9 are distinct from the relationships between objects 214 referred to in FIG. 3A.) For example, a first relationship 1066 between sub-community B 1062 and sub-community D 1065 may be of one type, and a second relationship 1067 may be of a second type. (In FIG. 9, the first relationship 1066 is depicted using a double-pointing arrow, while the second relationship 1067 is depicted using a unidirectional arrow.)

Figure 42:
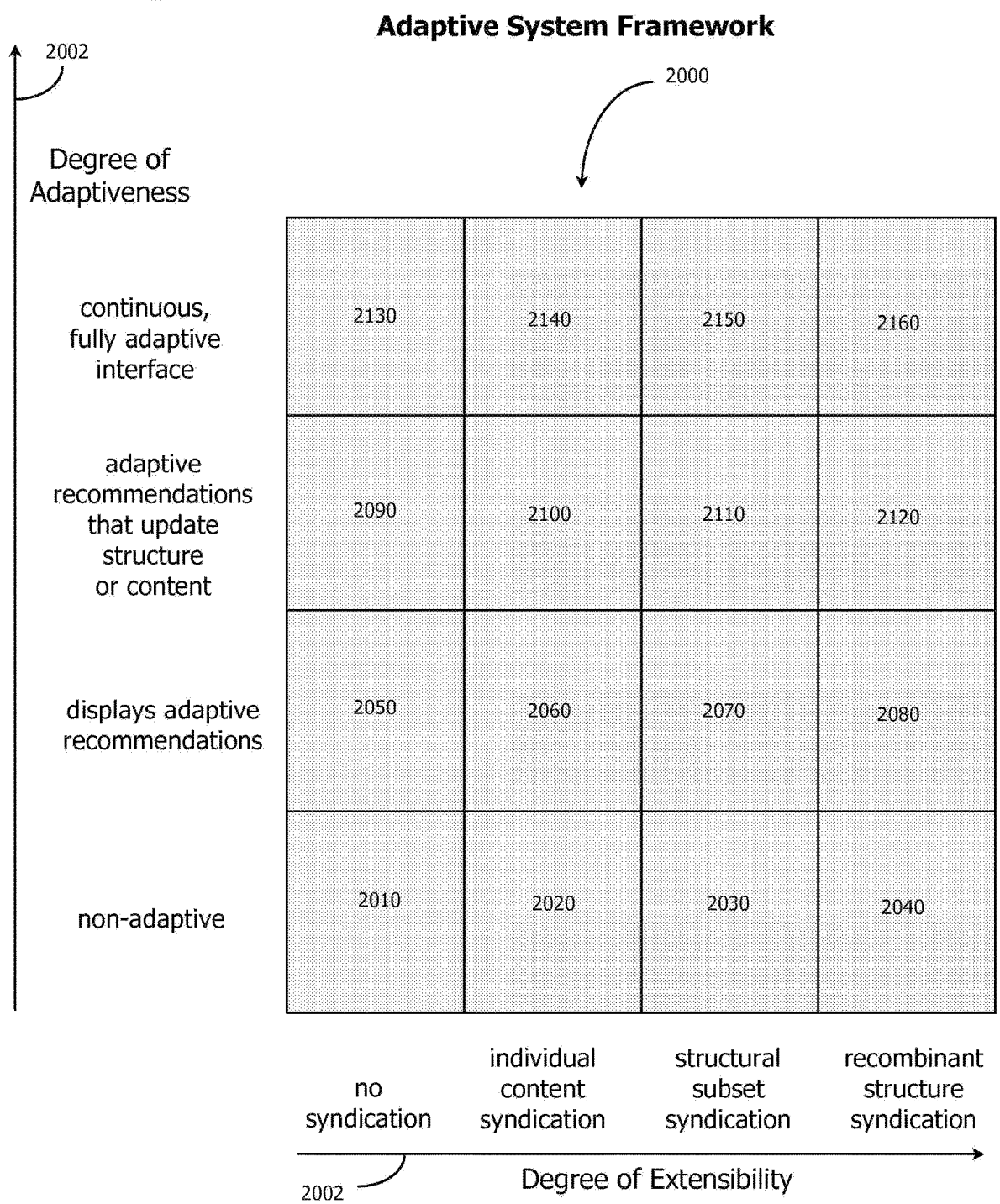
FIG. 42 is a diagram of a framework for categorizing adaptive systems, according to some embodiments.

The relationships 1066 and 1067 may be directionally distinct, and may have an indicator of relationship or affinity associated with each distinct direction of affinity or relationship. For example, the first relationship 1066 has a numerical value 1068, or relationship value, of "0.8." Several other relationship values are shown in FIG. 42, below, and are scaled to values between 0 and 1. The relationship value 1068 thus describes the first relationship 1066 between sub-community B 1062 and sub-community D 1065 as having a value of 0.8.

The relationship value may be scaled as in FIG. 9 (e.g., between 0 and 1), or may be scaled according to another interval. The relationship values may also be bounded or unbounded, or they may be symbolically represented (e.g., high, medium, low).

The user 1063, which could be considered a user community including a single member, may also have a number of relationships to other communities, where these relationships are of different types, directions and relevance. From the perspective of the user 1063, these relationship types may take many different forms. Some relationships may be automatically formed by the adaptive system 100, for example, based on interests or geographic location or similar traffic/usage patterns. Thus, for example the entire community 1000 may include users in a particular city. Some relationships may be context-relative. For example, a community to which the user 1063 has a relationship could be job-related and another community could be related to another aspect of life, such as related to family, hobby, or health. Thus, sub-community E 1067 may be the employees at a corporation to which the user 1063 has a relationship 1071; sub-community B 1062 may be the members of a sailing club to which the user 1063 has a relationship 1073; sub-community C may be the doctors at a medical facility to which the user 1063 has a relationship 1072. The generation of new communities which include the user 1063 may be based on the inferred interests 254 of the user 1063 or other users within the entire community 1000.

Membership of communities may overlap, as indicated by sub-communities A 1064 and C 1069. The overlap may result when one community is wholly a subset of another community, such as between the entire community 1000 and sub-community B 1062. More generally, a community overlap will occur whenever two or more communities contain at least one user in common. Such community subsets may be formed automatically by the adaptive system 100 based on preference inferencing 242 from usage patterns 248. For example, a subset of a community may be formed based on an inference of increased interest or demand of particular content or expertise of an associated community. The adaptive system 100 is also capable of inferring that a new community is appropriate. The adaptive system 100 will thus create the new community automatically.

For each user, whether residing within, say, sub-community A 1064, or residing outside the community 1000, such as the user 1063, the relationships (such as arrows 1066 or 1067), affinities, or "relationship values" (such as numerical indicator 1068), and directions (of arrows) are unique. Accordingly, some relationships (and specific types of relationships) between communities may be unique to each user. Other relationships, affinities, values, and directions may have more general aspects or references that are shared among many users, or among all users of the adaptive system 100. A distinct and unique mapping of relationships between users, such as is illustrated in FIG. 9, could thus be produced for each user of the adaptive system 100.

The adaptive system 100 may automatically generate communities, or affinity groups, based on user behaviors 270 and associated preference inferences 242. In addition, communities may be identified by users, such as administrators of the adaptive system 100. Thus, the adaptive system 100 utilizes automatically generated and manually generated communities in generating adaptive recommendations 250.

The communities, affinity groups, or user segments aid the adaptive system 100 in matching interests optimally, developing learning groups, prototyping system designs before adaptation, and many other uses. For example, advanced users of the adaptive system 100 may receive a preview of a new adaptation of a system for testing and fine-tuning, prior to other users receiving this change.

The users 200 or communities may be explicitly represented as objects 212 within the structural aspect 210 or the content aspect 230 of the adaptive system 100. This feature enhances the extensibility (portability) and adaptability of the adaptive system 100.

The user community structure depicted in FIG. 9 may be directly embedded in the usage aspect 220. Further, the usage community structure and the usage aspect may be a fuzzy network-based structure. Fuzzy networks are described in more detail, below.

Community Preference Inferences

The preferences of a given user community may be inferred from the amount of on-line traffic, or number of accesses or interactions, associated with individual objects 212, or with people or physical objects referenced by the object 212 (this may be termed, "popularity"). The users 200 may have the ability to subscribe to selected structural subsets 280 and assign degrees of personal interest associated with the structural subsets, for the purposes of periodic updates on the structural subsets. Recall that a structural subset is a portion or subset of the structural aspect 210 of a system. The updates may be effected through, for example, e-mail updates.

The relative frequency of structural subsets 280 (e.g., topics) subscribed to by the user community as a whole, or by selected sub-communities, may be used to infer preferences at the community or sub-community level. The users 200 may create their own personalized structural aspect 210 through selection and saving of individual objects 212 or multiple objects and optionally associated relationships or, more generally, structural subsets 280. In such embodiments, the relative frequency of structural subsets being saved in the structural aspect 210 of a particular user by the user community as a whole, or by selected sub-communities, may also be used to infer community and sub-community preferences. These inferred community and sub-community preferences may be derived directly from saved structural subsets 280, but also from direct or indirect affinities the saved structural subsets have with other structural subsets.

Users 200 of the adaptive system 100 may be able to directly rate structural subsets 280 when they are accessed. In such embodiments, the preferences of a community or sub-community may also be inferred through ratings of individual structural subsets. The ratings may apply against both the information 232 referenced by the structural subset 280, as well as meta-information 234 such as an expert review of the information referenced by the system subset. Users 200 may have the ability to suggest structural subsets 280 to one or more other users, and preferences may be inferred from these human-based suggestions. The inferences may be derived from correlating the human-based suggestions with the inferred interests 254 of the receivers if the receivers of the human-based suggestions are users of the adaptive system 100 and have a personal history of objects 212 viewed and/or a personal structural aspect 210 that they may have created.

Expert Preference Inferences

In the adaptive system 100, community subsets, such as subject matter experts, may be designated. Expert opinions on the relationship between objects 212 may be encoded in the structural aspect 210 of the adaptive system 100. Expert views can be directly inferred from the structural aspect. An expert or set of experts may directly rate individual objects and expert preferences may be directly inferred from these ratings.

The history of access of objects 212 or associated meta-information 234 by sub-communities, such as experts, may be used to infer preferences of the associated sub-community. Experts or other user sub-communities may also have the ability to create their own personalized structural aspect 210 through selection and saving or tagging of objects 212. The relative frequency of objects 212 being saved in personal structural aspects 210 (such as a local hard drive) by experts or communities of experts may also be used to infer expert preferences. These inferences may be derived directly from saved or tagged objects 212, but also from affinities the saved objects have with other objects.

A sub-community may be generated by the adaptive system 100 to prototype a new set of adaptive recommendations 250. For example, a sub-community may reflect a newly optimized business process or a frequently traveled path that many novice users of a larger community often follow. In such circumstances, the new set of adaptive recommendations 250 could be useful as a learning tool for new users.

Personal Preference Inferences

Users 200 of the adaptive system 100 may subscribe to selected structural subsets 280 for the purposes of, for example, e-mail updates on these subsets. The objects 212 subscribed to by the user 200 may be used to infer the preferences of the user. Users 200 may create their own personalized structural aspect 210 through selection and saving or tagging of objects 212. The relative frequency of objects 212 being saved in a personal structural aspect 210 by the user 200 may be used to infer the individual preferences of the user. These inferences may be derived directly from saved objects 212, but also from direct or indirect affinities the saved objects have with other objects.

Users can also directly rate objects 212 when accessed. In such embodiments, personal preferences may also be inferred through these ratings of individual objects 212. The ratings may apply against both the information 232 referenced by the object 212, such as an expert review of the information 232 referenced by the object 212. A personal history of paths of the objects 212 viewed may be stored. This personal history can be used to infer preferences of the user 200, as well as tuning adaptive recommendations and suggestions by avoiding recommending or suggesting objects 212 that have already been recently viewed or completed by the user 200.

Adaptive Recommendations and Suggestions

Adaptive recommendations 250 generated by the adaptive recommendations function 240 may combine inferences from community, sub-community (including expert), and personal behaviors and preferences, as discussed above, to present to the one or more users 200, one or more system structural subsets 280. The users 200 may find the structural subsets particularly relevant given the current navigational context of the user within the system, the physical location of the user, and/or responsive to an explicit request of the system by the one or more users. In other words, the adaptive recommendation function 240 determines preference "signals" from the "noise" of system usage behaviors.

The sources of user behavioral information, which typically include the objects 212 referenced by the user 200, may also include the actual information 232 contained therein. In generating adaptive recommendations 250, the adaptive system 100 may thus employ search algorithms that use text matching or more general statistical pattern matching to provide inferences on the inferred themes of the information 232 embedded in, or referenced by, individual objects 212. Furthermore, the structural aspect 210 may itself inform the specific adaptive recommendations 250 generated. For example, existing relationship structures within the structural aspect 210 at the time of the adaptive recommendations 250 may be combined with the user preference inferences based on usage behaviors, along with any inferences based on the content aspect 230 (the information 232).

Delivery of Adaptive Recommendations

Figure 10:
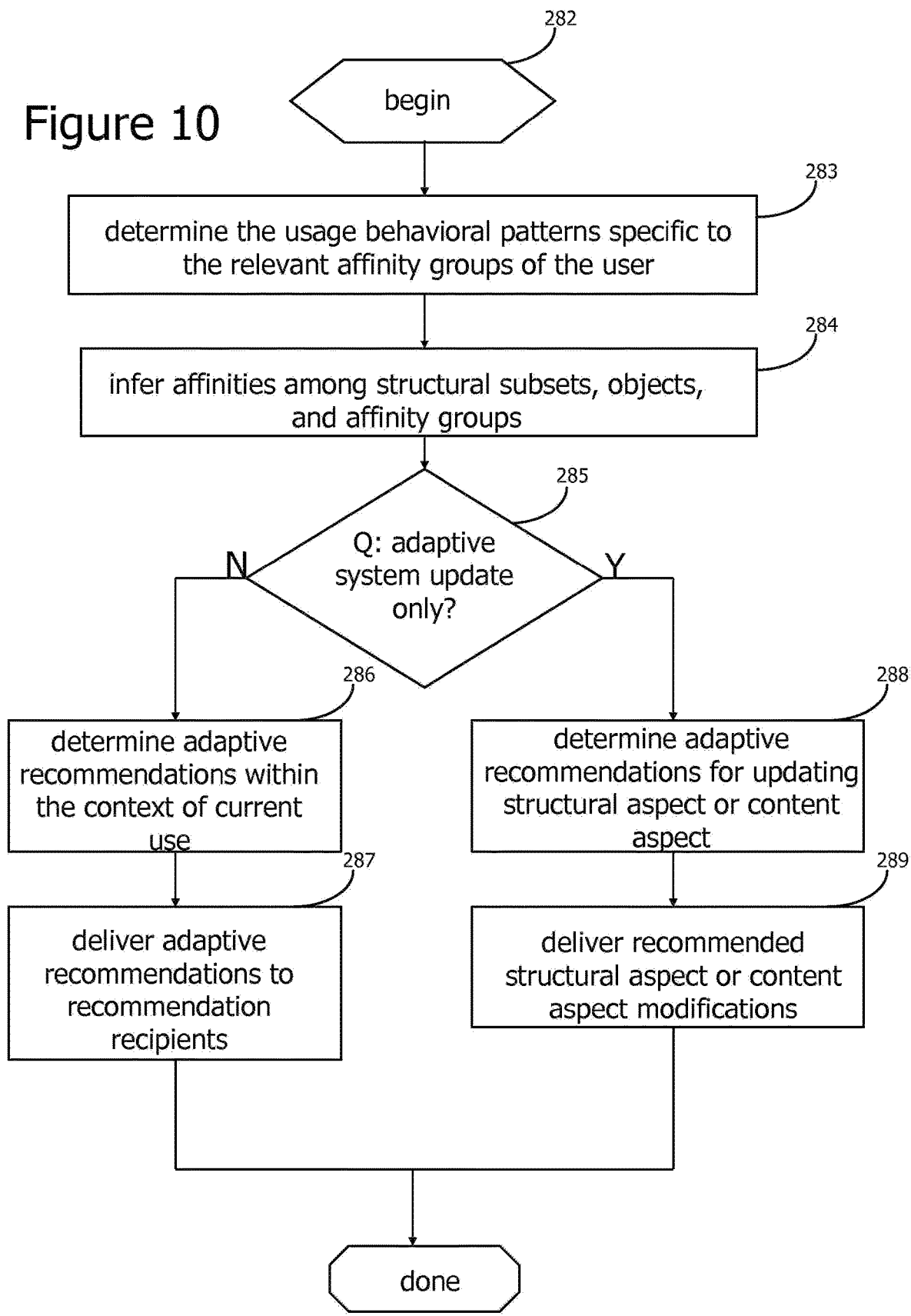
FIG. 10 is a flow chart showing how recommendations of the adaptive system 100 of FIG. 1 are generated, whether to support system navigation and use or to update structural or content aspects of the adaptive system, according to some embodiments.

FIG. 10 is a flow diagram showing how adaptive recommendations 250 are delivered by the adaptive system 100. Recall from FIG. 1 that adaptive recommendations 250 may be delivered directly to the one or more users 200 (dotted arrow 255), may be used to automatically or semi-automatically update the structural aspect 210 (dotted arrow 245) or the content aspect 230 (dotted arrow 246), or may be delivered directly to the non-user 260 of the adaptive system 100 (dotted arrow 265).

The adaptive system 100 begins by determining the relevant usage behavioral patterns 248 to be analyzed (block 283). The adaptive system 100 thus identifies the relevant communities, affinity groups, or user segments of the one or more users 200. Affinities are then inferred among objects 212, structural subsets 280, and among the identified affinity groups (block 284). This data enables the adaptive recommendations function 240 to generate adaptive recommendations 250 of the one or more users 200 for delivery. The adaptive system 100 next determines whether the adaptive recommendations 250 are to be delivered to the recommendations recipients (e.g., users 200 or non-users 260), or are used to update the adaptive system 100 (block 285). Where the recommendations recipients are to receive the adaptive recommendations (the "no" prong of block 285), the adaptive recommendations 250 are generated based on mapping the context of the current system use (or "simulated" use if the current context is external to the actual use of the system) (block 286) to the usage behavior patterns 248 generated by the preference inferencing algorithm 242 (block 286).

Adaptive recommendations are then delivered visually and/or in other communications forms, such as audio, to the recommendations recipients (block 287). The recommendations recipients may be individual users or a group of users, or may be non-users 260 of the adaptive system 100. For Internet-based applications, the adaptive recommendations 250 may be delivered through a web browser directly, or through RSS/Atom feeds and other similar protocols.

The recommended structural subsets 280, along with associated content may constitute most or all of the user interface that is presented to the recommendations recipient, on a periodic or continuous basis. Such embodiments correspond to the continuous, fully adaptive interface described in the framework 2000 of FIG. 42, below, including systems which do not syndicate (2130), systems in which individual content is syndicated (2140), systems in which structural subsets are syndicated (2150), and systems which support recombinant structural syndication.

Where, instead, adaptive system 100 is to receive the adaptive recommendations (the "yes" prong of block 285), the adaptive recommendations 250 are used to update the structural aspect 210 or the content aspect 230. The adaptive recommendations 250 are generated based on mapping the potential structural aspect 210 or content aspect 230 to the affinities generated by the usage behavioral inferences (block 288). The adaptive recommendations 250 are then delivered to enable updating of the structural aspect 210 or the content aspect 230 (block 289).

The adaptive recommendations function 240 may operate completely automatically, performing in the background and updating the structural aspect 210 independent of human intervention. Or, the adaptive recommendations function 240 may be used by users or experts who rely on the adaptive recommendations 250 to provide guidance in maintaining the system structure as a whole, or maintaining specific structural subsets 280 (semi-automatic).

The navigational context for the recommendation 250 may be at any stage of navigation of the structural aspect 210 (e.g., during the viewing of a particular object 212) or may be at a time when the recommendation recipient is not engaged in directly navigating the structural aspect 210. In fact, the recommendation recipient need not have explicitly used the system associated with the recommendation 250.

Some inferences will be weighted as more important than other inferences in generating the recommendation 250. These weightings may vary over time, and across recommendation recipients, whether individual recipients or subcommunity recipients. As an example, characteristics of objects 21 which are explicitly stored or tagged by the user 200 in a personal structural aspect 210 would typically be a particularly strong indication of preference as storing or tagging system structural subsets requires explicit action by the user 200. The recommendations optimization algorithms 244 may thus prioritize this type of information to be more influential in driving the adaptive recommendations 250 than, say, general community traffic patterns within the structural aspect 210.

The recommendations optimization algorithm 244 will particularly try to avoid recommending objects 212 that the user is already familiar with to the user. For example, if the user 200 has already stored or tagged the object 212 in a personal structural subset 280, then the object 212 may be a low ranking candidate for recommendation to the user, or, if recommended, may be delivered to the user with a designation acknowledging that the user has already saved or marked the object for future reference. Likewise, if the user 200 has recently already viewed the associated system object (regardless of whether it was saved to his personal system), then the object would typically rank low for inclusion in a set of recommended objects.

The preference inferencing algorithm 242 may be tuned by the individual user. The tuning may occur as adaptive recommendations 250 are provided to the user, by allowing the user to explicitly rate the adaptive recommendations. The user 200 may also set explicit recommendation tuning controls to adjust the adaptive recommendations to her particular preferences. For example, the user 200 may guide the adaptive recommendations function 240 to place more relative weight on inferences of expert preferences versus inferences of the user's own personal preferences. This may particularly be the case if the user was relatively inexperienced in the corresponding domain of knowledge associated with the content aspect 230 of the system, or a structural subset 280 of the system. As the user's experience grows, she may adjust the weighting toward inferences of the user's personal preferences versus inferences of expert preferences.

Adaptive recommendations, which are structural subsets of the adaptive system 100 (see FIG. 4), may be displayed in variety of ways to the user. The structural subsets 280 may be displayed as a list of objects 212 (where the list may be null or a single object). The structural subset 280 may be displayed graphically. The graphical display may provide enhanced information that may include depicting relationships among objects (as in the "relationship" arrows of FIG. 9).

In addition to the structural subset 280, the recommendation recipient may be able to access information 232 to help gain an understanding about why the particular structural subset was selected as the recommendation to be presented to the user. The reasoning may be fully presented to the recommendation recipient as desired by the recommendation recipient, or it may be presented through a series of interactive queries and associated answers, where the recommendation recipient desires more detail. The reasoning may be presented through display of the logic of the recommendations optimization algorithm 244. A natural language (e.g., English) interface may be employed to enable the reasoning displayed to the user to be as explanatory and human-like as possible.

The personal preference of the user may affect the nature of the display of the information. For example some users may prefer to see the structural aspect in a visual, graphic format while other users may prefer a more interactive question and answer or textual display.

System users may be explicitly represented as objects in the structural aspect 210 and hence embodied in structural subsets 280. Either embodied as structural subsets, or represented separately from structural subsets 280, the adaptive recommendations 250 of some set of users of the adaptive system 100 may be determined and displayed to recommendation recipients, providing either implicit or explicit permission is granted by the set of users. The recommendations optimization algorithm 244 may match the preferences of other users of the system with the current user. The preference matches may include the characteristics of structural subsets stored or tagged by users, their structural subset subscriptions and other self-profiling information, and their system usage patterns 248. Information about the recommended set of users may be displayed. This information may include names, as well as other relevant information such as affiliated organization and contact information. The information may also include system usage information, such as common system objects subscribed to, etc. As in the case of structural subset adaptive recommendations, the adaptive recommendations of other users may be tuned by an individual user through interactive feedback with the adaptive system 100.

The adaptive recommendations 250 may be in response to explicit requests from the user. For example, a user may be able to explicitly designate one or more objects 212 or structural subsets 280, and prompt the adaptive system 100 for a recommendation based on the selected objects or structural subsets. The recommendations optimization algorithm 250 may put particular emphasis on the selected objects or structural subsets, in addition to applying inferences on preferences from usage behaviors, as well as optionally, content characteristics.

In some embodiments, the adaptive recommendations function 240 may augment the preference inferencing algorithm 242 with considerations related to maximizing the revelation of user preferences, so as to better optimize the adaptive recommendations 250 in the future. In other words, where the value of information associated with reducing uncertainty associated with user preferences is high, the adaptive recommendations function 250 may choose to recommend objects 212 or other recommended structural aspects 210 as an "experiment." For example, the value of information will typically be highest for relatively new users, or when there appears to be a significant change in usage behavioral pattern 248 associated with the user 200. The adaptive recommendations function 240 may employ design of experiment (DOE) algorithms so as to select the best possible "experimental" adaptive recommendations, and to optimally sequence such experimental adaptive recommendations, and to adjust such experiments as additional usage behaviors 270 are assimilated. The preference inferencing 242 and recommendations optimization 244 algorithms may also preferentially deliver content that is specially sponsored, for example, advertising or public relations-related content.

In summary, the adaptive recommendations 250 may be presented to the users 200, to the non-user 260, or back to the adaptive system 100, for updating either the structural aspect 210 or the content aspect 230. The adaptive recommendations 250 will thus influence subsequent user interactions and behaviors associated with the adaptive system 100, creating a dynamic feedback loop.

Automatic or Semi-Automatic System Structure Maintenance

The adaptive recommendations function 240, optionally in conjunction with system structure maintenance functions, may be used to automatically or semi-automatically update and enhance the structural aspect 210 of the adaptive system 100. The adaptive recommendations function 240 may be employed to determine new relationships 214 among objects 212 in the adaptive system, within structural subsets 280, or structural subsets associated with a specific sub-community. The automatic updating may include potentially assigning a relationship between any two objects to zero (effectively deleting the relationship between the two objects).

In either an autonomous mode of operation, or in conjunction with human expertise, the adaptive recommendations function 240 may be used to integrate new objects 212 into the structural aspect 210, or to delete existing objects 212 from the structural aspect.

The adaptive recommendations function 240 may also be extended to scan and evaluate structural subsets 280 that have special characteristics. For example, the adaptive recommendations function 240 may suggest that certain of the structural subsets that have been evaluated are candidates for special designation. This may include being a candidate for becoming a new specially designated sub-system or structural subset. The adaptive recommendations function 240 will suggest to human users or experts the structural subset 280 that is suggested to become a new sub-system or structural subset, along with existing sub-system or structural subsets that are deemed to be "closest" in relationship to the new suggested structural subset. A human user or expert may then be invited to add the object or objects 212, and may manually create relationships 214 between the new object and existing objects.

As another alternative, the adaptive recommendations function 240, optionally in conjunction with the system structure maintenance functions, may automatically generate the object or objects 212, and may automatically generate the relationships 214 between the newly created object and other objects 212 in the structural aspect 210.

This capability is extended such that the adaptive recommendations function 240, in conjunction with system structure maintenance functions, automatically maintains the structural aspect and identified structural subsets 280. The adaptive recommendations function 240 may not only identify new objects 212, generate associated objects 212, and generate associated relationships 214 among the new objects 212 and existing objects 212, but also identify objects 212 that are candidates for deletion. The adaptive recommendations function 240 may also automatically delete the object 212 and its associated relationships 214.

In this way the adaptive recommendations function 240, optionally in conjunction with a system structure maintenance function, may automatically adapt the structural aspect 210 of the adaptive system 100, whether on a periodic or continuous basis, so as to optimize the user experience.

In some embodiments, each of the automatic steps listed above with regard to updating the structural aspect 210 may be employed interactively by human users and experts as desired.

Hence, the adaptive recommendations function 240, driven in part by usage behaviors, automatically or semi-automatically updates the system structural aspect 210 (see dotted arrow 245 in FIG. 1). The feedback loop is closed as user interactions with the adaptive system 100 are influenced by the structural aspect 210, providing an adaptive, self-reinforcing feedback loop between the usage aspect 230 and the structural aspect 210.

Automatic or Semi-Automatic System Content Maintenance

As shown in FIG. 1, the adaptive recommendations function 240 may provide the ability to automatically or semi-automatically update the content aspect 230 of the adaptive system 100 (see dotted arrow 246). Examples of content that may be updated include text, animation, audio, video, tutorials, manuals and interactive applications; reviews and brief descriptions of the content may also be updated. Customized text or multi-media content suitable for online viewing or printing may be generated. U.S. patent application Ser. No. 10/715,174 entitled "A Method and System for Customized Print Publication and Management" discloses relevant approaches for updating the content aspect 230 and is incorporated here in its entirety by reference.

The adaptive recommendations function 240 may operate automatically, performing in the background and updating the content aspect 230 independently of human intervention. Or, the adaptive recommendations function 240 may be used by users 200 or special experts who rely on the adaptive recommendations 250 to provide guidance in maintaining the content aspect 230.

As in the case of the structural aspect 210, different communities may also be used to model the maintenance of the content aspect 230. The communities, affinity groups, and user segments are used to adapt the relevancies and to create, alter or delete relationships 214 between the objects 212. The adaptive recommendations 250 may present the objects 212 to the user 200 in a different combination than initially may have been inputted and may treat sections of a larger object such as a document, book or manual as multiple objects that can be recombined in a pattern that is aligned with community usage, by creating or altering relationships between sections.

In addition, as user feedback on system activities and usage behavioral patterns 248 is accumulated, the adaptive system 100 may suggest areas where extra content would be beneficial to users. For example, if the object 212 is frequently rated by users 200 as difficult to understand, or if only expert users in a community are accessing the object, the adaptive system 100 may recognize the need for supplemental content (e.g., in the form of documentation or online tutorials or demonstrations).

Hence, as shown in FIG. 1, the adaptive recommendations function 240, driven in part by usage behaviors 270, automatically or semi-automatically updates the content aspect 230. The feedback loop is closed as the interactions of the user 200 with the adaptive system 100 are influenced by updates to the content aspect 230, providing an adaptive, self-reinforcing feedback loop between the usage aspect 210 and the content aspect 230, and, in some embodiments, between the usage aspect 210, the structural aspect 220, and the content aspect 230.

Furthermore, the adaptive system 100 may serve as a "user" of another adaptive system. Recall from FIG. 1 that the one or more users 200 may include a human entity, non-human entities, such as another computer system, or a second adaptive system that interacts with the adaptive system. The second adaptive system is known herein as a virtual user of the adaptive system 100.

Figure 11:
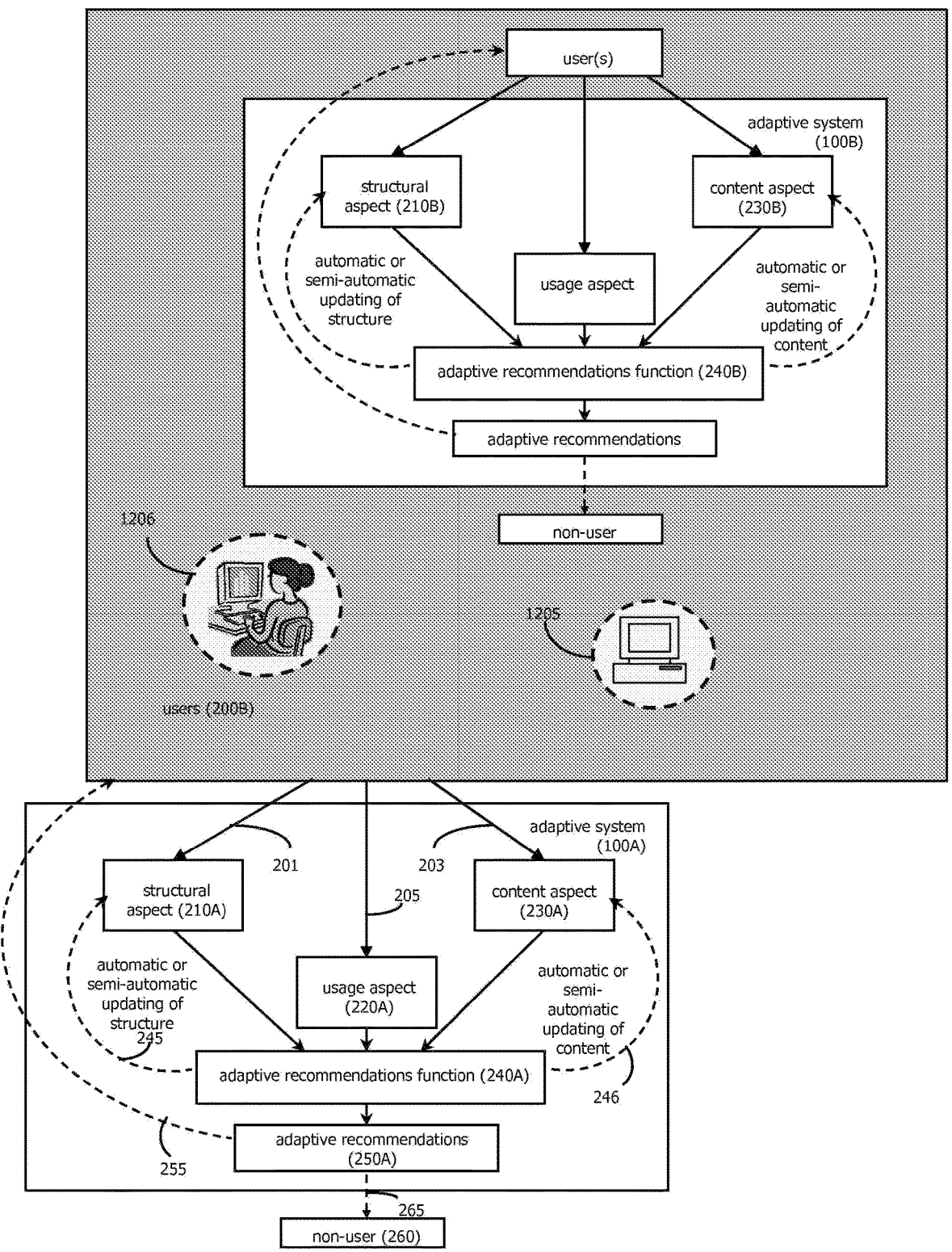
FIG. 11 is a block diagram depicting the different user types supported by the adaptive system of FIG. 1, according to some embodiments.

In FIG. 11, the one or more users 200A of adaptive system 100A have been expanded to include a human user 1206, a non-human user 1205, and a virtual user, adaptive system 100B. Interactions with the adaptive system 100A by each entity 100B, 1205, and 1206 are monitored and used to make preference inferences. The interactions may include any of the usage behaviors 270 listed in Table 1. The interactions with the adaptive system 100A by the virtual user (adaptive system 100B) may come from the adaptive recommendations function 240B of the adaptive system 100B, combined with functions suitable for interactions between the two systems 100A and 100B. The adaptive recommendations function 240A may generate adaptive recommendations 250A to be received by any of the recommendations recipients, the human user 1206, the non-human computer 1205, or the virtual user, the adaptive system 100B.

Where the adaptive system 100B is less "experienced" (relative to the adaptive system 100A), the adaptive recommendations function 240A may serve as a training mechanism for the new adaptive system 100B. Given a distribution of objects 212 and their relationships 214, metrics and usage behaviors 270 associated with scope, subject and other experiential data such as patterns of other adaptive systems, the adaptive recommendations function 240A may automatically begin assimilation of objects 212 into the less experienced adaptive system 100B, possibly with intervention by human users. Clusters of newly assimilated objects 212 may enable inferences resulting in the suggestion of new structural subsets 280, communities; and their associated relationships would also be, in some embodiments, automatically created and updated. Application of mutual training functionality of the adaptive recommendation engine may also be applied when two or more adaptive systems are directly integrated.

Figure 12:
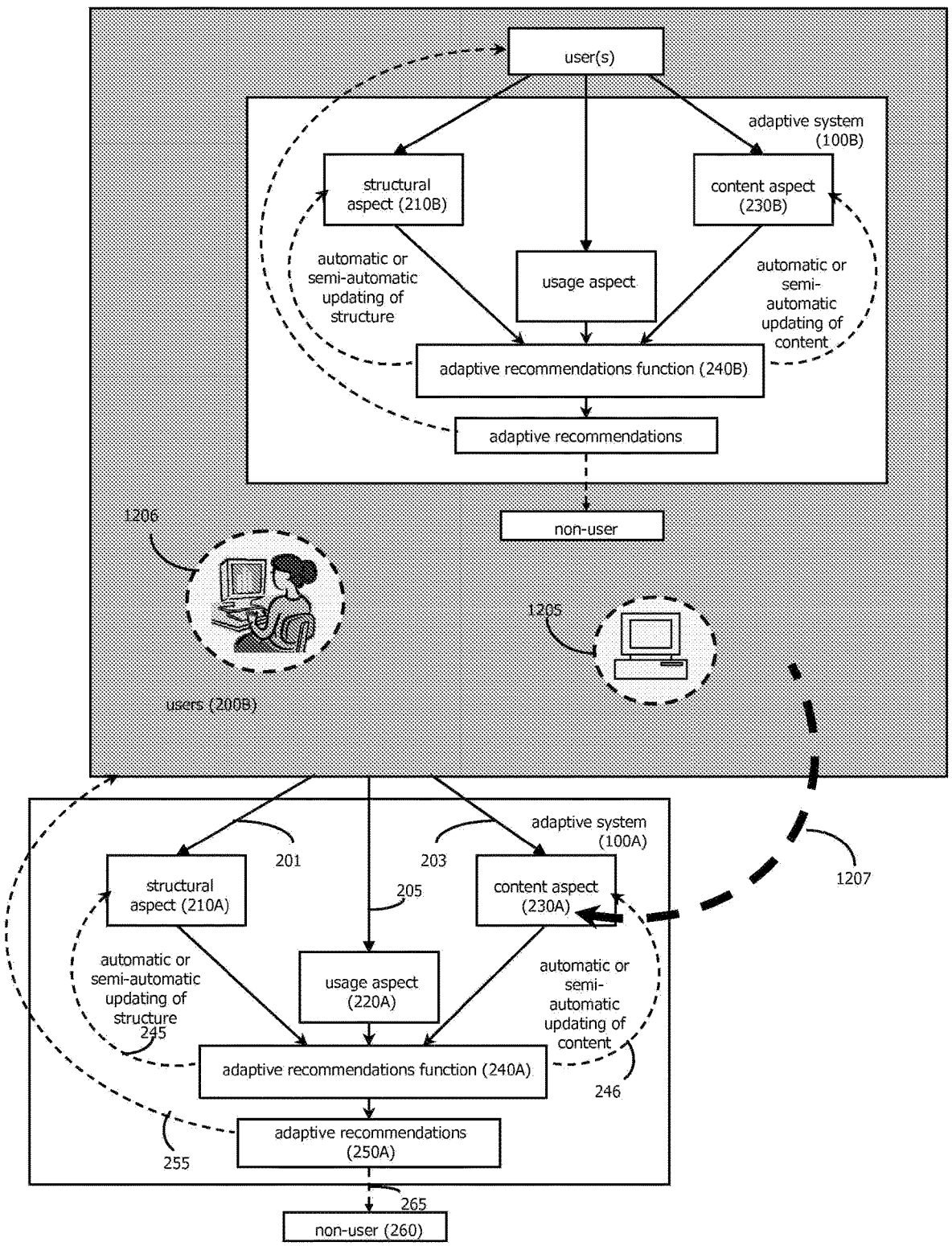
FIG. 12 is a block diagram depicting how users of the adaptive system of FIG. 1 may be associated with the content aspect, according to some embodiments.

The virtual user (adaptive system 100B) may be integrated with human and non-human users, as depicted in FIG. 11, or the virtual user may be segregated from other users 200 of the adaptive system 100, as desired. As in the case of the human user 1206, the virtual user 100B may be explicitly represented as an object 212 within the adaptive system 100A, as shown in FIG. 12. Thus, any of the users 200A, human user 1206, non-human user 1205, or virtual user 100B may be explicitly represented as information 232 within the content aspect 230A (and associated object 212 in the structural aspect 210A) of the adaptive system 100A. In this way, the content aspect 230A may be extended to encompass users 200 of the adaptive system 200A. Thus, the users 200A of the adaptive system 100A are merged, in a representational sense, with the adaptive system itself. The representation of users 200 as being part of the content 230A, as shown in FIG. 12, reflects aspects of social networks and adaptive systems that are beneficially combined.

As with the human user 1206 and the non-human user 1205, virtual users may mutually "use" or interact with one another, as represented by the arrows 201, 203, and 205 leading from the users 200 and the dotted arrow 255 leading from the adaptive recommendations 250A to the users 200B. The mutual interaction between the adaptive systems 100A and 100B enable collective evolution of the structural aspects 210A and 210B and the content aspects 230A and 230B. This principle may be extended to multiple adaptive systems mutually interacting with one another.

The adaptive system 100 is distinguishable from collaborative filtering-based prior art. For example, U.S. Pat. No. 5,790,426, entitled "Automated Collaborative Filtering System" (Robinson) recommends information items based on direct ratings of multiple system users. However, among many other aspects of distinction, the Robinson invention is limited to inferences associated with one type of usage behavior, the direct rating of informational items only, and has no provisions for modifying the system structure or content based on preference inferences.

Network-Based Embodiments

The structural aspect 210 of the adaptive system 100 may be based on a network structure. The structural aspect 210 thus includes two or more objects, along with associated relationships among the objects. Networks, as used herein, are distinguished from other structures, such as hierarchies, in that networks allow potential relationships between any two objects of a collection of objects. In a network, there are not necessarily well-defined parent objects, and associated children, grandchildren, etc., objects, nor a "root" object associated with the entire system, as there would be by definition in a hierarchy. In other words, networks may include cyclic relationships that are not permitted in strict hierarchies. As used herein, a hierarchy can be thought of as just one particular form of a network, with some additional restrictions on relationships among network objects.

The adaptive system 100 is distinguishable from network-based system structures of the prior art. For example, U.S. Pat. No. 6,285,999, entitled "Method for Node Ranking in a Linked Database" (Page), is a linked node search algorithm that presents a ranking of nodes based on the relative level of linkages among the nodes. However, among many other aspects of distinction, the Page invention is limited to non-fuzzy networks, does not generate persistent structural or content modifications, and does not utilize system usage information as does the adaptive system 100. Another example, U.S. Pat. No. 5,875,446, entitled "System and Method for Hierarchically Grouping and Ranking a Set of Objects in a Query Context Based on One or More Relationships" (Brown, et al), delivers a retrieved set of objects from an object base that has potentially non-directed, weighted relationships, and organizes the retrieved objects in a hierarchical structure. However, among many other aspects of distinction, the Brown, et al, invention does not generate persistent structural or content modifications, does not enable delivery of non-hierarchical structures to users, and does not utilize system usage information, as does the adaptive system 100.

The structural aspect 210 of the adaptive system 100 may also have a fuzzy network structure. Fuzzy networks are distinguished from other types of network structures in that the relationships between objects in fuzzy networks may be by degree. In non-fuzzy networks, the relationships between objects are binary. Thus, between any two objects, relationships either exist or they don't exist.

As used herein, a fuzzy network is defined as a network of information in which each individual item of information may be related to any other individual item of information, and the associated relationship between the two items may be by degree. A fuzzy network can be thought of abstractly as a manifestation of relationships among fuzzy sets (rather than classical sets), hence the designation "fuzzy network." As used herein, a non-fuzzy network is a subset of a fuzzy network, in which relationships are restricted to binary values (i.e., relationship either exists or does not exist). Pedrycz and Gomide, Introduction to Fuzzy Sets: Analysis and Design, 1998 provide additional background regarding fuzzy sets.

Generalizing further, both classical networks and fuzzy networks may have a-directional (also called non-directed) or directed links between nodes. Four network topologies are listed in Table 2.

TABLE 2

Network Topologies

| network type | links between nodes | link type |
|---|---|---|
| type i (classical) | binary | a-directional |
| type ii (classical) | binary | distinctly directional |
| type iii (fuzzy) | multi-valued | a-directional |
| type iv (fuzzy) | multi-valued | distinctly directional |

The first two types (i and ii) are classical networks. Fuzzy networks, as used herein, are networks with topologies iii or iv.

For each of the four network topologies listed in Table 2, another possible variation exists: whether the network allows only a single link or multiple links between any two nodes, where the multiple links may correspond to multiple types of links. For example, the fuzzy network types (iii and iv) of Table 2 may permit multiple directionally distinct and multi-valued links between any two nodes in the network. The adaptive system 100 encompasses any of the network topologies listed in Table 2, including those which allow multiple links and multiple link types between nodes.

The relationship among nodes in a fuzzy network may be described most generally by an affinity matrix. For a network with N nodes, $n_1 \ldots n_i$, for integer i, the affinity matrix will have N rows and columns. Each cell of the matrix contains a number from 0 to 1 that describes the relationship between the associated two nodes, $n_a$ and $n_b$, $1 \leq a, b \leq i$. For classic networks (topology i or ii), each cell of the affinity matrix contains either a 0 or a 1; for fuzzy networks (topology iii or iv), each cell, when normalized, contains a number between 0 and 1, inclusive. If the network allows multiple types of links between any two nodes, then each type of link will have a corresponding affinity matrix associated therewith.

It is instructive to review networks that are familiar and their associated topologies. For example, the World Wide Web, which has been much studied, is generally thought of as a directionally distinct, binary link network (topology ii). In other words, either a web page has a link to another web page or it does not, and the link between the web page and the other web page has a particular direction. (Although there may be multiple links between two web pages, the links are not different in link type, in that they do not have distinctive relationship meanings. The brain, on the other hand, seems to be a fuzzy network, and the links between neurons seem to be generally directionally distinct (Laughlin and Sejnowski, Communication in Neuronal Networks, Science, September 2003). Social networks also seem to be fuzzy networks, and the links among people may sometimes be modeled as a-directional, but more descriptively may be modeled as directionally distinct.

Mathematically, for a non-fuzzy network, it can be said, without loss of generality, that a relationship translates to either a "0" or a "1"-"0," for example if there is not a relationship, and "1" if there is a relationship. For fuzzy networks, the relationships between any two nodes, when normalized, may have values along a continuum between 0 and 1 inclusive, where 0 implies no relationship between the nodes, and 1 implies the maximum possible relationship between the nodes. Fundamentally then, fuzzy networks can provide more information about the relationship among network nodes than can non-fuzzy networks.

Figure 13A:
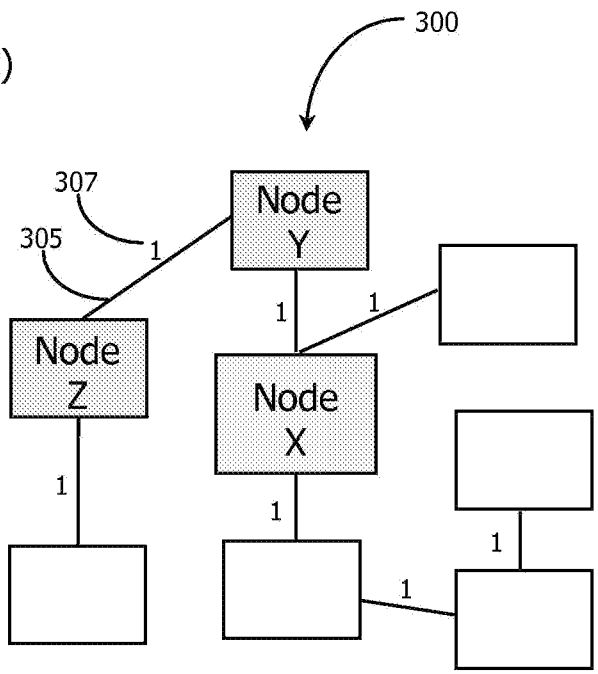
FIGS. 13A and 13B are block diagrams of non-fuzzy, non-directed network system structures with single or multiple relationship types, according to the prior art.

FIG. 13A depicts a non-fuzzy, a-directional network 300 (topology i) according to the prior art, in which up to one relationship type between nodes is possible. Two nodes, Node Y and Node Z have a relationship 305, as designated by the line between the two nodes. The relationship 305 is assumed to be bi-directional, as there is not sufficient information in a non-directed relationship to assume otherwise. The value of the relationship is represented by the relationship indicator 307. For Node Z and Node X, there is no direct relationship, and therefore no line or associated relationship indicator between the two nodes. Alternatively, a line could be drawn between Node Z and Node X, with an associated relationship indicator of "0" to represent a null relationship between the two nodes.

Figure 13B:
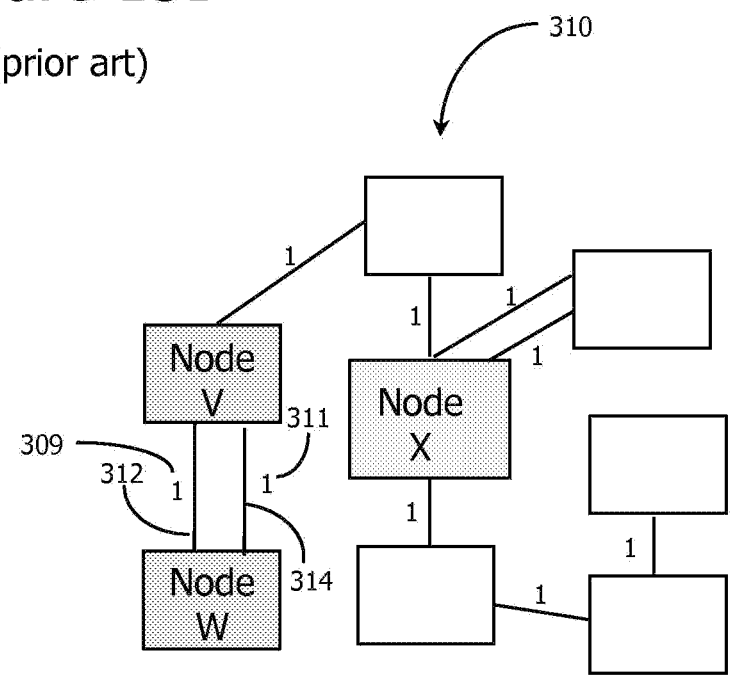

FIG. 13B depicts a non-fuzzy a-directional network 110 (topology i) according to the prior art, in which multiple relationship types between at least two nodes in the network is possible. Two distinct types of relationships 312 and 314 are shown between Node V and Node W. A relationship 309 (having a value of "1") is associated with the relationship type 312 while a relationship 311 (having a value of "1") is associated with the relationship type 314. Again, where no relationship exists between two nodes, such as Node X and Node W, a line with an associated relationship value of "0" may be included in the diagram.

Figure 14A:
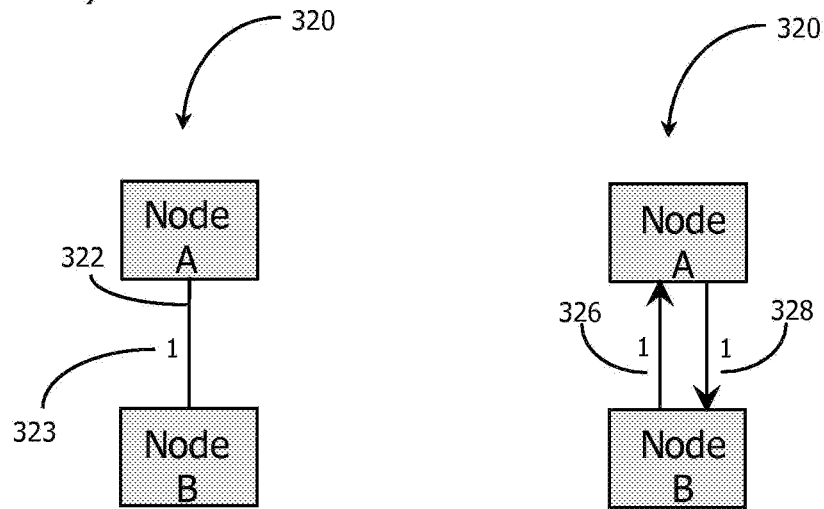
FIG. 14A is a block diagram illustrating alternative representations of a non-fuzzy, non-directed network system structure, according to the prior art.

FIG. 14A illustrates how a non-fuzzy, and thus implicitly bi-directional relationship, may be decomposed into two separate directed relationships (topologies i and ii), according to the prior art. In the two-node network 320, there exists a relationship 322 between Node A and Node B, with a corresponding relationship indicator 323 with a value of "1." The same network 320 can be alternatively depicted as having two directed relationships, relationship 326 and relationship 328 between Node A and Node B, with corresponding relationship indicators optionally shown and set to "1," by definition.

Figure 14B:
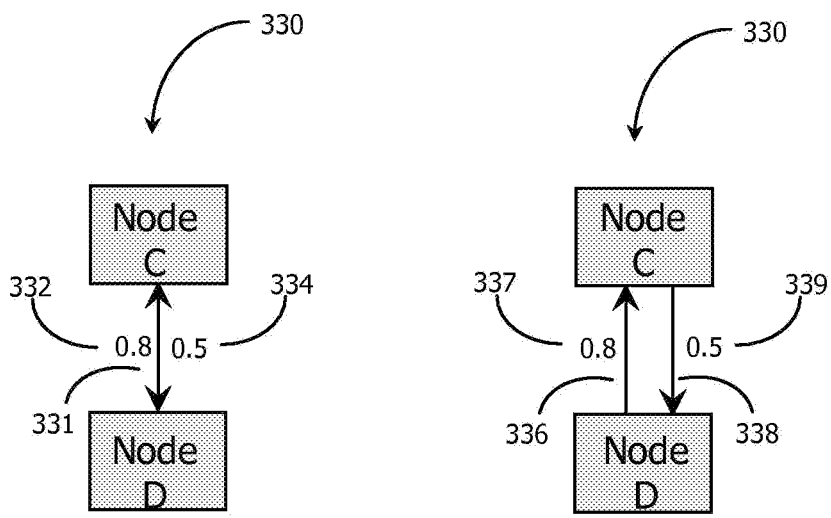
FIG. 14B is a block diagram illustrating alternative representations of a fuzzy, directed network system structure, according to the prior art.

FIG. 14B illustrates the same alternative representations of bi-directional relationships for fuzzy networks (topologies iii and iv), according to the prior art. Fuzzy network 330 is comprised of two nodes, Node C and Node D, and a relationship designator 331 between the two nodes. The relationship is bi-directional, as signified by the dual arrows associated with 331, and with an asymmetry of relationship between the two nodes, as indicated by the distinct and unequal relationship indicators 332 and 334 associated with 331. An alternative representation of the same fuzzy network 330 decomposes relationship 331 into two separate directionally distinct relationship designators 336 and 338, with associated relationship indicators 337 and 339.

Figure 15A:
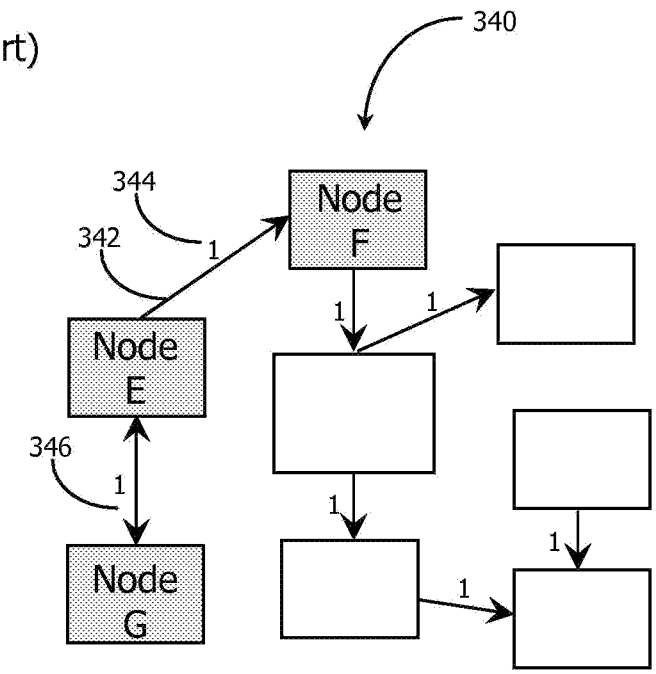
FIGS. 15A and 15B are block diagrams of non-fuzzy, directed network system structures with single or multiple relationship types according to the prior art.
Figure 15B:
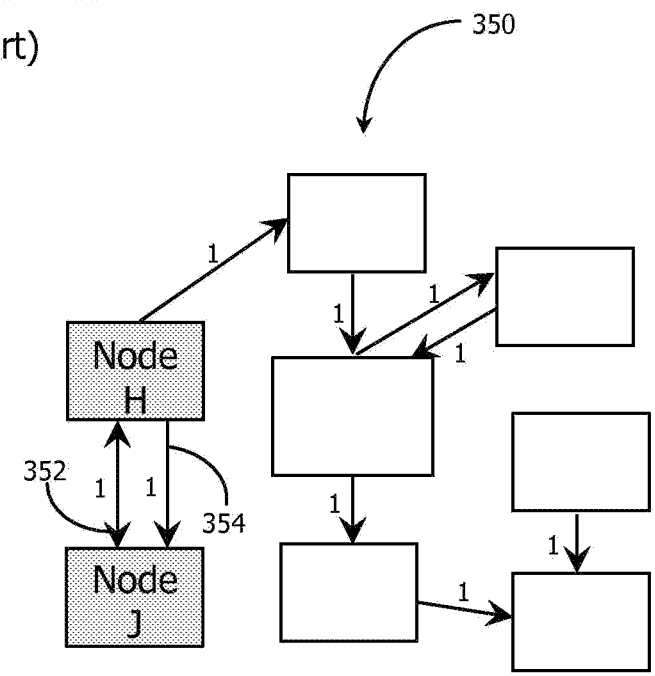

FIGS. 15A and 15B depict a directed, non-fuzzy analog to the non-directed, non-fuzzy network examples illustrated by FIGS. 13A and 13B, according to the prior art. FIG. 15A depicts a non-fuzzy, non-directed network 340 (topology i). A uni-directional directed relationship 342 is shown going from Node E to Node F, with an associated relationship indicator 344. Relationship indicators are by definition "1" for any non-null relationship in a non-fuzzy network and need not therefore in general be explicitly shown as they are in FIG. 15A. Relationship 346 depicts a bi-directional relationship between Node E and Node G.

FIG. 15B depicts a directed, non-fuzzy network 350 with multiple relationship types between at least two nodes in the network (topology ii), according to the prior art. As an example, two distinct types of relationships 352 and 354 are shown between Node H and Node J.

Figure 16A:
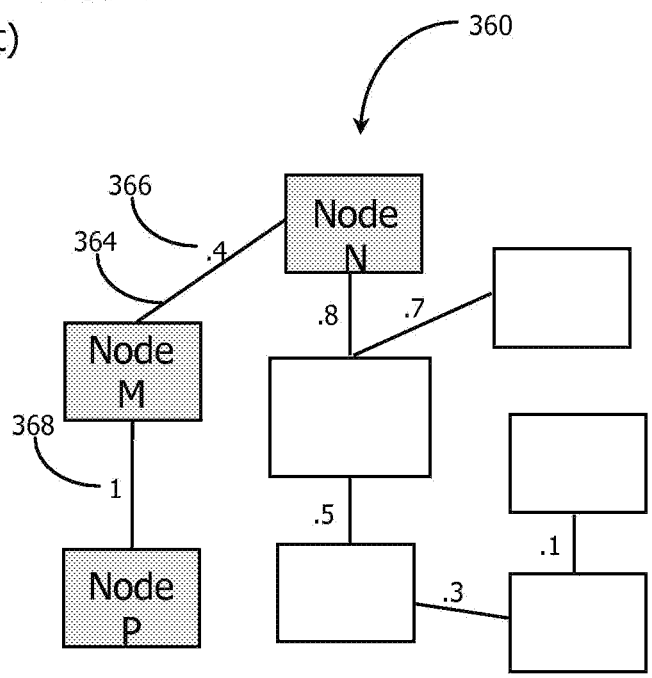
FIGS. 16A and 16B are block diagrams of fuzzy, non-directed network system structures with single or multiple relationship types according to the prior art.
Figure 16B:
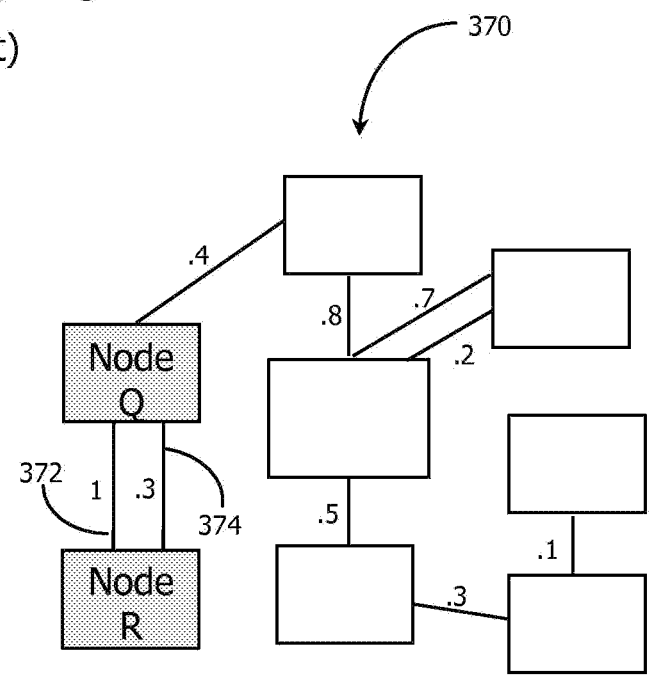

FIGS. 16A and 16B depict a-directional fuzzy networks (topology iii), according to the prior art. The network 360 in FIG. 13A includes a relationship 364 between Node M and Node N that has an associated relationship indicator 366 with a value of 0.4. A different relationship indicator 368 is included between Node M and Node P. The relationship indicator 368 has a value of "1," indicating the closest possible relationship (e.g., the identity relationship) between nodes. FIG. 16B also depicts an a-directional fuzzy network 370, this time with multiple relationship types between at least two nodes. Two distinct types of relationships 172 and 174 are shown between Node Q and Node R.

Figure 17A:
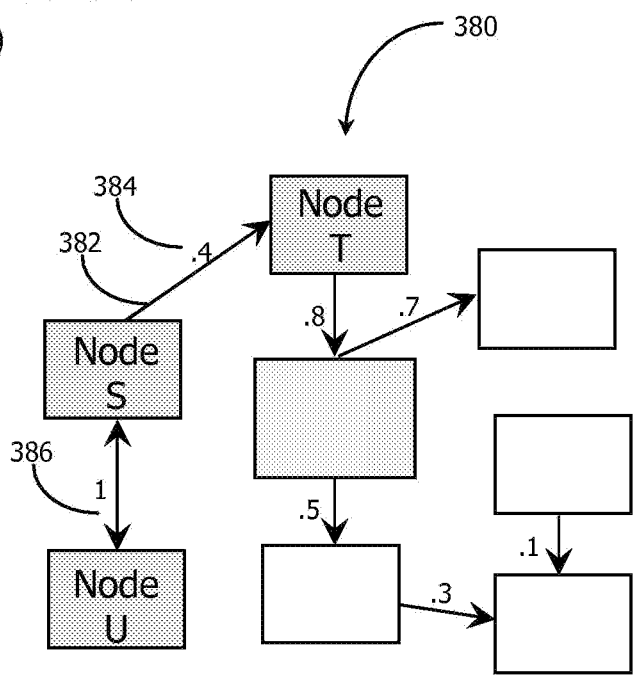
FIGS. 17A and 17B are block diagrams of fuzzy, directed network system structures with single or multiple relationship types according to the prior art.
Figure 17B:
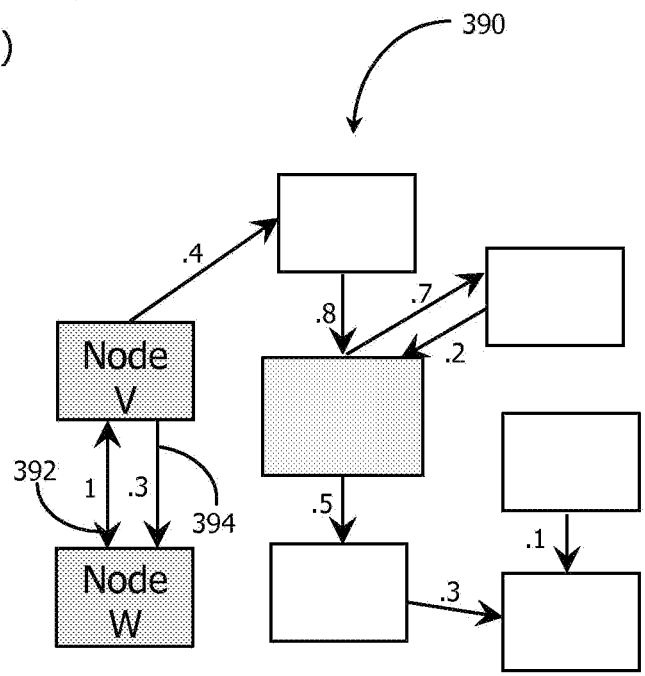

FIGS. 17A and 17B depict directed fuzzy networks (topology iv), according to the prior art. The network 380 in FIG. 14A includes a relationship 382 between Node S and Node T that has an associated relationship indicator 384. A different relationship indicator 386 between Node S and Node U depicts a situation where the relationship value and associated indicator may equal "1," meaning, depending on context, the closest possible relationship (e.g., the identity relationship). FIG. 17B depicts a non-directed fuzzy network 390 with multiple relationship types between at least two nodes in the network. As an example, two distinct types of relationships 392 and 394 are shown between Node V and Node W.

The structural aspect 210 of the adaptive system 100 of FIG. 1 may support any of the network topologies described above. A-directional relationships between nodes (no arrows), directed relationships between nodes (whether single- or double-arrow), and multiple types of relationships between nodes, are supported by the adaptive system 100. Further, relationship indicators which are binary (e.g., 0 or 1) or multi-valued (e.g., range between 0 and 1) are supported by the adaptive system.

It can readily be seen that a hierarchy may be described as a directed fuzzy network with the additional restrictions that the relationship values and indicators associated with each relationship must be either "1" or "0" (or the symbolic equivalent). Further, hierarchies do not support cyclic or closed relationship paths.

Although the network structures and variations described herein are represented in the accompanying figures by a network pictorial style, it should be understood that some embodiments may use alternative representations of network structures. These representations may include affinity matrices, as described herein, tabular representations, vector representations, or functional representations. Furthermore, the network operators and algorithms described herein may operate on any of these representations, or on combinations of network representations.

Figure 18:
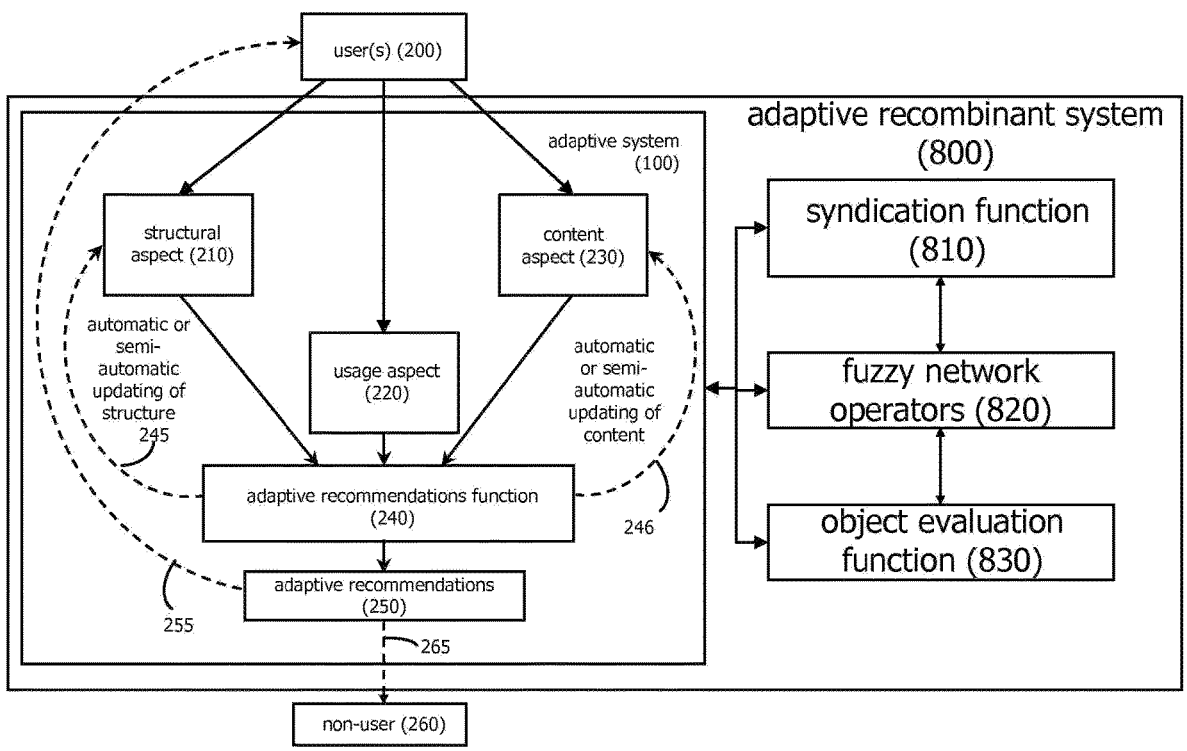
FIG. 18 is a block diagram of an adaptive recombinant system, according to some embodiments.
Figure 19:
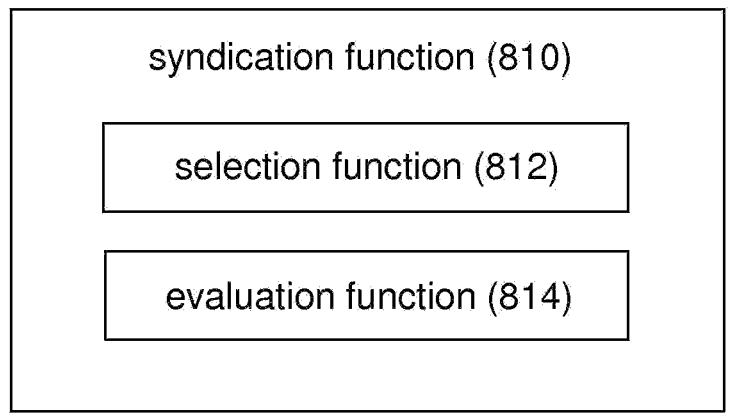
FIG. 19 is a block diagram of the syndication function used by the adaptive recombinant system of FIG. 18, according to some embodiments.

In FIG. 18, according to some embodiments, an adaptive recombinant system 800 is depicted. The adaptive recombinant system 800 includes the adaptive system 100 of FIG. 1, as well as a syndication function 810, a fuzzy network operators function 820, and an object evaluation function 830. The adaptive recombinant system is capable of syndicating and recombining structural subsets 280. The structural subsets 280 may be derived through either direct access of the structural aspect 210 by the fuzzy network operators function 820, or the structural subsets 280 may be generated by the adaptive recommendations function 240. The adaptive recombinant system 800 of FIG. 18 is capable of syndicating (sharing) and recombining the structural subsets, whether for display to the user 200 or non-user 260, or to update the structural aspect 210 and/or the content aspect 230 of the adaptive system 100. In addition, these functions are capable of updating multiple adaptive systems, or aiding in the generation of a new adaptive system.

The syndication function 810 may syndicate elements of the usage aspect 220 associated with syndicated structural subsets 280, thus enabling elements of the usage clusters and patterns, along with the corresponding structural subsets, to be combined with other structural subsets and associated usage clusters and patterns.

As explained above, the structural aspect 210 of the adaptive system 100 employs a network structure, and is not restricted to a particular type of network. In some embodiments, the adaptive recombinant system 800 operates on an adaptive system in which the structural aspect 210 is a fuzzy network. The structural subsets 280 generated by the adaptive recombinant system 800 during syndication or recombination are likewise fuzzy networks in these embodiments, and are also called adaptive recombinant fuzzy networks. Recall that a structural subset is a portion or subset of the structural aspect 210 of the adaptive system 100. The structural subset 280 may include a single or multiple objects, and their associated relationships.

Generalized Network Degrees of Separation

The notion of the degree of separation among nodes in non-fuzzy networks is well known. Degrees of separation may be employed as a metric to describe a "neighborhood" within a network. The degree of separation between any two nodes is defined as the shortest path between the two nodes. For networks with directionally distinct relationships between nodes, the shortest path between any two nodes may be specified to adhere to a specific directional orientation.

Figure 21:
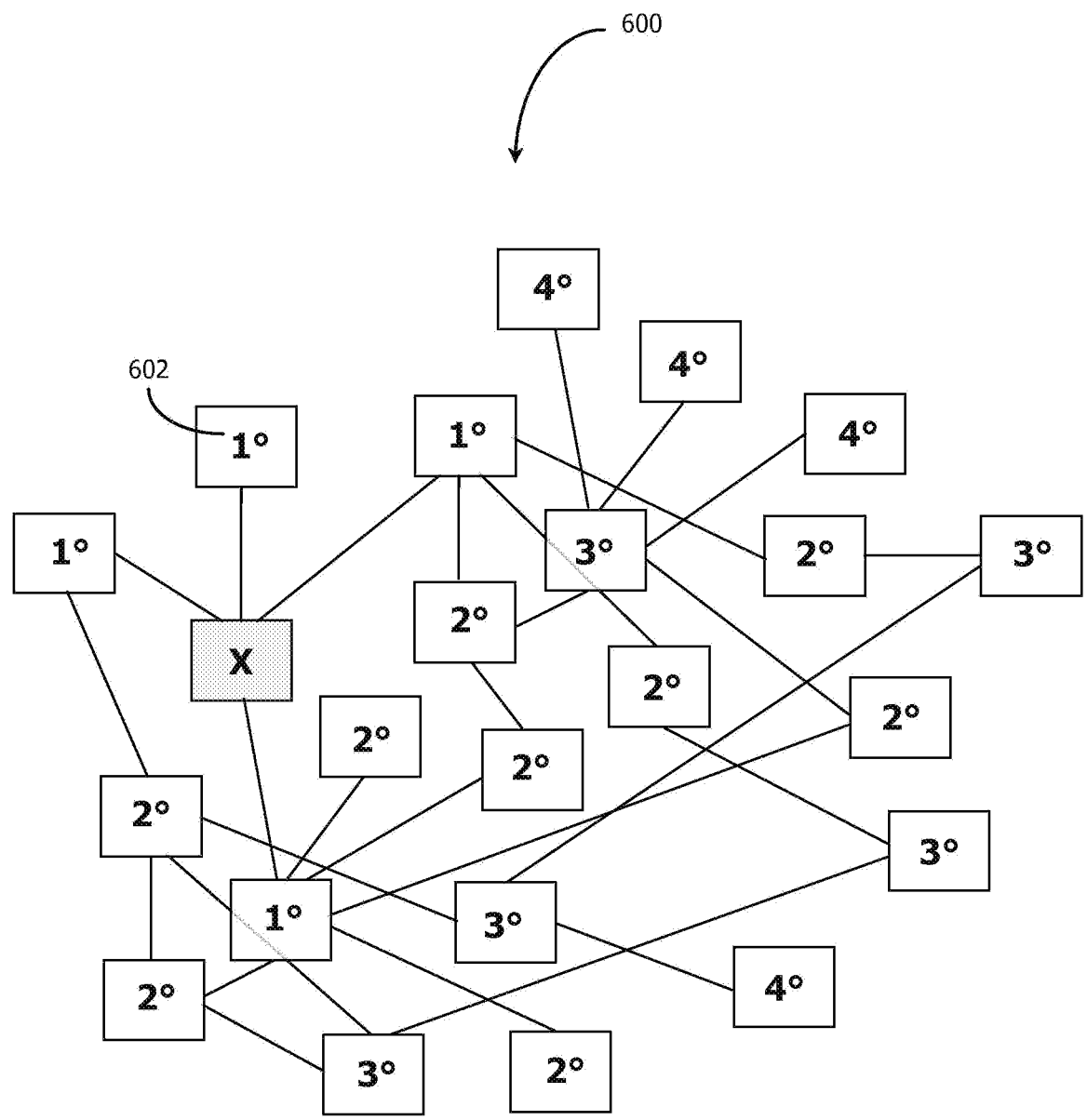
FIG. 21 is a block diagram illustrating degrees of separation between nodes in a non-fuzzy network, according to the prior art.

A node can be thought of as having a zeroth degree of separation with itself. The node has a first degree of separation from other nodes to which it is directly connected. The node has a second degree of separation from the nodes that are directly connected to first degree of separation nodes and are not already more closely separated, and so on. FIG. 21 depicts a non-fuzzy, a-directional network 600 and the associated degrees of separation 602 from Node X, according to the prior art.

The notion of degrees of separation of non-fuzzy networks is extended to fuzzy networks in the adaptive system 100. Fractional degrees of separation among nodes may be attributed to fuzzy networks. The degree of separation between the two nodes can be defined as:

$$(\text{scaling factor} + (1 - \text{affinity}_{ij}))$$

for a given affinity level, affinity$_{ij}$, where 0<affinity$_{ij}$ ≤0.1, for Node i and Node j, and where 1 is the strongest possible relationship, excluding the identity relationship, and 0 implies no direct relationship. "Scaling factor" is a number between 0 and 1 chosen to normalize the degrees of separation for the fuzzy network consistent with the specific definition and distributions of the affinities between nodes in the fuzzy network.

For example, if an affinity of 1.0 is defined as the identity function, then the scaling factor could be set to 0 so that the degree of separation of an affinity of 1.0, the identity degree of separation, is defined as 0. Alternatively, if an affinity of 0 is defined as no relationship whatsoever, then the degree of separation should logically be greater than 1.0, so the scaling factor may be chosen as a number up to and including 1.0.

The scaling factor may be a function of the specific distribution of the intensity level of affinities in a fuzzy network. These intensities may be linear across the range of 0 and 1, or may be nonlinear. If, for example, the mean intensity is defined at 0.5, then the scaling factor for the fractional degree of separation calculation could be set at 0.5.

In summary, for fuzzy networks, the general case of "distance" relationship between two directly linked nodes is a fractional degree of separation. More generally, the degree of separation between any two nodes in a fuzzy network is defined as the minimum of the degrees of separation (which may be calculated on the basis of a specific directional orientation of relationships among the nodes) among all possible paths between the two nodes, where the degrees of separation between any two nodes along the path may be fractional. Where a network has multiple relationships between nodes, multiple potentially fractional degrees of separation may be calculated between any two nodes in the network.

Figure 22:
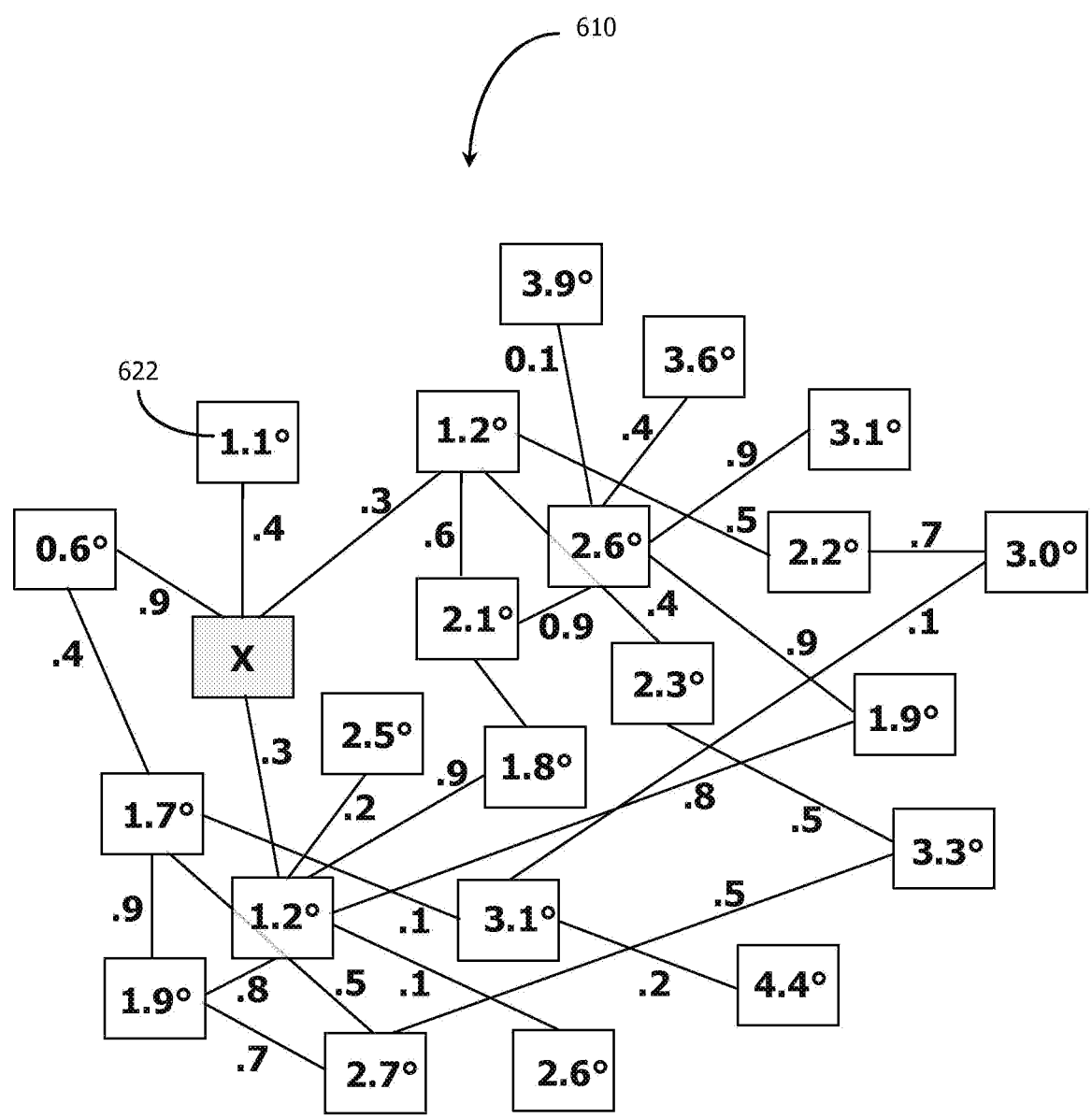
FIG. 22 is a block diagram illustrating fractional degree of separation of nodes in a fuzzy network, according to some embodiments.

For convenience, the term fractional degrees of separation may be shortened to the acronym "FREES" (FRactional degrEEs of Separation)—as in, say, "Node X is 2.7 FREES from Node Y." FIG. 22 represents a fuzzy, a-directional network 610 and the associated degrees of separation 622 (using a scaling factor of 0.5) from Node X.

The degree of separation within the fuzzy or non-fuzzy network may be calculated and displayed on demand for any two nodes in the network. All nodes within a specified degree of separation of a specified node may be calculated and displayed. Optionally, the associated fractional degrees of separation between the base node and the nodes within the specified fractional degrees of separation may be displayed.

Figure 23:
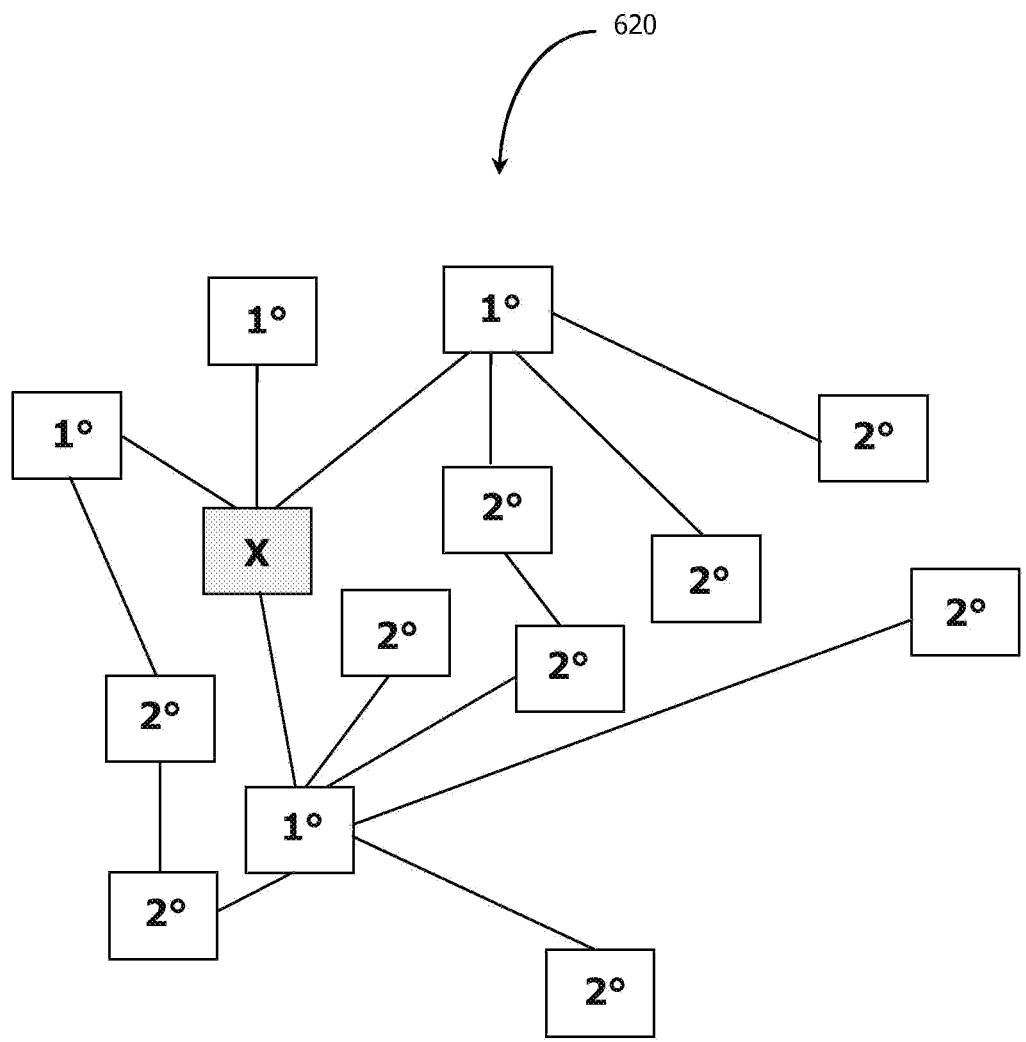
FIG. 23 is a block diagram illustrating a network subset based on fractional degree of separation selection criteria in the non-fuzzy network of FIG. 21, according to the prior art.
Figure 24:
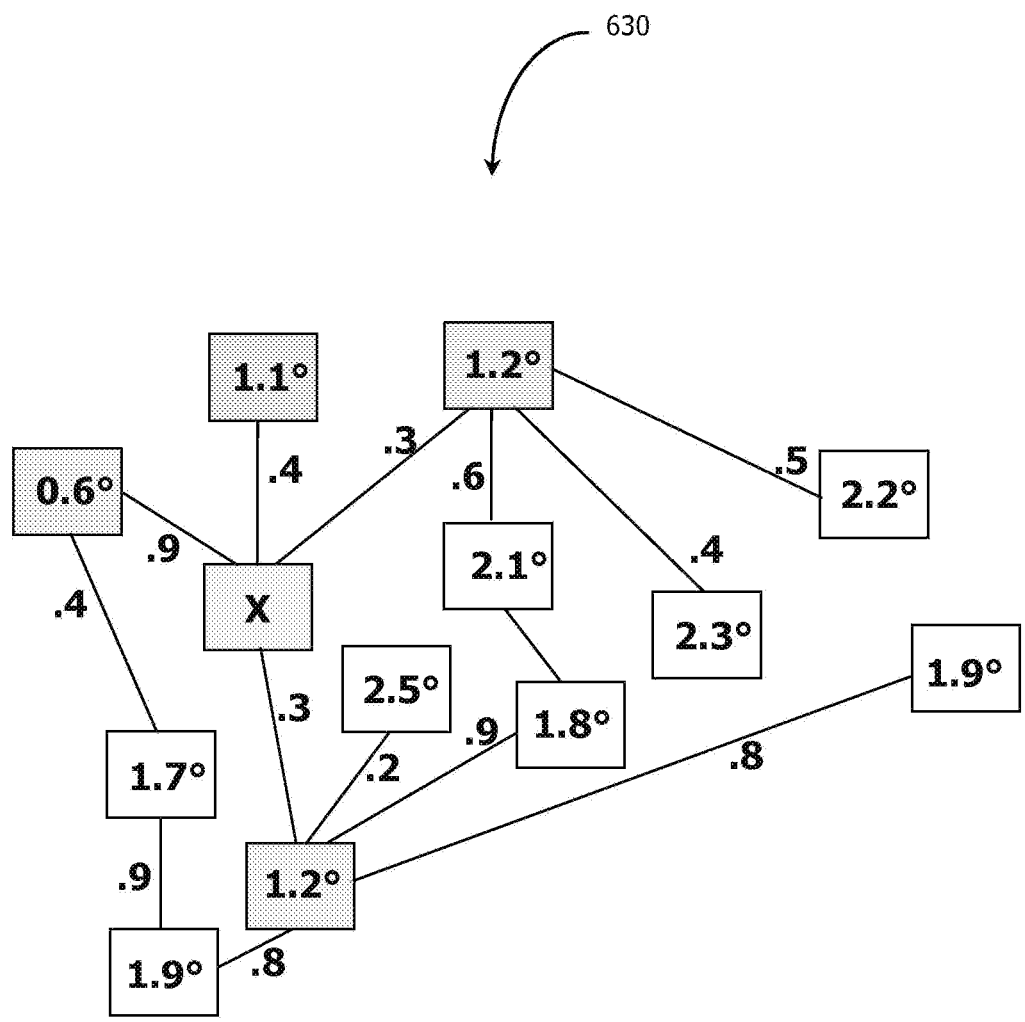
FIG. 24 is a block diagram illustrating a network subset based on fractional degree of separation selection criteria in the fuzzy network of FIG. 22, according to some embodiments.

FIG. 23 depicts a subset 620 of the non-fuzzy a-directional network 600 of FIG. 21, according to the prior art, where the subset 620 is defined as all nodes within two degrees of separation of Node X. FIG. 24 depicts a subset 630 of the fuzzy a-directional network 610 of FIG. 22, according to some embodiments, where the subset 630 is defined as all nodes within 2.5 degrees of separation of Node X.

The degrees of separation among nodes in a fuzzy network may be described by a fractional degrees-of-separation (FREES) matrix. For a network with N nodes, $n_1 \ldots n_{un}$, the degree-of-separation matrix will have N rows and columns. Each cell of the matrix contains a number that describes the degree of separation between the associated two nodes, $i_n$ and $n_0$. For non-fuzzy networks, each cell will contain an integer value; for fuzzy networks each cell of the FREES matrix may contain non-integer values. For both fuzzy and non-fuzzy networks, the diagonal of the affinity matrix will be 0's—the identity degree of separation. If a fuzzy network is described by multiple affinity matrices, then the multiple affinity matrices correspond on a one-to-one basis with multiple associated FREES matrices.

The degrees of separation for networks with multiple relationship types, whether for fuzzy or non-fuzzy networks, may be calculated as a function across some or all of the relationship types. For example, such a function could be the minimum of degree of separation from Node X to Node Y of all associated relationship types, or the function could be an average, or any other relevant mathematical function.

According to some embodiments, the adaptive recombinant system 800 of FIG. 18 employs fractional degrees of separation in its syndication and recombination operations, as described in more detail, below.

Fuzzy Network Subsets and Adaptive Operators

The adaptive recombinant system 800 of FIG. 18 includes fuzzy network operators 820. The fuzzy network operators 820 may manipulate one or more fuzzy or non-fuzzy networks. Some of the operators 820 may incorporate usage behavioral inferences associated with the fuzzy networks that the operators act on, and therefore these operators may be termed "adaptive fuzzy network operators." The fuzzy network operators 820 may apply to any fuzzy network-based system structure, including fuzzy content network system structures, described further below.

Figure 20:
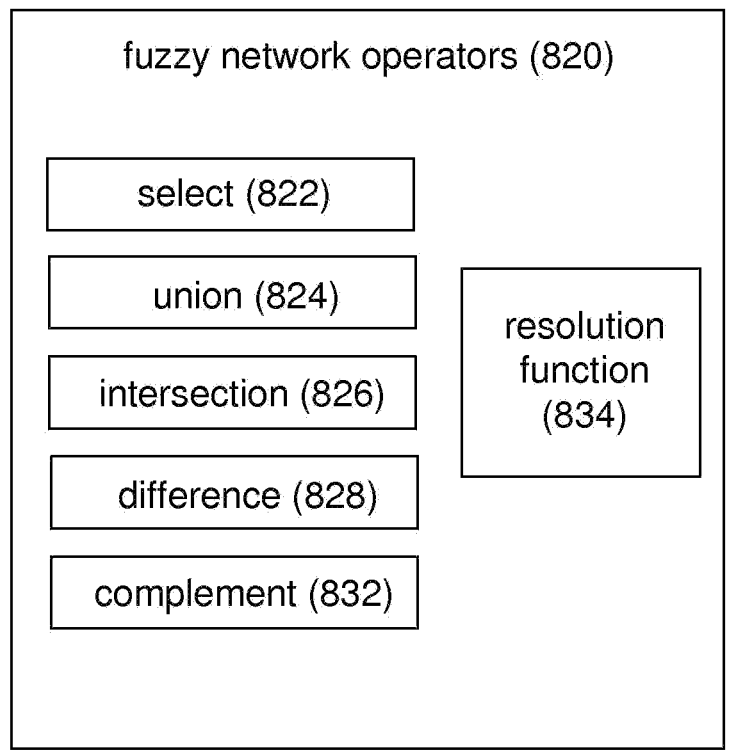
FIG. 20 is a block diagram of the fuzzy network operators used by the adaptive recombinant system of FIG. 18, according to some embodiments.

FIG. 20 is a block diagram depicting some fuzzy network operators 820, also called functions or algorithms, used by the adaptive recombinant system 800. A selection operator 822, a union operator 824, an intersection operator 826, a difference operator 828, and a complement operator 832 are included, although additional logical operations may be used by the adaptive recombinant system 800. Additionally, the fuzzy network operators 820 include a resolution function 834, which is used in conjunction with one or more of the operators in the fuzzy network operators 820.

A selection operator 822, which selects subsets of networks, may designate the selected network subsets based on degrees of separation. For example, subsets of a fuzzy network may be selected from the neighborhood, designated by a FREES metric, around a given node, say Node X. The selection may take the form of selecting all nodes within the designated network neighborhood, or all the nodes and all the associated links as well within the designated network neighborhood, where the network neighborhood is defined as being within a certain degree of separation from Node X. A non-null fuzzy network subset will therefore contain at least one node, and possibly multiple nodes and relationships.

Two or more fuzzy network subsets may then be operated on by network operations such as union, intersection, difference, and complement, as well as any other Boolean set operators. An example is an operation that outputs the intersection (intersection operator 826) of the network subset defined by the first degree or less of separation from Node X and the network subset defined by the second or less degree of separation from Node Y. The operation would result in the set of nodes and relationships common to these two network subsets, with special auxiliary rules optionally applied to resolve duplicative relationships as will be explained below.

The network operations may apply explicitly to fractional degrees of separation. For example, the union operator 824 may be applied to the network subset defined by half a degree of separation (0.5) or less from Node X and the network subset defined as 2.4 degrees of separation or less from Node Y. The union of the two network subsets results in a unique set of nodes and relationships that are contained in both of these network subsets. Special auxiliary rules may optionally be applied to resolve duplicative relationships. Fuzzy network operations may also be chained together, e.g., a union of two network subsets intersected with a third network subset, etc.

The fuzzy network operators 820 may have special capabilities to resolve the situation in which union 824 and intersection 826 operators define common nodes, but with differing relationships or values of the relationships among the common nodes. The fuzzy network intersection operator 826, Fuzzy_Network_Intersection, may be defined as follows:

$$Z = \text{Fuzzy\_Network\_Intersection}(X, Y, W)$$

where X, Y, and Z are network subsets and W is the resolution function 834. The resolution function 834 designates how duplicative relationships among nodes common to fuzzy network subsets X and Y are resolved.

Specifically, the fuzzy network intersection operator 826 first determines the common nodes of network subsets X and Y, to form a set of nodes, network subset Z. The fuzzy network intersection operator 826 then determines the relationships and associated relationship value and indicators uniquely deriving from X among the nodes in Z (that is, relationships that do not also exist in Y), and adds them into Z (attaching them to the associated nodes in Z). The operator then determines the relationships and relationship indicators and associated values uniquely deriving from Y (that is, relationships that do not also exist in X) and applies them to Z (attaching them to the associated nodes in Z).

For relationships that are common to X and Y, the resolution function 834, is applied. The resolution function 834 may be any mathematical function or algorithm that takes the relationship values of X and Y as arguments, and determines a new relationship value and associated relationship indicator.

The resolution function 834, Resolution_Function may be a linear combination of the corresponding relationship value of X and the corresponding relationship value of Y, scaled accordingly. For example:

$$\text{Resolution\_Function}(X_{RV}, Y_{RV}) = (c_1 * X_{RV} + c_2 * Y_{RV}) / (c_1 + c_2)$$

where $X_{RV}$ and $Y_{RV}$ are relationship values of X and Y, respectively, and $c_1$ and $c_2$ are coefficients. If $c_1=1$, and $c_2=0$, then $X_{RV}$ completely overrides $Y_{RV}$. If $c_1=0$ and $c_2=1$, then $Y_{RV}$ completely overrides $X_{RV}$. If $c_1=1$ and $c_2=1$, then the derived relationship is a simple average of $X_{RV}$ and $Y_{RV}$. Other values of $c_1$ and $c_2$ may be selected to create weighted averages of $X_{RV}$ and $Y_{RV}$. Nonlinear combinations of the associated relationships values, scaled appropriately, may also be employed.

The Fuzzy_Network_Union operator 824 may be derived from the Fuzzy_Network_Intersection operator 826, as follows:

$$Z = \text{Fuzzy\_Network\_Union}(X, Y, W)$$

where X, Y, and Z are network subsets and W is the resolution function 834. Accordingly, $$Z = \text{Fuzzy\_Network\_Intersection}(X, Y, W) + (X-Y) + (Y-X)$$

That is, fuzzy network unions of two network subsets may be defined as the sum of the differences of the two network subsets (the nodes and relationships that are uniquely in X and Y, respectively) and the fuzzy network intersection of the two network subsets. The resulting network subset of the difference operator contains any unique relationships between nodes uniquely in an originating network subset and the fuzzy network intersection of the two subsets. These relationships are then added to the fuzzy network intersection along with all the unique nodes of each originating network subset, and all the relationships among the unique nodes, to complete the resulting fuzzy network subset.

It should be noted that, unlike the corresponding classic set operators, the fuzzy network intersection 826 and union 824 operators are not necessarily mathematically commutative—that is, the order of the operands may matter. The operators will be commutative if the resolution function or algorithm is commutative.

For the adaptive recombinant system 800, the resolution function 834 that applies to operations that combine multiple networks may incorporate usage behavioral inferences related to one or all of the networks. The resolution function 834 may be instantiated directly by the adaptive recommendations function 240 (FIG. 18), or the resolution function 834 may be a separate function that invokes the adaptive recommendations function. The resulting relationships in the combined network will therefore be those that are inferred by the system to best reflect the collective usage histories and preference inferences of the predecessor networks.

For example, where one of the predecessor networks was used by larger numbers of individuals, or by individuals that members of communities or affinity groups that are inferred to be best informed on the subject of the associated content, then the resolution function 834 may choose to preferentially weight the relationships of that predecessor network higher versus the other predecessor networks. The resolution function 834 may use any or all of the usage behaviors 270, along with associated user segmentations and affinities obtained during usage behavior pre-processing 204 (see FIG. 3C), as illustrated in FIG. 8 and Table 1, and combinations thereof, to determine the appropriate resolution of common relationships and relationship values among two or more networks that are combined into a new network.

Fuzzy Network Metrics

Special metrics may be used to measure the characteristics of fuzzy networks and fuzzy network subsets. For example, these metrics may provide measures associated with the relationship of a network node or object to other parts of the network, and relative to other network nodes or objects. A metric may be provided that indicates the degree to which nodes are connected to the rest of the network. This metric may be calculated as the sum of the affinities of first degree or less separated directionally distinct relationships or links. The metric may be called a first degree connectedness parameter for the specific node.

The first degree connectedness metric may be generalized for zeroth to $N^{th}$ degrees of connectedness as follows. The zeroth degree of connectedness is, by definition, zero. The $N^{th}$ degree of connectedness of Node X is the sum of the affinities among all nodes within N degrees of separation of Node X. For fuzzy networks, N may not necessarily be an integer value. The connectedness parameters may be indexed to provide a convenient relative metric among all other nodes in the network.

As an example, in the fuzzy network 630 of FIG. 24, the first degree of connectedness of Node X is determined by summing all relationship values associated with Node X to objects within a fractional degree of separation, defined here as less than 1.5 degrees of separation. Four nodes which have less than 1.5 degrees of separation from Node X are shaded in FIG. 24. By summing the affinities of the four nodes (0.9+0.4+0.3+0.3), a connectedness metric of 1.9 for Node X is obtained.

In networks in which there are multiple types of relationships among nodes, there may be multiple connectedness measures for any specific Node X to the subset of the fuzzy network specified by a degree of separation, N, from X.

In summary, connectedness for a specific Node X may have variations associated with relationship type, the specified directions of the relationships selected for computation, and the degree of separation from the Node X. The general connectedness metric function may be defined as follows:

$$\text{Connectedness}(\text{Node } X, T, D, S)$$

where T is the relationship indicator type, D is the relationship direction, and S is the degree of separation. The Connectedness metric may be normalized to provide a convenient relative measure by indexing the metric across all nodes in a network.

A metric of the popularity of the network nodes or objects, or popularity metric, may also be provided. The fuzzy or non-fuzzy network may be implemented on a computer system, or on a network of computer systems such as the Internet or on an Intranet. The system usage behavioral patterns of users of the fuzzy network may be recorded. The number of accesses of particular nodes or objects of a fuzzy to non-fuzzy network may be recorded. The accesses may be defined as the actual display of the node or object to the user or the accesses may be defined as the display of information associated with the node or object to user, such as access to an associated editorial review. In some of these embodiments, the popularity metric may be based on the number of user accesses of the associated node or object, or associated-information. The popularity metric may be calculated for prescribed time periods. Popularity may be recorded for various user segments, in addition to, or instead of, the usage associated with the entire user community. The usage traffic may be stored so that popularity trends over time may be accessed. In the most general case, popularity for a specific Node X will have variations by user segments and time periods. A general popularity function may therefore be represented as follows:

Popularity(Node $X$,user segment,time period)

The Popularity metric may be normalized to provide a convenient relative measure by indexing the metric across all nodes in a network.

Metrics may be generated that go beyond the connectedness metrics, to provide information on additional characteristics associated with a node or object within the network relative to other nodes or objects in the network. A metric that combines aspects of connectedness and popularity measures, an influence metric, may be generated. The influence metric may provide a sense of the degree of importance or "influence" a particular node or object has within the fuzzy network.

The influence metric for Node X is calculated by adding the popularity of Node X to a term that is the sum of the popularities of the nodes or objects separated by one degree of separation or less from Node X, weighted by the associated affinities between Node X and each associated related node. The term associated with the weighted average of the popularities of the first degree of separation nodes of Node X is scaled by a coefficient. This coefficient may be defined as the inverse of the first degree connectedness metric of Node X.

For fuzzy networks with directionally distinct relationships and affinities, the influence metric may be calculated based only on the first degree affinities or less for relationships that are oriented in a particular direction. For example, influence may be calculated based on all relationships directed to Node X (as opposed to those directed away from Node X).

A generalized influence metric may also be provided, where the $N^{th}$ degree of influence of node or object X is defined as the popularity of Node X added to a term that is the weighted average of the popularities of all nodes within N degrees of separation from Node X (where N may be a non-integer, implying a fractional degree of separation). The weights for each node may be a function of the affinities of the shortest path between Node X and the associated node. The generalized influence metric may be a multiplicative function, that is, the affinities along the path from Node X to each node within N degrees separation are multiplied together and then multiplied by the popularity of the associated node. Or, the metric may be a summation function, or any other mathematical function that combines the affinities along the associated network path. The generalized influence metric may be specified as a recursive function, satisfying the following difference equations and "initial condition":

(1) Nth Degree of Influence(Node X)=(N−1)th Degree of Influence(Node X)+Influence of Nodes of N Degrees of Separation from Node X. (1)

(2) Zeroth Degree of Influence(Node X)=Popularity (Node X)

Where there are directionally distinct affinities, the affinities that are multiplied, summed, or otherwise mathematically operated on, between Node X and all other nodes within a directionally distinct degree of separation (where the degree of separation may be fractional), may be of relationships with a selected directional orientation. The relationship direction term (D, in the connectedness metric function, above, may be scaled by the $N^{th}$ degree of connectedness (of a given directional orientation) of Node X.

The zeroth degree of influence may be defined as just the popularity of Node X. The $N^{th}$ degree of influence is indexed to enable convenient comparison of influence among nodes or objects in the network. Where there are multiple types of relationships between any two nodes in the network, influence may be calculated for each type of relationship. An influence metric may also be generated that averages (or applies any other mathematical function that combines values) across multiple influence metrics associated with two or more relationship types.

Figure 25:
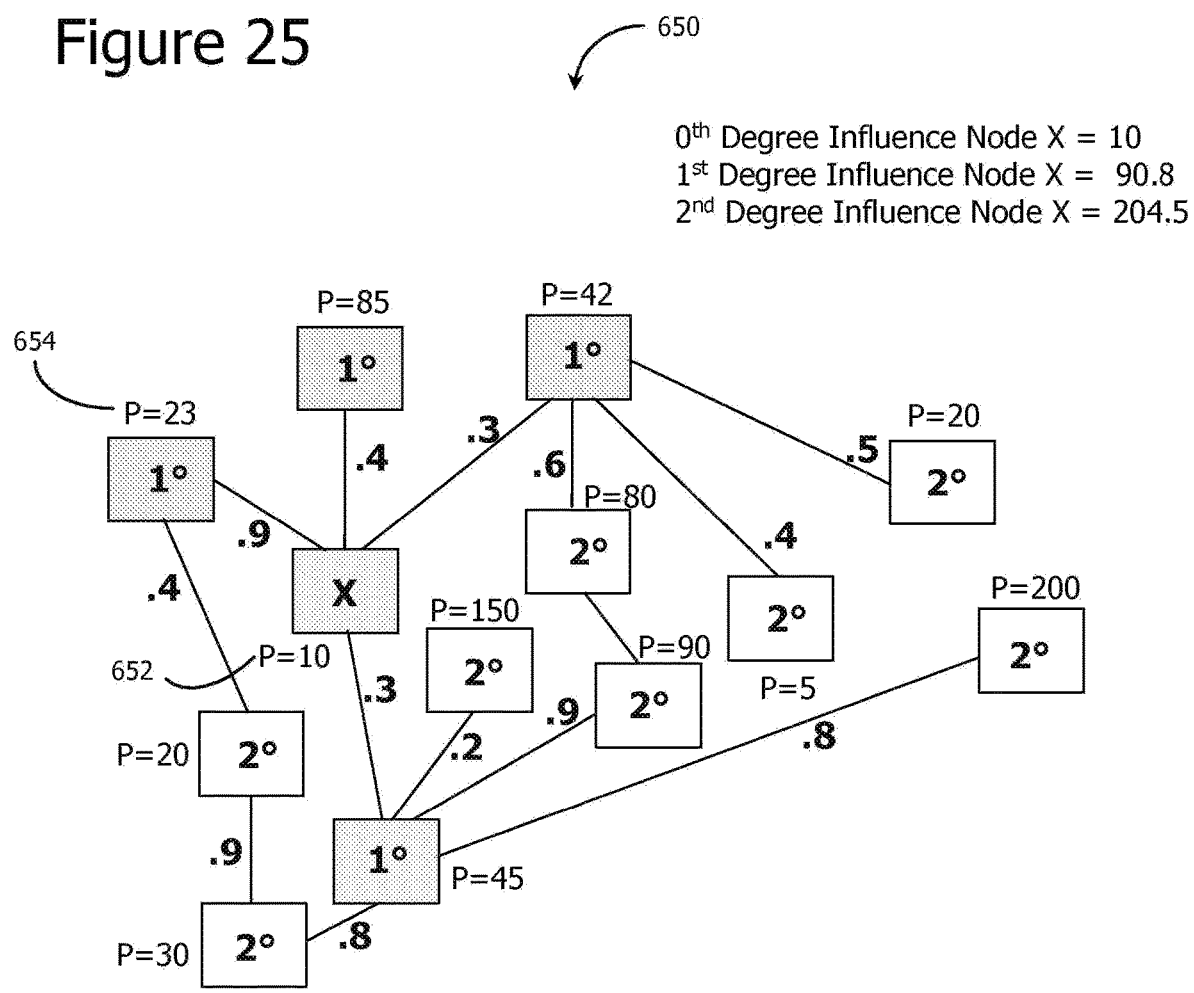
FIG. 25 is a block diagram illustrating a fuzzy network metric of influence for designated neighborhoods based on fractional degrees of separation according to some embodiments.

FIG. 25 illustrates an example of influence calculations, using a multiplicative scaling method, in accordance with some embodiments. Fuzzy network 650 depicts Node X having a popularity metric 652 of "10". The zeroth degree of influence of Node X is therefore just "10." The first degree of influence of Node X is calculated by multiplying the affinities or relationship indicators associated with relationships from Node X and nodes that are within one degree of separation, by the associated popularities, for example 654, of these nodes. The first degree of influence of Node X is thus the popularity of Node X (10) plus the sum of the popularities of the nodes within one degree of separation, multiplied by their associated relationship values. In FIG. 25, the first degree of influence of Node X is:

10+(45*0.3)+(23*0.9)+(85*0.4)+(42*0.3)=90.8

The second degree of influence of Node X is calculated as the first degree of influence of Node X (already calculated) plus the influence contributed by each node that is two degrees of separation from Node X, and may likewise be calculated, as follows:

90.8+(20*0.4*0.9)+(30*0.8*0.3)+(150*0.2*0.3)+
(80*0.6*0.3)+(90*0.9*0.3)+(−5*0.4*0.3)+
(20*0.5*0.3)+(200*0.8*0.3)=204.5

Table 3 lists the first degree affinities, second degree affinities, popularity, calculated influence, and cumulative influence, relative to Node X, for the fuzzy network 650 of FIG. 25.

TABLE 3

Affinity, popularity, & influence data for fuzzy network 650.

| Node | $1^{st}$ ° affinities | $2^{nd}$ ° affinities | popularity | influence | cum. influence |
|---|---|---|---|---|---|
| $0^{th}$ | 1 | | 10 | 10 | 10 |
| $1^{st}$ | 0.4 | | 85 | 34 | |
| $1^{st}$ | 0.9 | | 23 | 20.7 | |
| $1^{st}$ | 0.3 | | 42 | 12.6 | |
| $1^{st}$ | 0.3 | | 45 | 13.5 | 90.8 |
| $2^{nd}$ | 0.9 | 0.4 | 20 | 7.2 | |
| $2^{nd}$ | 0.3 | 0.8 | 30 | 7.2 | |
| $2^{nd}$ | 0.3 | 0.2 | 150 | 9 | |

TABLE 3-continued

Affinity, popularity, & influence data for fuzzy network 650.

| Node | 1st ○ affinities | 2nd ○ affinities | popularity | influence | cum. influence |
|---|---|---|---|---|---|
| $2^{nd}$ | 0.3 | 0.9 | 90 | 24.3 | |
| $2^{nd}$ | 0.3 | 0.8 | 200 | 48 | |
| $2^{nd}$ | 0.3 | 0.5 | 20 | 3 | |
| $2^{nd}$ | 0.3 | 0.4 | 5 | 0.6 | |
| $2^{nd}$ | 0.3 | 0.6 | 80 | 14.4 | 204.5 |

In summary, the influence metric for Node X may have variations associated with a specific relationship indicator type, a specific direction of relationships for the relationship indicator type, a degree of separation from Node X, and a scaling coefficient that tunes the desired degradation of weighting for nodes and relationships increasingly distant from Node X. The metric function may therefore be represented as follows:

Influence (Node X, relationship indicator type or types, relationship direction, degree of separation, affinity path function, scaling coefficient). The influence metric may be normalized to provide a convenient relative measure by indexing the metric across all nodes in a network. Metrics associated with nodes of fuzzy networks, such as popularity, connectedness, and influence, may be displayed in textual or graphical forms to users of the fuzzy network-based system. The adaptive recombinant system 800 of FIG. 18 may use connectedness, popularity, and influence metrics in order to syndicate and recombine structural subsets 280 of the adaptive system 100.

Fuzzy Network Syndication and Combination

The adaptive recombinant system 800 of FIG. 18 is able to syndicate and combine structural subsets 280 of the structural aspect 210 (where a structural subset 280 may contain the entire structural aspect 210). The structural subsets 280, which are fuzzy networks, in some embodiments, may be syndicated in whole or in part to other computer networks, physical computing devices, or in a virtual manner on the same computing platform or computing network. Although the adaptive recombinant system 800 is not limited to generating structural subsets which are fuzzy networks, the following figures and descriptions, used to illustrate the concepts of syndication and recombination, feature fuzzy networks. Designers of ordinary skill in the art will recognize that the concepts of syndication and recombination may be generalized to other types of networks.

Figure 26:
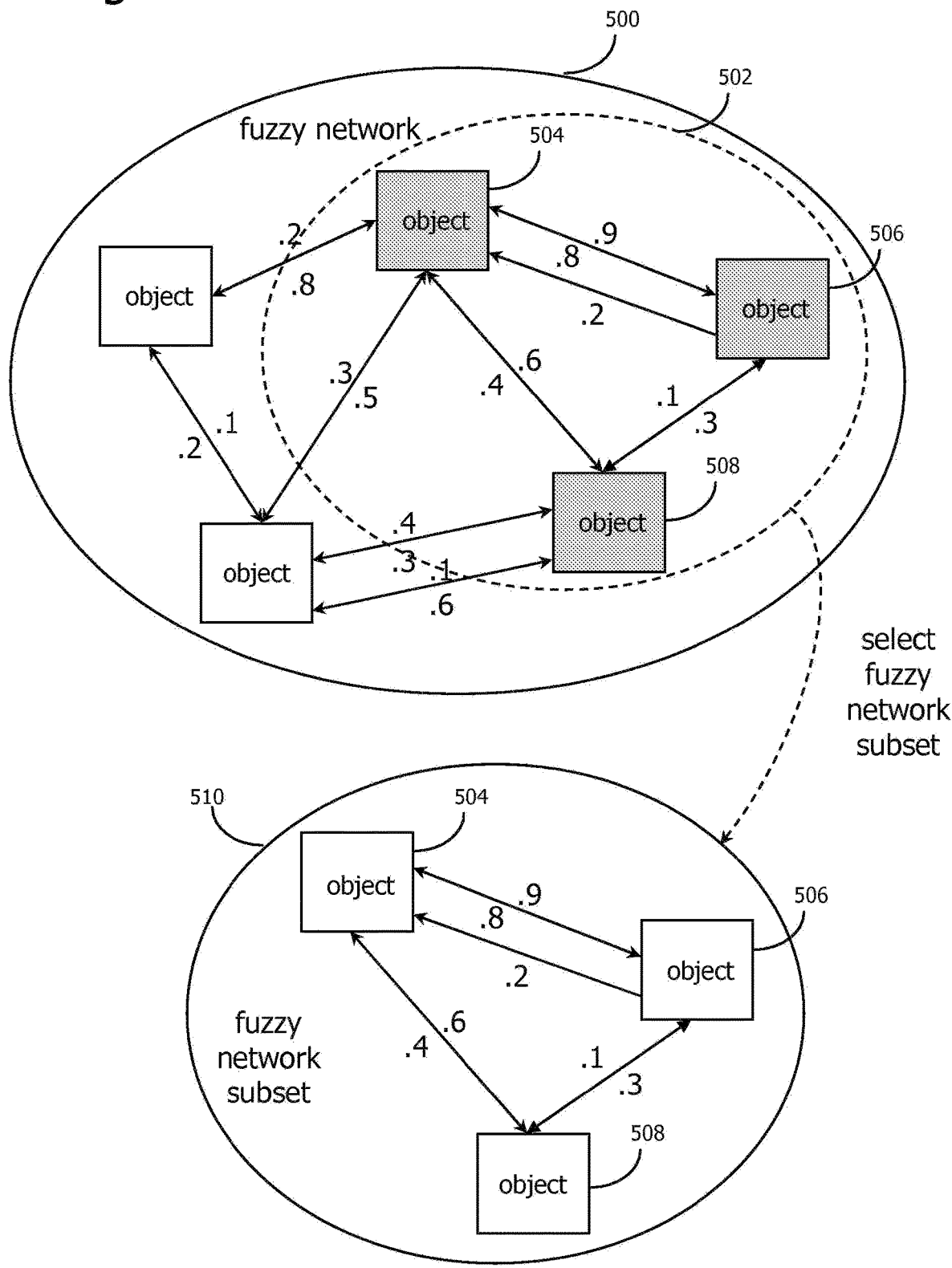
FIG. 26 is a block diagram of a fuzzy network selection operation according to some embodiments.

FIG. 26 illustrates a fuzzy network 500, including a subset 502 of fuzzy network 500. The subset 502 includes three objects 504, 506, and 508, designated as shaded in FIG. 26. The subset 502 also includes associated relationships (arrows) and relationship indicators (values) among the three objects. The separated, or syndicated, subset of the network 502 yields a fuzzy network (subset) 510.

Figure 27:
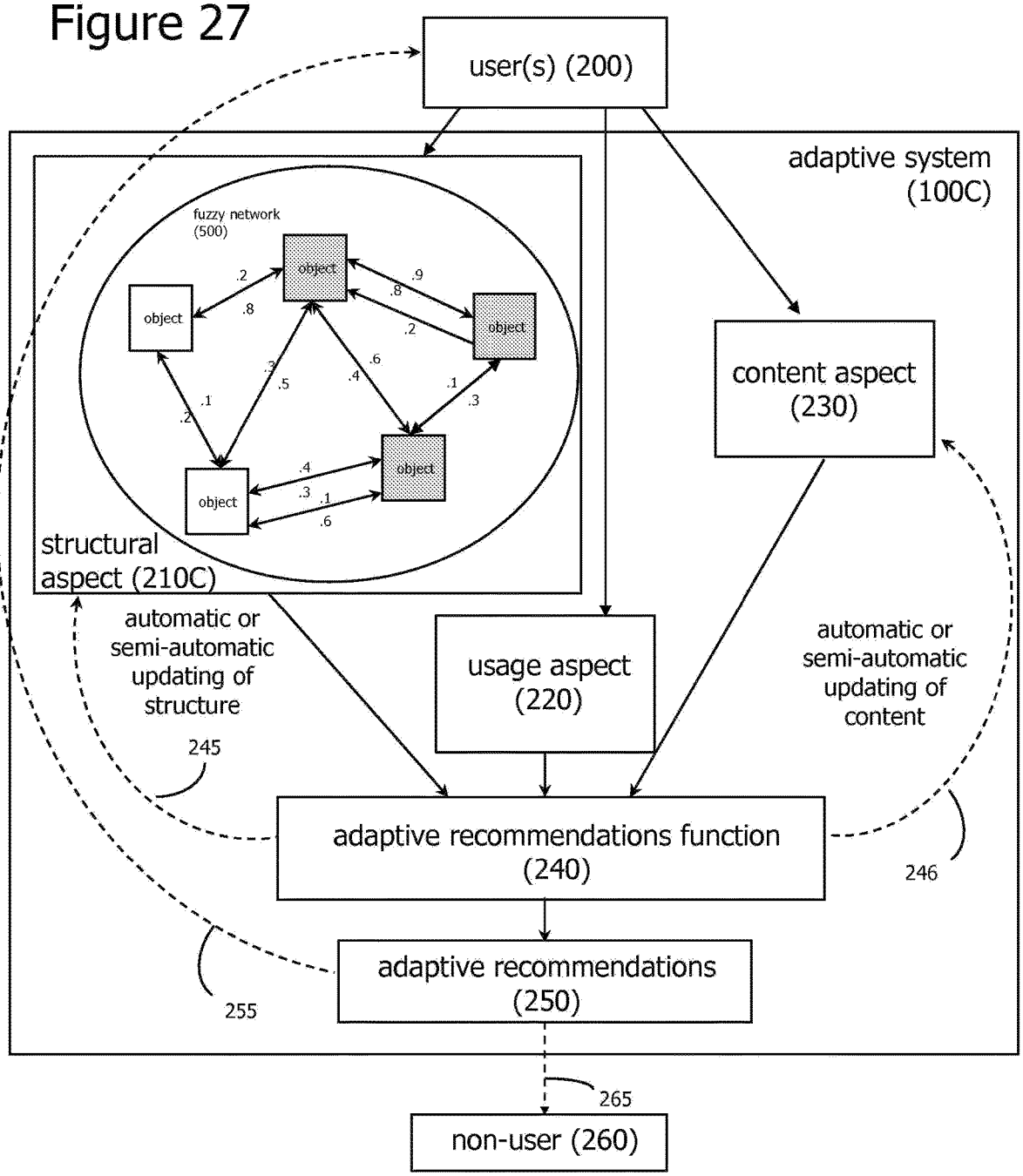
FIG. 27 is a block diagram of the adaptive system of FIG. 1 in which the structural aspect is a fuzzy network, according to some embodiments.

The adaptive system 100 of FIG. 1 may operate in a fuzzy network environment, such as the fuzzy network 500 of FIG. 26. In FIG. 27, an adaptive system 100C includes a structural aspect 210C that is a fuzzy network 500. Thus, adaptive recommendations 250 generated by the adaptive system 100C are also structural subsets that are themselves fuzzy networks.

Figure 28:
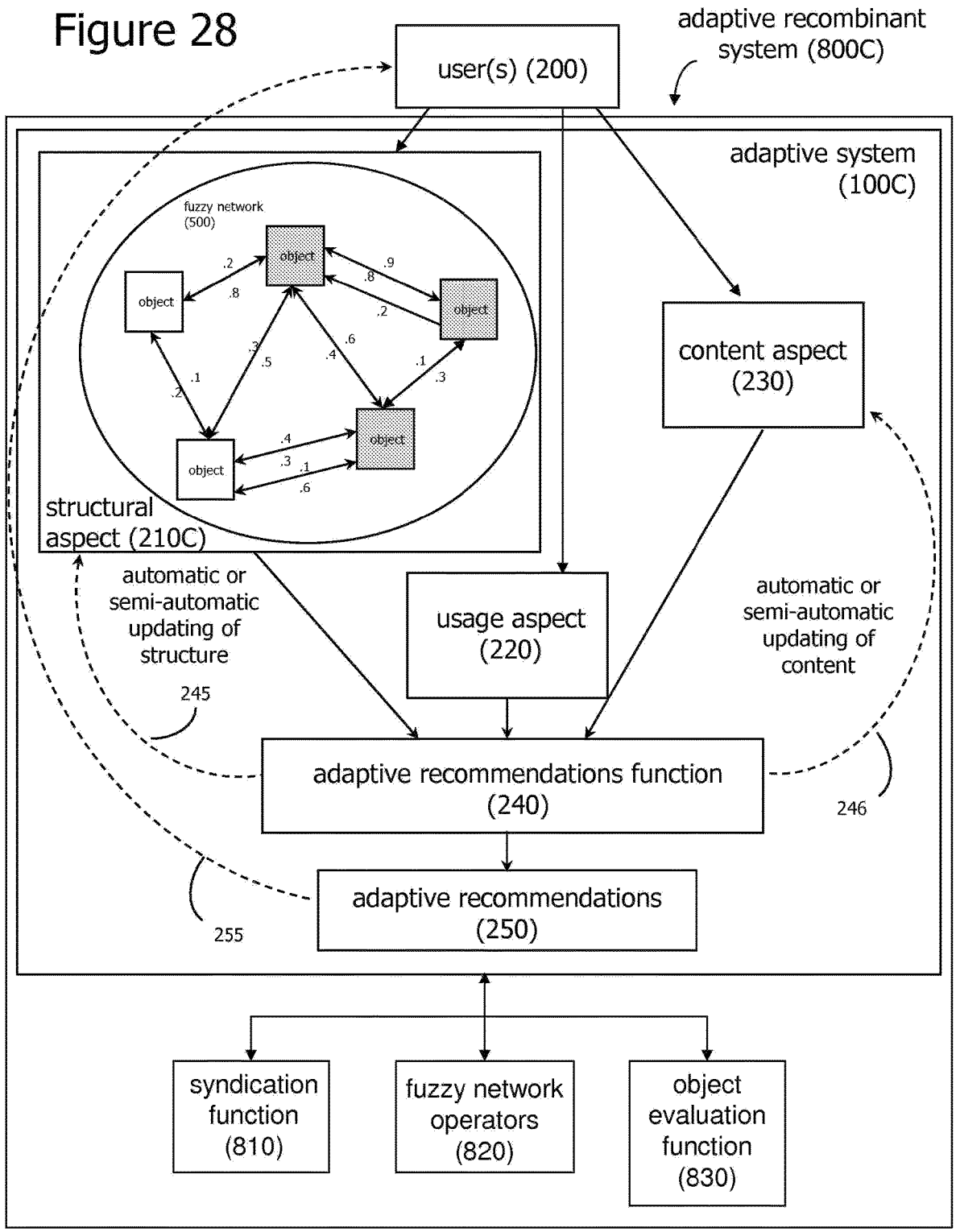
FIG. 28 is a block diagram of the adaptive recombinant system of FIG. 18 in which the structural aspect is a fuzzy network, according to some embodiments.

Similarly, the adaptive recombinant system 800 of FIG. 18 may operate in a fuzzy network environment. In FIG. 28, an adaptive recombinant system 800C includes the adaptive system 100C of FIG. 27. Thus, the adaptive recombinant system 800C may perform syndication and recombination operations, as described above, to generate structural subsets that are fuzzy networks.

Figure 29:
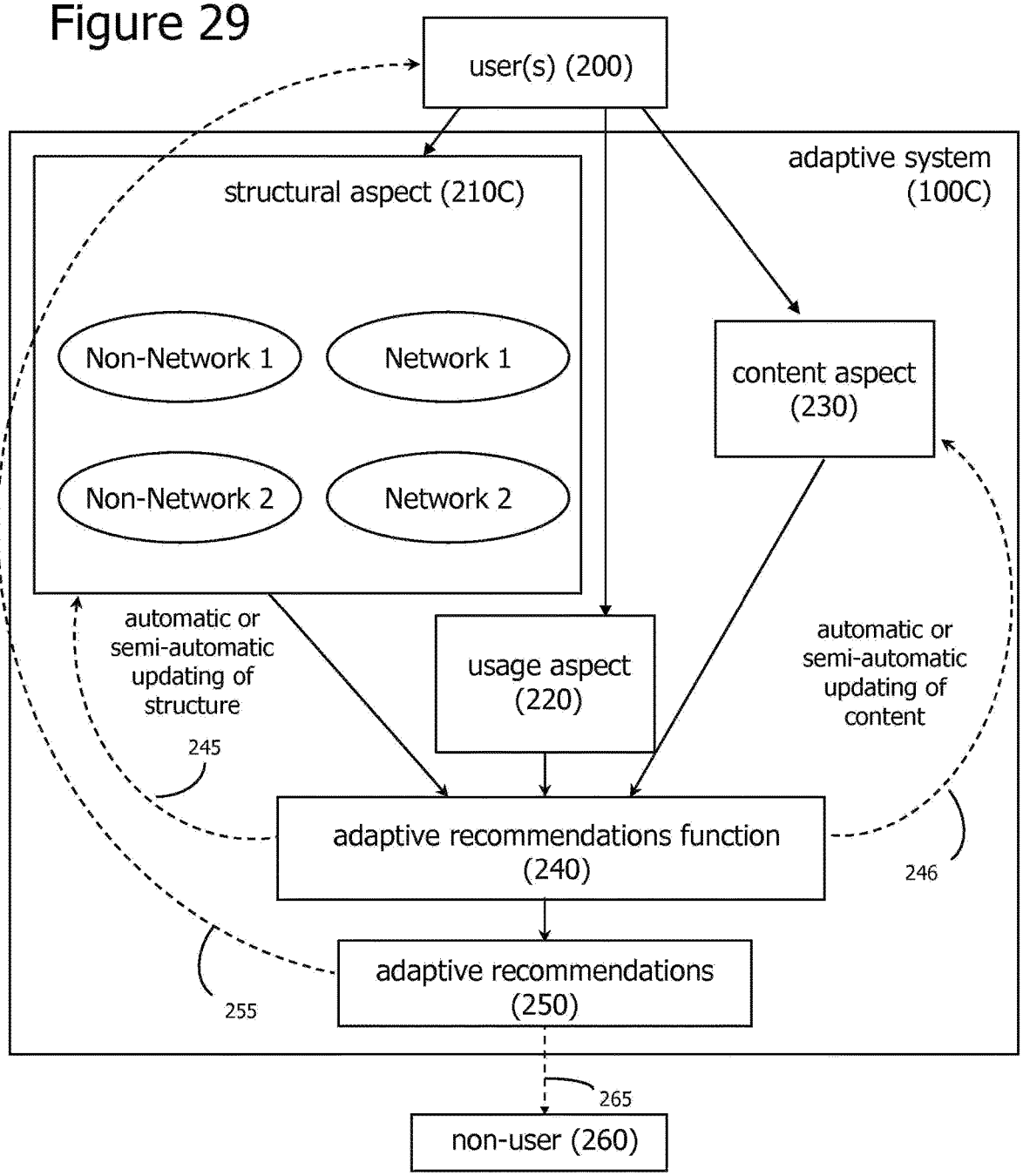
FIG. 29 is a block diagram of a structural aspect including multiple network-based structures, according to some embodiments.

The structural aspect 210 of adaptive system 100 may be comprised of multiple structures, comprising network-based structures, non-network-based structures, or combinations of network-based structures and non-network-based structures. In FIG. 29, the structural aspect 210C includes multiple network-based structures and non-network-based structures. The multiple structures of 210c may reside on the same computer system, or the structures may reside on separate computer systems.

Figure 30:
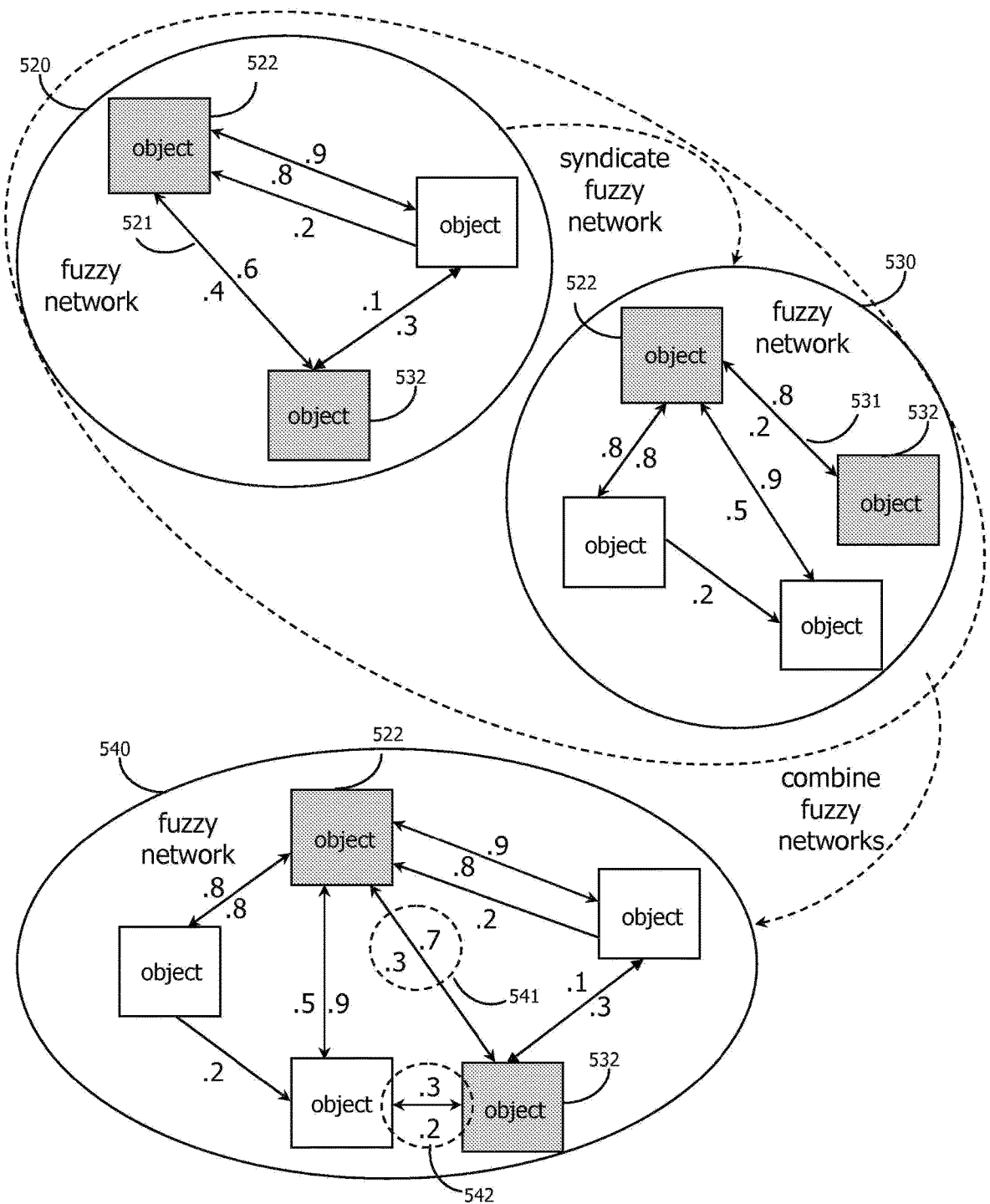
FIG. 30 is a block diagram of a fuzzy network union operation, according to some embodiments.

FIG. 30 depicts a fuzzy network 520 syndicated to, and combined with, a fuzzy network 530. Fuzzy network 520 contains objects 522 and 532. Fuzzy network 530 contains identical objects 522 and 532, which are depicted by shading.

The adaptive recombinant system 800 may determine objects, such as the objects 522 and 532 of FIG. 30, to be identical through the object evaluation function 830 (see FIG. 18). The object evaluation function 830 may include a global or distributed management of unique identifiers for each distinct object. These identifiers may be managed directly by the adaptive recombinant system 800, or the adaptive recombinant system may rely on an auxiliary system, such as an operating system or another application, to manage object identification. Alternatively, the identity relationship between objects may be determined though comparisons of information associated with the object or through a comparison of the actual object content (information 232) itself. Associated content may be compared using text, graphic, video, or audio matching techniques. A threshold may be set in determining identicalness between two objects that is less than perfect matching to compensate for minor differences, versions, errors, or other non-substantive differences between the two objects, or to increase the speed of object comparisons by sacrificing some level of accuracy in identification of identicalness.

The combination of the fuzzy network 520 and the fuzzy network 530 yields fuzzy network 540. In the fuzzy network 540, relationships that were unique in networks 520 and 530 are maintained. Where relationships or relationship indicators are common in fuzzy networks 520 and 530, the resolution function 834 (FIG. 20) is applied to create the relationship and associated relationship indicators in the newly formed fuzzy network 540.

For example, object 522 and object 532 are part of both fuzzy network 520 and fuzzy network 530. A relationship 521 is depicted between object 522 and object 532 in the fuzzy network 520, while a relationship 531 is depicted between object 522 and object 532 in the fuzzy network 530. Where relationships 521 and 530 are of the same type, the resulting relationship indicators 541 in the newly created fuzzy network 540 is an average of relationship indicators 521 and 531. That is, for determining the relationship between objects 522 and 532 in the fuzzy network 540, the resolution function 834 is a simple average function. In general, the resolution function 834 may be any mathematical function or algorithm that takes as input two numbers between 0 and 1 inclusive, and outputs a number between 0 and 1 inclusive.

The resolution function 834 may be derived from algorithms that apply appropriate usage behavior inferences. As a simple example, if the relationship value and associated indicator of one network has been derived from the usage behaviors of highly informed or expert users, then this may have more weighting than the relationship value and associated indicator of a second network for which the corresponding relationship value was based on inferences associated with the usage behaviors of a relatively sparse set of relatively uniformed users.

New relationships and associated relationship indicators that do not exist in originating fuzzy networks may also be generated by the adaptive recombinant system 800 upon fuzzy network creation. The adaptive recommendations function 240 may be invoked directly to effect such relationship modifications, or it may be invoked in conjunction with fuzzy network maintenance functions.

For example, in FIG. 30, the fuzzy network 540 also contains a new relationship and associated relationship indicators 542 that did not explicitly exist in predecessor fuzzy networks 520 or 530. This is an example of the invocation of the adaptive recommendations function 240 being used by the adaptive recombinant system 800 in conjunction with the fuzzy network operators 820, to automatically or semi-automatically add a new relationship and associated relationship indicators to the newly created fuzzy network.

The determination of a new relationship may be based on fuzzy network structural, usage, or content characteristics, and associated inferencing algorithms. For example, in predecessor network 530, the traffic patterns, combined with the organization of user referenced subsets of 530, as one example, may support adding the relationship 542 in the new network 540 that did not exist in the predecessor networks. The same procedure may be used to delete existing relationships (which may be alternatively viewed as just equivalent to setting a relationship indicator to "0"), as desired. The algorithms for modifying relationships and relationship indicators, including adding and deleting relationships, may incorporate global considerations with regard to optimizing the overall topology of the fuzzy network by creating effective balance of relationships among objects to maximize overall usability of the network.

Figure 31A:
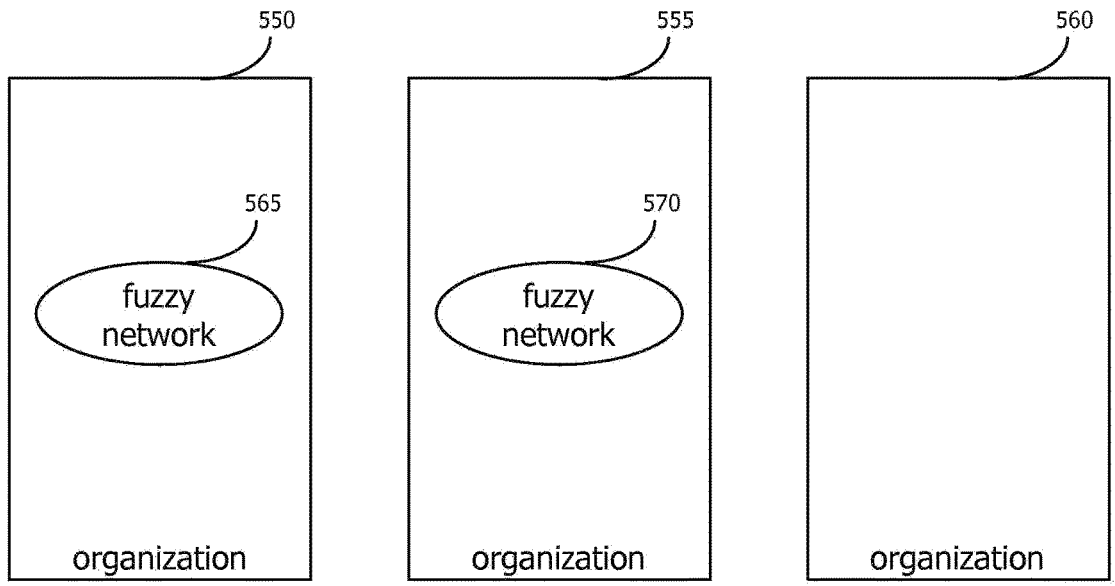
FIGS. 31A-31D are block diagrams illustrating syndication of fuzzy networks and fuzzy network subsets, according to some embodiments.

FIGS. 31A-31D illustrate the general approaches associated with fuzzy network syndication and combination by the adaptive recombinant system 800, according to some embodiments. FIG. 31A illustrates a hypothetical starting condition, and depicts three individuals or organizations, 350, 355, 360. It should be understood that where the term "organization" is used, it may imply a single individual or set of individuals that may or may not be affiliated with any specific organization. A fuzzy network 565 is used solely by, or resides within an organization 550. A fuzzy network 570 is used solely by, or resides within an organization 555. An organization 560 does not have a fuzzy network initially.

Figure 31B:
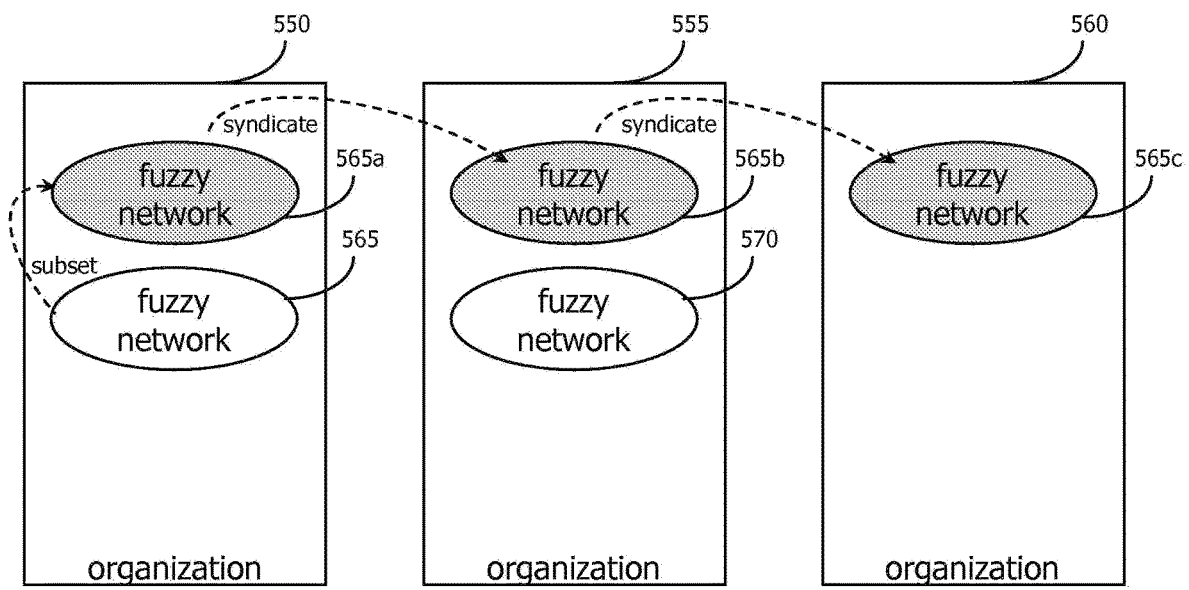

In FIG. 31B, a subset of the fuzzy network 565 is selected to form fuzzy network 565a. Fuzzy network 565a is then syndicated to the organization 555, as fuzzy network 565b. The organization 555 then syndicates the fuzzy network 565b to the organization 560, as fuzzy network 565c. Fuzzy network 565a is a subset of fuzzy network 565, fuzzy network 565b is syndicated from fuzzy network 565a, and fuzzy network 565c is syndicated from fuzzy network 565b. Thus, FIG. 31B illustrates how fuzzy networks, or subsets of networks, may be indefinitely syndicated among individuals or organizations by the adaptive recombinant system 800.

Figure 31C:
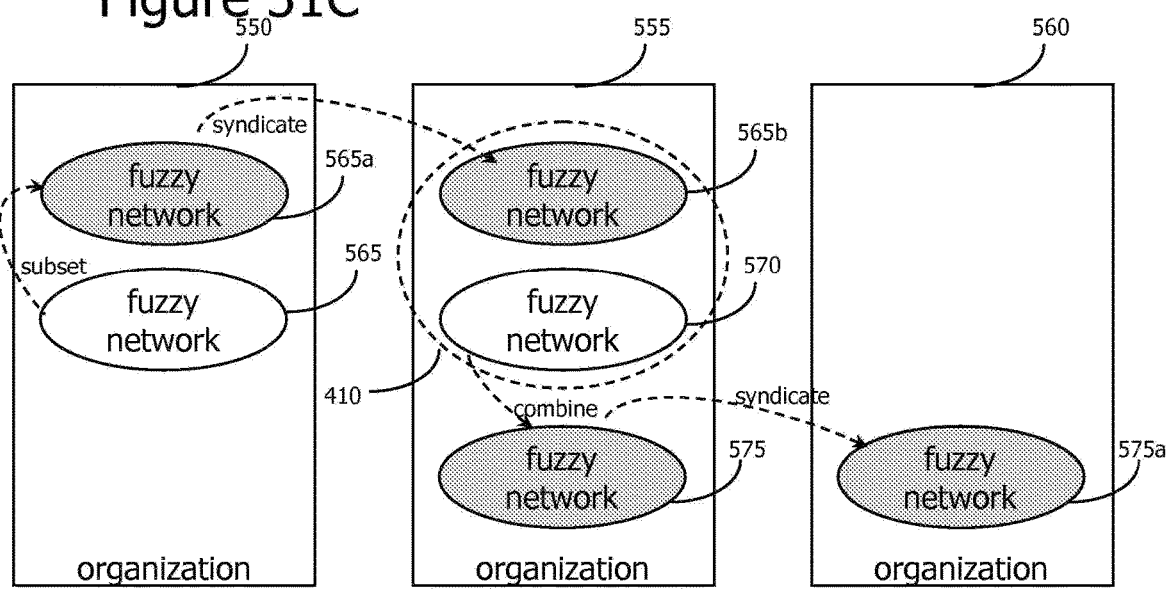

In FIG. 31C, the fuzzy network 565b in the organization 555, which was syndicated from fuzzy network 565 (FIG. 31B), may be combined with the fuzzy network 570 already present in organization 555 (FIG. 31A), to form new fuzzy network 575. Fuzzy network 575 is then syndicated to the organization 560 as fuzzy network 575a. Thus, FIG. 31C illustrates how fuzzy networks, or subsets of networks, may be combined to form new fuzzy networks.

Figure 31D:
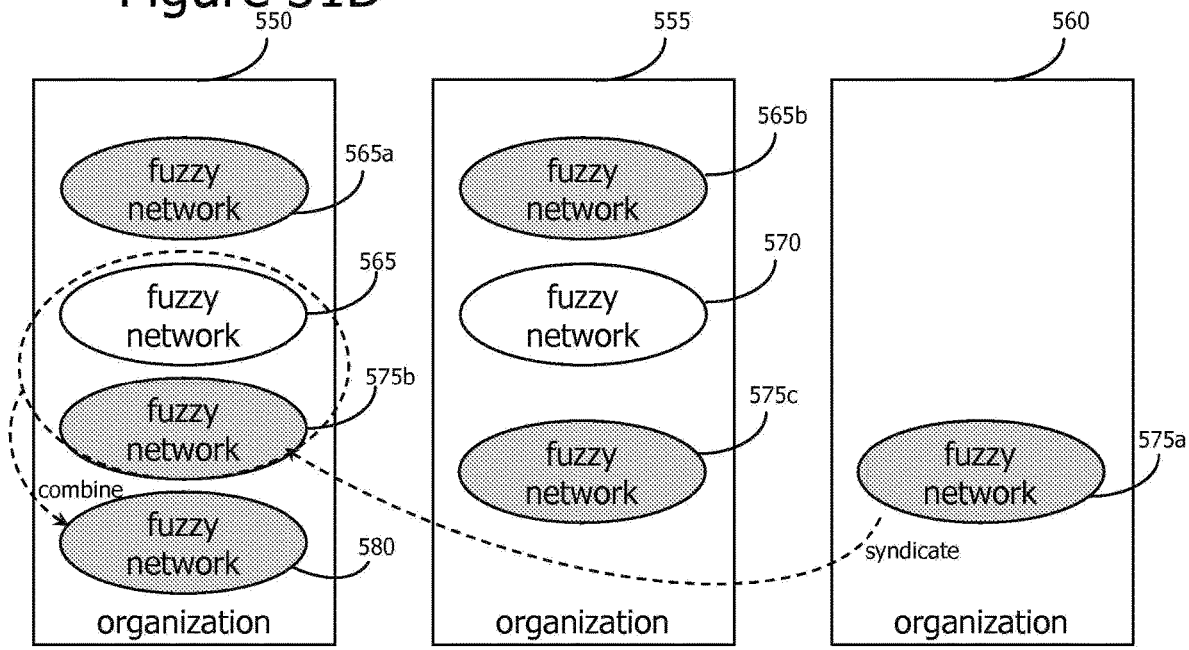

In FIG. 31D, the organization 550 includes fuzzy network 565 (FIG. 31A) and fuzzy network 565a, a subset of fuzzy network 565 (FIG. 31B). Fuzzy network 575a, in the organization 560, is syndicated to the organization 550, as fuzzy network 575b, such that organization 550 has three fuzzy networks 565, 565a, and 575b. Fuzzy networks 565 and 575b may be combined, as shown, to form new fuzzy network 580 in the organization 550.

The adaptive recombinant system 800 of FIG. 18 is capable of generating subsets, combining, and syndicating networks, as depicted in FIGS. 31A-31D. The adaptive recombinant system may indefinitely enable sub-setting of fuzzy networks, syndicating them to one or more destination fuzzy networks, and enabling the syndicated fuzzy networks to be combined with one or more fuzzy networks at the destinations. At each combination step, the resolution function 834, through application of the adaptive recommendations function 240 and network maintenance functions, may be invoked to create and update the structural aspect 210, as appropriate.

Figure 32:
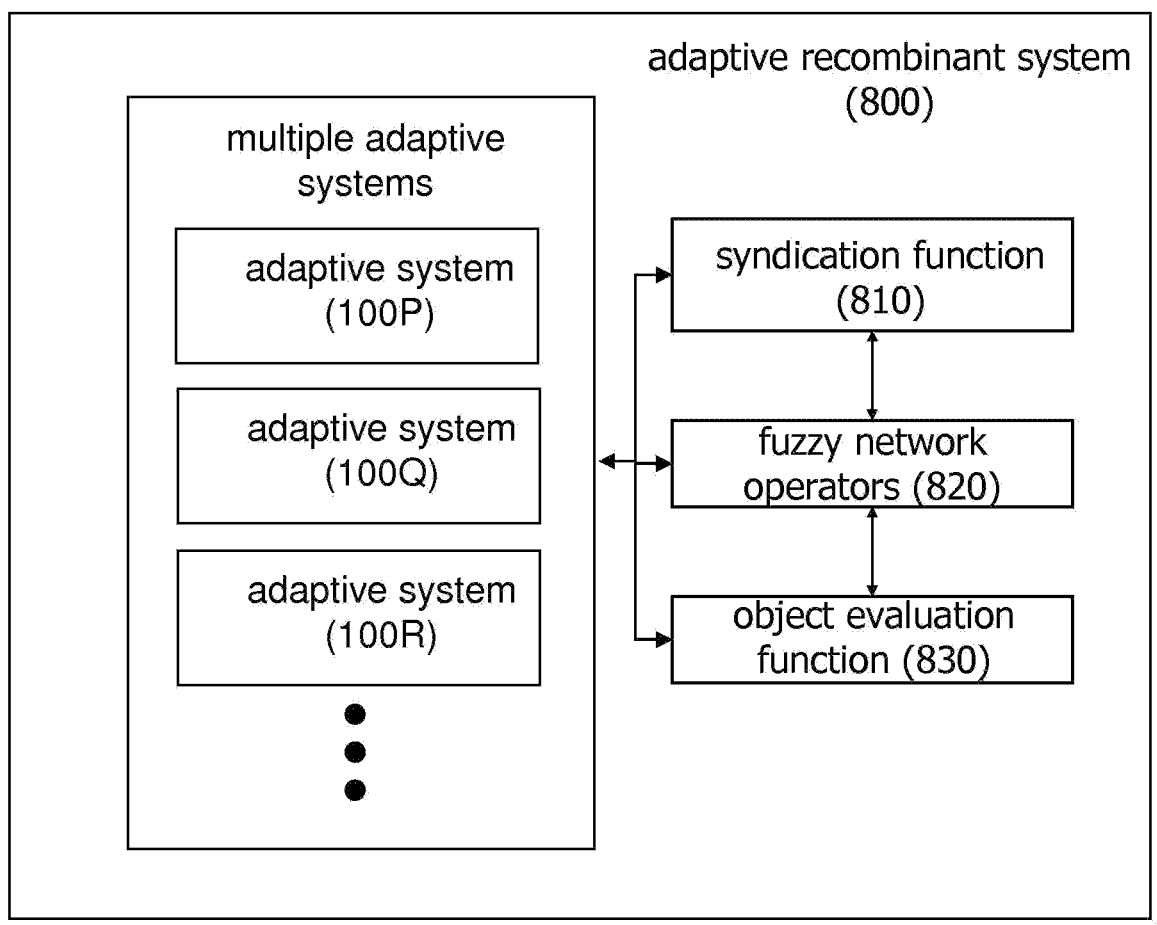
FIG. 32 is a block diagram of the adaptive recombinant system of FIG. 18, in which multiple adaptive systems are simultaneously supported, according to some embodiments.

The adaptive recombinant system 800 may efficiently support multiple adaptive systems 100, without reproducing the components used to support syndication and recombination for each adaptive system. FIG. 32, for example, includes three adaptive systems 100P, 100Q, and 100R. These three adaptive systems share the syndication function 810, the fuzzy network operators 820, and the object evaluation function 830. In addition, it should be remembered that multiple fuzzy networks may exist inside an adaptive system 100, which may in turn form part of the adaptive recombinant system 800.

In addition to the resolution function 834, the adaptive recombinant system 800 may use the object evaluation function 830, to evaluate the "fitness" of the recombined fuzzy networks. The object evaluation function 830 may be completely automated, or it may incorporate explicit human judgment. The networks that are evaluated to be most fit are then recombined among themselves, to create a new generation of fuzzy networks.

The adaptive recombinant system 800 may also create random structural changes to enhance the diversity of the fuzzy networks in the next generation. Or, the adaptive recombinant system 800 may use explicit non-random-based rules to enhance the diversity of the fuzzy networks in the next generation. Preferably, the inheritance characteristics from generation to generation of adaptive recombinant fuzzy networks may be that of acquired traits (Lamarckian). Or, the inheritance characteristics from generation to generation of adaptive recombinant fuzzy networks may be that of non-acquired, or random mutational, traits (Darwinian). For the Lamarckian embodiments, the acquired traits include any structural adaptations that have occurred through system usage, syndications, and combinations.

Through application of these multi-generational approaches, fuzzy networks are able to evolve against the selection criteria that are provided. The fitness selection criteria may be determined through inferences associated with fuzzy network usage behaviors, and may itself co-evolve with the generations of adaptive fuzzy networks.

Fuzzy Content Network

Figure 33:
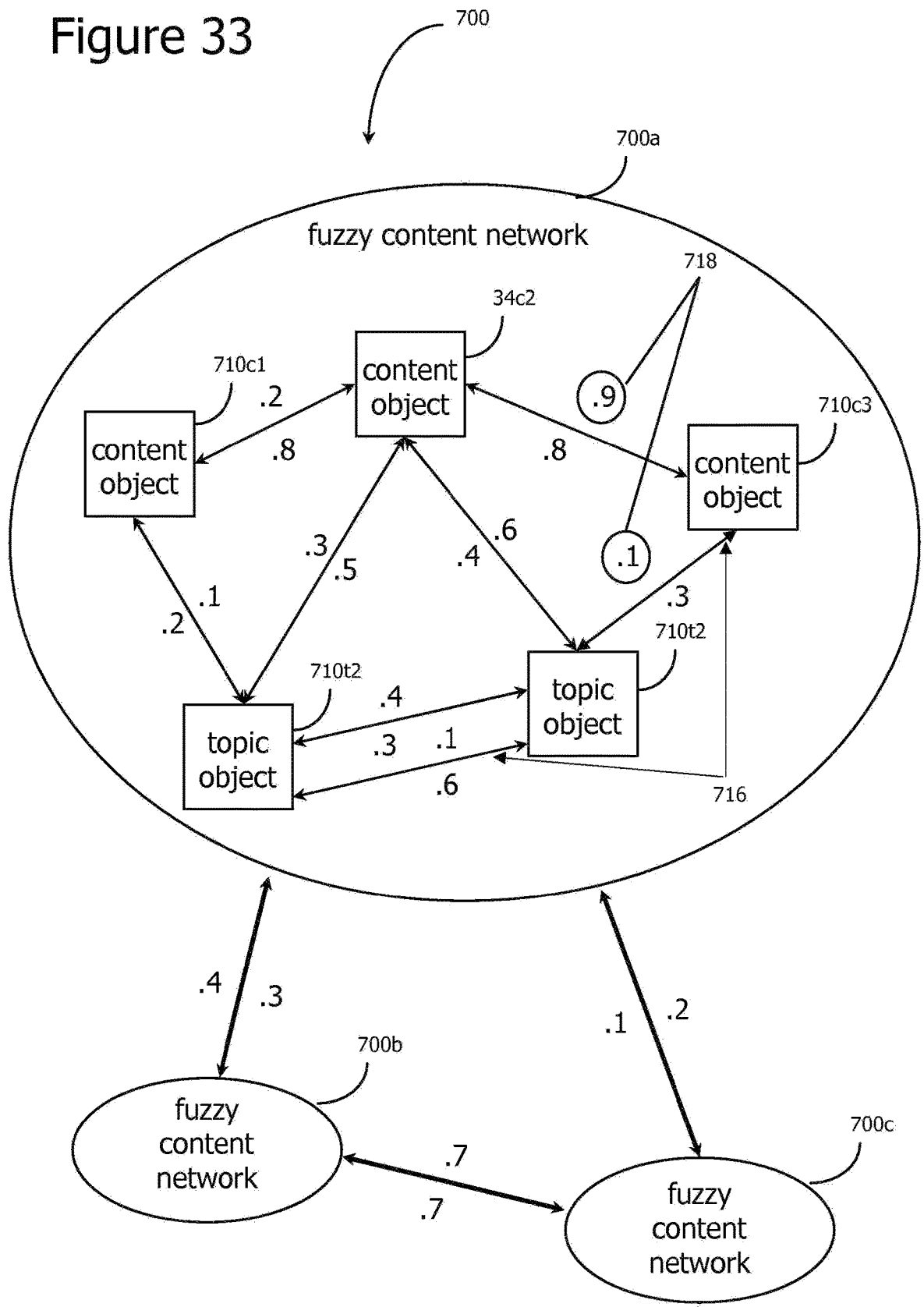
FIG. 33 is a block diagram of a fuzzy content network, according to some embodiments.

In some embodiments, the structural aspect 210 of the adaptive system 100 and of the adaptive recombinant system 800, as well as the respective structural subsets 280 generated by the adaptive recommendations function 240, are networks of a particular form, a fuzzy content network. A fuzzy content network 700 is depicted in FIG. 33.

The fuzzy content network 700, including content sub-networks 700a, 700b, and 700c. The content network 700 includes "content," "data," or "information," packaged in modules known as objects 710.

The content network 700 employs features commonly associated with "object-oriented" software to manage the objects 710. That is, the content network 700 discretizes information as "objects." In contrast to typical procedural computer programming structures, objects are defined at a higher level of abstraction. This level of abstraction allows for powerful, yet simple, software architectures.

Figure 34A:
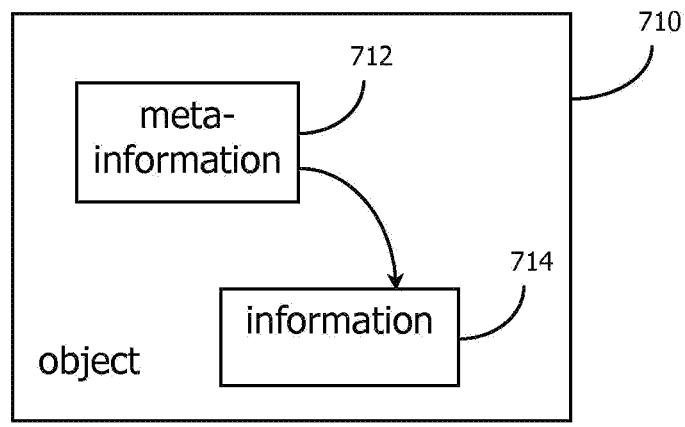
FIGS. 34A-34C are block diagrams of an object, a topic object, and a content object for the fuzzy content network of FIG. 33, according to some embodiments.

One benefit to organizing information as objects is known as encapsulation. An object is encapsulated when only essential elements of interaction with other objects are revealed. Details about how the object works internally may be hidden. In FIG. 34A, for example, the object 710 includes meta-information 712 and information 714. The object 710 thus encapsulates information 714.

Another benefit to organizing information as objects is known as inheritance. The encapsulation of FIG. 34A, for example, may form discrete object classes, with particular characteristics ascribed to each object class. A newly defined object class may inherit some of the characteristics of a parent class. Both encapsulation and inheritance enable a rich set of relationships between objects that may be effectively managed as the number of individual objects and associated object classes grows.

Figure 34B:
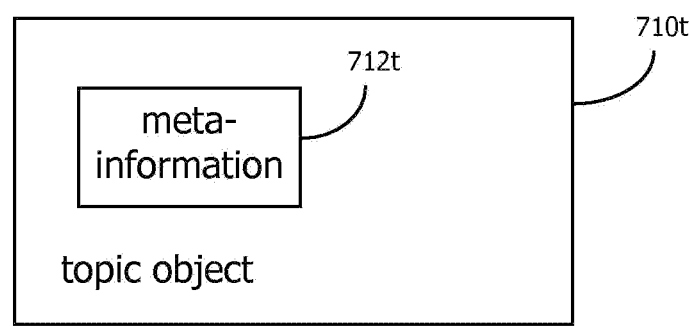
Figure 34C:
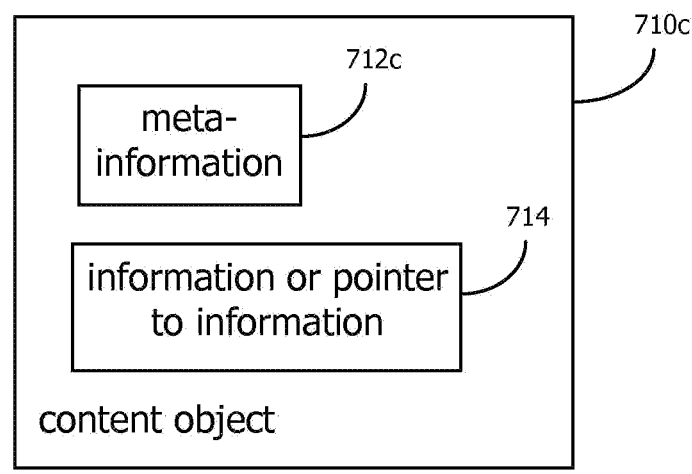

In the content network 700, the objects 710 may be either topic objects 710t or content objects 710c, as depicted in FIGS. 34B and 34C, respectively. Topic objects 710t are encapsulations that contain meta-information 712t and relationships to other objects (not shown), but do not contain an embedded pointer to reference associated information. The topic object 710t thus essentially operates as a "label" to a class of information. The topic object 710 therefore just refers to "itself" and the network of relationships it has with other objects 710.

Content objects 710c, as shown in FIG. 34C, are encapsulations that contain meta-information 36c and relationships to other objects 710 (not shown). Additionally, content objects 710c may include either an embedded pointer to information or the information 714 itself (hereinafter, "information 714").

The referenced information 714 may include files, text, documents, articles, images, audio, video, multi-media, software applications and electronic or magnetic media or signals. Where the content object 714c supplies a pointer to information, the pointer may be a memory address. Where the content network 700 encapsulates information on the Internet, the pointer may be a Uniform Resource Locator (URL).

The meta-information 712 supplies a summary or abstract of the object 710. So, for example, the meta-information 712t for the topic object 710t may include a high-level description of the topic being managed. Examples of meta-information 712t include a title, a sub-title, one or more descriptions of the topic provided at different levels of detail, the publisher of the topic meta-information, the date the topic object 710t was created, and subjective attributes such as the quality, and attributes based on user feedback associated with the referenced information. Meta-information may also include a pointer to referenced information, such as a uniform resource locator (URL), in one embodiment.

The meta-information 712c for the content object 710c may include relevant keywords associated with the information 714, a summary of the information 714, and so on. The meta-information 712c may supply a "first look" at the objects 710c. The meta-information 712c may include a title, a sub-title, a description of the information 714, the author of the information 714, the publisher of the information 714, the publisher of the meta-information 712c, and the date the content object 710c was created, as examples. As with the topic object 710t, meta-information for the content object 710c may also include a pointer.

In FIG. 33, the content sub-network 700a is expanded, such that both content objects 710c and topic objects 710t are visible. The various objects 34 of the content network 700 are interrelated by degrees, using relationships 716 (unidirectional and bidirectional arrows) and relationship indicators 716 (values). (The relationships 716 and relationship indicators 718 are similar to the relationships and relationship indicators depicted in FIG. 13A, above, as well as other figures included herein.) Each object 710 may be related to any other object 710, and may be related by a relationship indicator 718, as shown. Thus, while information 714 is encapsulated in the objects 710, the information 714 is also interrelated to other information 714 by a degree manifested by the relationship indicators 718.

The relationship indicator 718 is a numerical indicator of the relationship between objects 710. Thus, for example, the relationship indicator 718 may be normalized to between 0 and 1, inclusive, where 0 indicates no relationship, and 1 indicates a subset relationship. Or, the relationship indicators 718 may be expressed using subjective descriptors that depict the "quality" of the relationship. For example, subjective descriptors "high," "medium," and "low" may indicate a relationship between two objects 710.

The relationship 716 between objects 710 may be bi-directional, as indicated by the double-pointing arrows. Each double-pointing arrow includes two relationship indicators 718, one for each "direction" of the relationships between the objects 710.

As FIG. 33 indicates, the relationships 716 between any two objects 710 need not be symmetrical. That is, topic object 710t1 has a relationship of "0.3" with content object 710c2, while content object 710c2 has a relationship of "0.5" with topic object 710t1. Furthermore, the relationships 716 need not be bi-directional—they may be in one direction only. This could be designated by a directed arrow, or by simply setting one relationship indicator 718 of a bi-directional arrow to "0," the null relationship value.

The content networks 700A, 700B, 700C may be related to one another using relationships of multiple types and associated relationship indicators 718. For example, in FIG. 33, content sub-network 700a is related to content sub-network 700b and content sub-network 700c, using relationships of multiple types and associated relationship indicators 718. Likewise, content sub-network 700b is related to content sub-network 700a and content sub-network 700c using relationships of multiple types and associated relationship indicators 718.

Individual content and topic objects 710 within a selected content sub-network 700a may be related to individual content and topic objects 710 in another content sub-network 700b. Further, multiple sets of relationships of multiple types and associated relationship indicators 718 may be defined between two objects 710

For example, a first set of relationships 716 and associated relationship indicators 718 may be used for a first purpose or be available to a first set of users while a second set of relationships 716 and associated relationship indicators 718 may be used for a second purpose or available to a second set of users. For example, in FIG. 33, topic object 710*t*1 is bi-directionally related to topic object 710*t*2, not once, but twice, as indicated by the two double arrows. An indefinite number of relationships 716 and associated relationship indicators 718 may therefore exist between any two objects 710 in the fuzzy content network 700. The multiple relationships 716 may correspond to distinct relationship types. For example, a relationship type might be the degree an object 710 supports the thesis of a second object 710, while another relationship type might be the degree an object 710 disconfirms the thesis of a second object 710. The content network 700 may thus be customized for various purposes and accessible to different user groups in distinct ways simultaneously.

The relationships among objects 710 in the content network 700, as well as the relationships between content networks 700*a* and 700*b*, may be modeled after fuzzy set theory. Each object 710, for example, may be considered a fuzzy set with respect to all other objects 710, which are also considered fuzzy sets. The relationships among objects 710 are the degrees to which each object 710 belongs to the fuzzy set represented by any other object 710. Although not essential, every object 710 in the content network 700 may conceivably have a relationship with every other object 710.

The topic objects 710*t* encompass, and are labels for, very broad fuzzy sets of the content network 700. The topic objects 710*t* thus may be labels for the fuzzy set, and the fuzzy set may include relationships to other topic objects 710*t* as well as related content objects 710*c*. Content objects 710*c*, in contrast, typically refer to a narrower domain of information in the content network 700.

Figure 35:
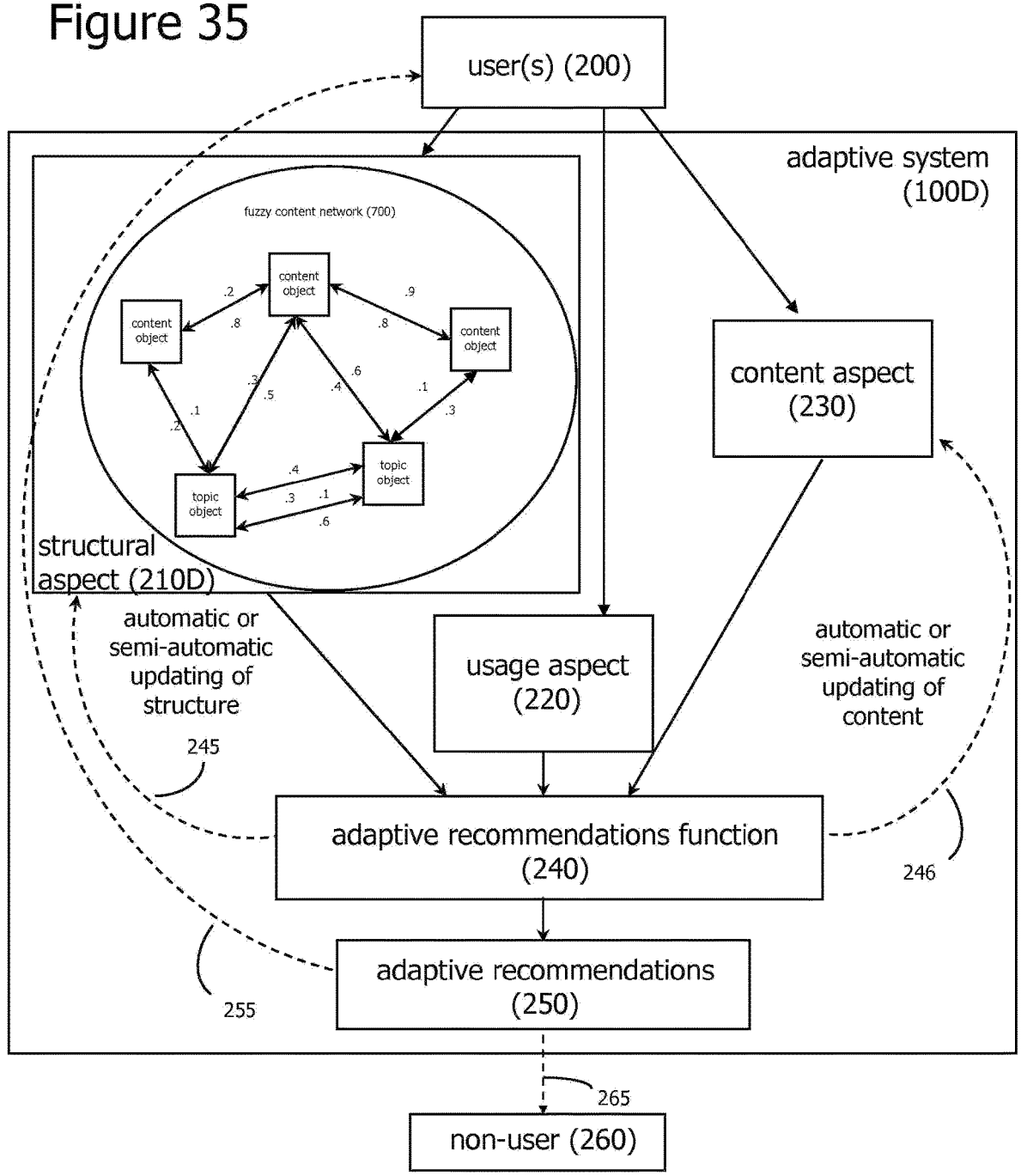
FIG. 35 is a block diagram of the adaptive system of FIG. 1 in which the structural aspect is a fuzzy content network, according to some embodiments.

The adaptive system 100 of FIG. 1 may operate in a fuzzy content network environment, such as the one depicted in FIG. 33. In FIG. 35, an adaptive system 100D includes a structural aspect 210D that is a fuzzy content network. Thus, adaptive recommendations 250 generated by the adaptive system 100D are also structural subsets that are themselves fuzzy content networks.

Figure 36:
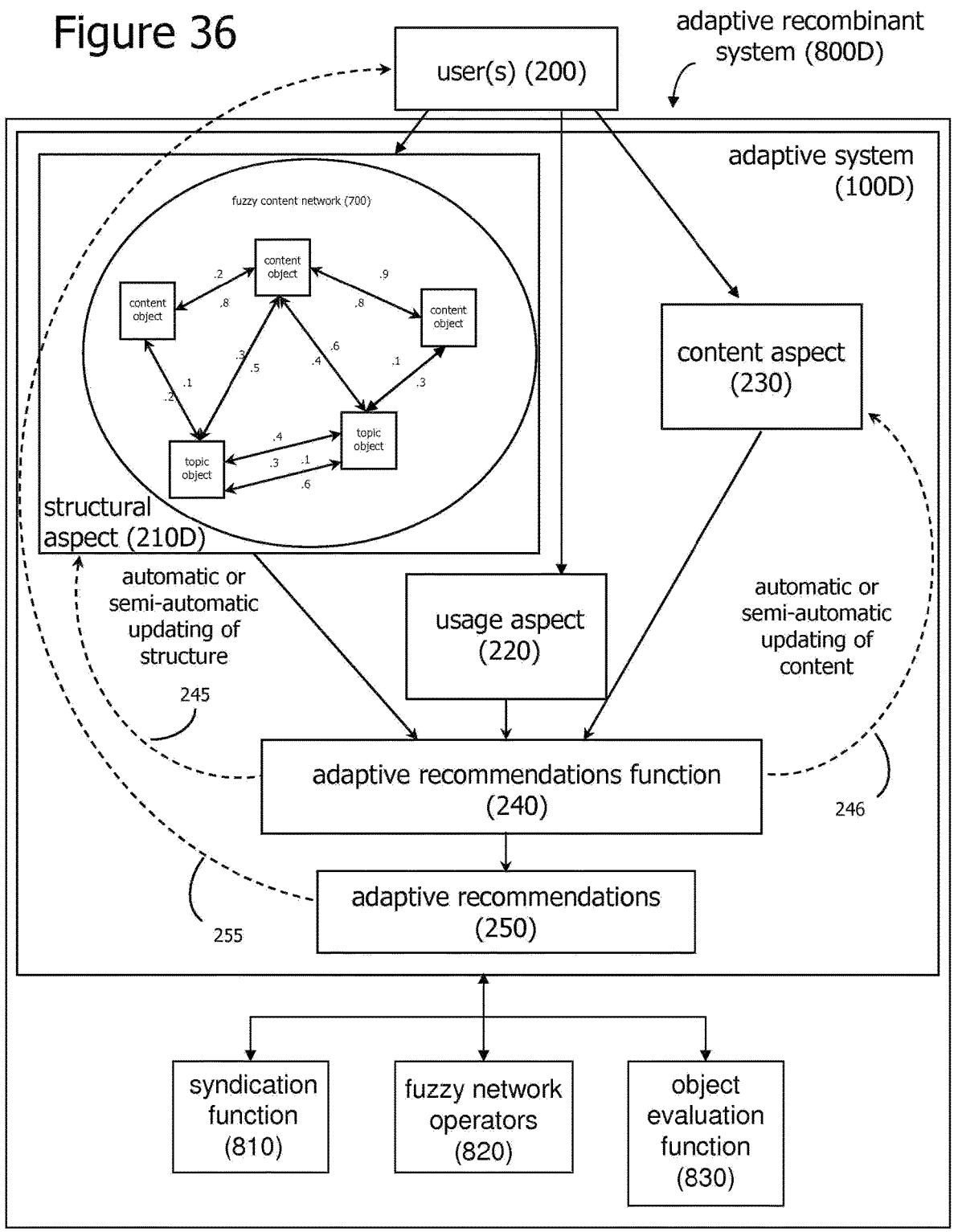
FIG. 36 is a block diagram of the adaptive recombinant system of FIG. 18 in which the structural aspect is a fuzzy content network, according to some embodiments.

Similarly, the adaptive recombinant system 800 of FIG. 18 may operate in a fuzzy content network environment. In FIG. 36, an adaptive recombinant system 800D includes the adaptive system 100D of FIG. 35. Thus, the adaptive recombinant system 800D may perform syndication and recombination operations, as described above, to generate structural subsets that are fuzzy content networks.

Extended Fuzzy Structures in Fuzzy Networks

Figure 37:
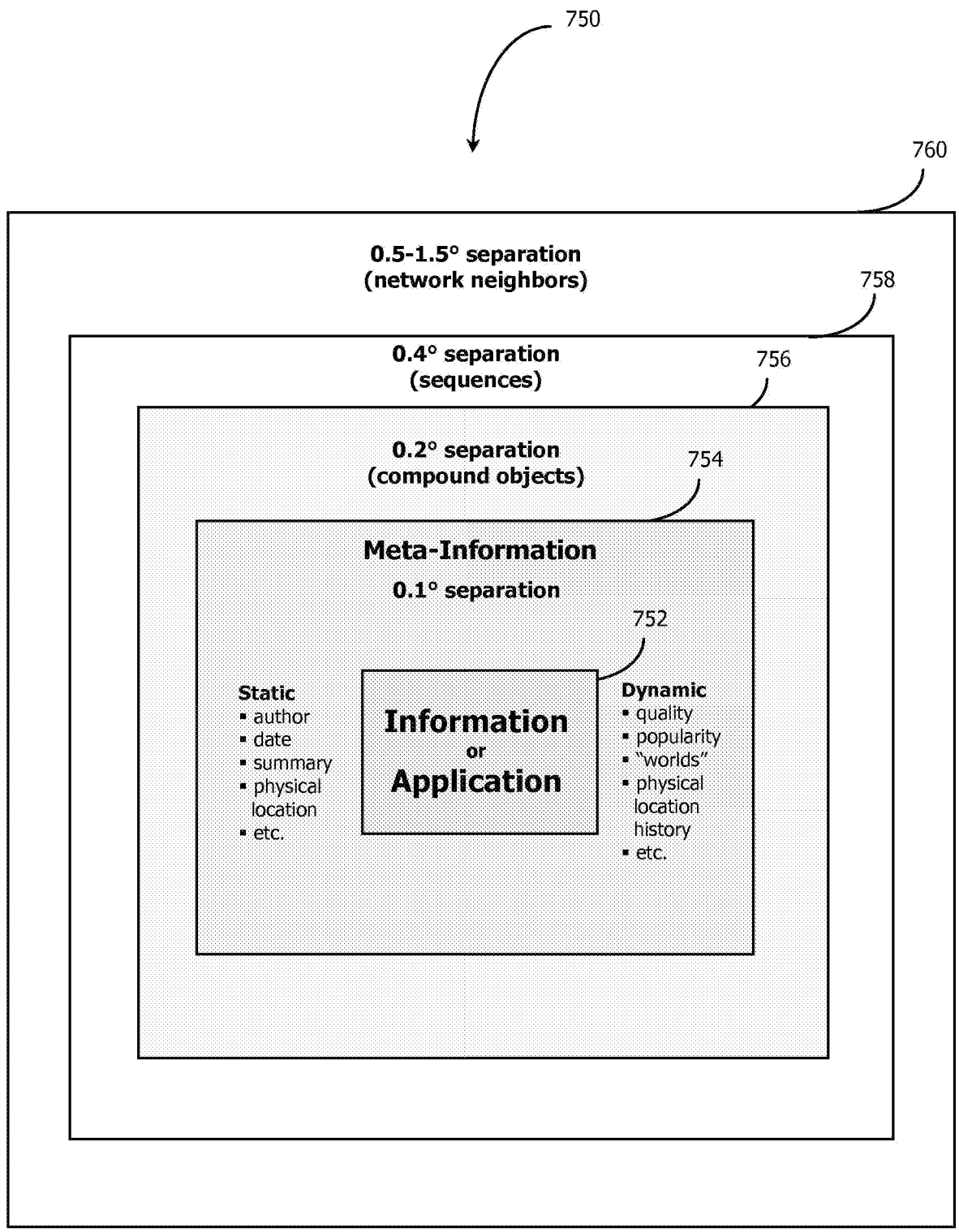
FIG. 37 is a block diagram of a fuzzy content network object structure based on an extended fractional degrees of separation architecture, according to some embodiments.

The fuzzy network model may be extended to the organizational structure of the meta-information and other affiliated information associated with each network node or object. In a fractional degree of separation system structure, depicted in FIG. 37, meta-information and affiliated information may be structured in distinct tiers or rings around the information, with each tier designated as a fractional degree of separation 750. The chosen parameters for the degrees of separation of the meta-information will depend on the definition of the calculation of the degrees of separation between any two nodes, specifically depending on the choice of the scaling factor on in the formula. This extended fuzzy network structure may be utilized to implement a fuzzy content network system structure, or any other fuzzy network-based structure.

Meta-information 754 associated with information or interactive applications 752 may include, but is not limited to, descriptive information about the object such as title, publishing organization, date published, physical location of a physical object, an associated photo or picture, summary or abstracts, a plurality of reviews, etc. Meta-information 754 may also include dynamic information such as expert and community ratings of the information, feedback from users, and more generally, any relevant set of, or history of, usage behaviors described in Table 1. The meta-information 754 may also include information about relationships to other nodes in the network. For example, the meta-information 754 may include the relationships with other nodes in the networks, including an identification code for each related node, the types of relationships, the direction of the relationships, and the degree of relatedness of each relationship.

The meta-information 754 may be defined within tiers of fractional degree of separation between zero and one. For example, the most tightly bound meta-information might be in a tier at degree of separation of 0.1 and less tightly bound meta-information might be in a tier at degree of separation of 0.8.

Where the degrees of separation calculated between any two nodes in the fuzzy network are between 0 and 1, the meta-information tiers would more appropriately be designated with negative (possibly fractional) degrees of separation. For example, the most tightly bound meta-information 752 may be in a tier at degree of separation of −5 and less tightly bound meta-information may be in a tier at degree of separation of −1.

The meta-information tiers may distinguish between static meta-information such as the original author of the associated information, and dynamic information such as the total number of accesses of the associated information through a computer system.

The fractional degree of separations of less than one may correspond to compound objects 756. For example, a picture object plus a text biography object may constitute a person object. For typical fuzzy content network operations the compound object would generally behave as if it was one object.

The fractional degree of separations of less than one may correspond to a list of objects with which the present object has a specific sequential relation 758. For example, this may include workflow sequences in processes. These sequential relationships imply a tighter "binding" between objects than the relationships associated with other objects in the fuzzy network 770, hence a smaller fractional degree of separation is employed for sequential relationships.

All meta-information may explicitly be content objects that relate to associated information by a fractional degree of separation of less than one, and may relate to other content objects in the network by a fractional degree of separation that may be greater than or equal to one. This can be described by a degree-of-separation matrix. Every object is arrayed in sequence along both the matrix columns and the matrix rows. Each cell of the matrix corresponds to the degree of separation between the two associated objects. The cells in the main diagonal of the degree of separation matrix are all zeroes, indicating the degree of separation between an object and itself is zero. All other cells will contain a non-zero number, indicating the degree of separation between the associated objects, or a designator indicating that the degree of separation is essentially infinite in the case when there is no linked path at all between the associated objects.

Personalized Fuzzy Content Network Subsets

Recall that users 200 of the adaptive system 100 of FIG. 1 may tag or store subsets of the structural aspect 210 for personal use, or to share with others. Likewise, users 200 of the adaptive recombinant system 800 may tag subsets of the fuzzy content network, whether for personal use or to share with others.

Figure 38:
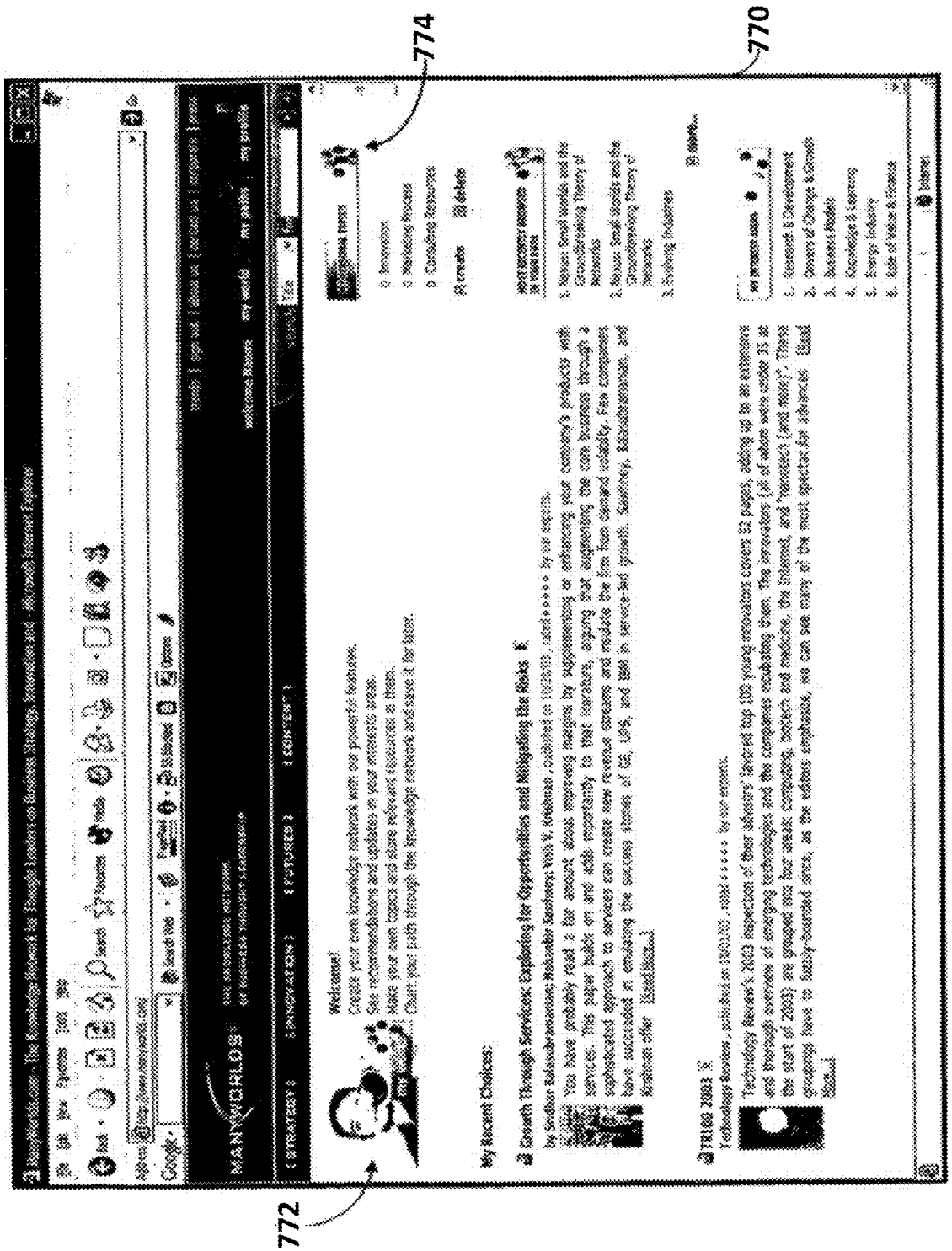
FIG. 38 is a screen image of the Epiture "MyWorld" function, according to some embodiments.

FIG. 38 is a screenshot 770 generated by the Epiture software system.

A "My World" icon 772 invites the viewer to "create your own knowledge network" by clicking on the icon. The icon 772 further states, "Make your own topics and store relevant resources in them." The term "store" in the icon 772 may simply imply tagging information—no referenced information need necessarily be physically copied and stored, although physical copying and storing may be implemented.

Users of the Epiture software system may select content objects and tag them for storage in their personal fuzzy network. Optionally, related meta-information and links to other objects in the original fuzzy network may be stored with the content object. Users may also store entire topics in their "My World" personal fuzzy network. Furthermore, users may use fuzzy network operators to create synthetic topics. For example, a user might apply an intersection operator to Topic A and Topic B, to yield Topic C. Topic C could then be stored in the personal fuzzy network. Union, difference and other fuzzy network operators may also be used in creating new fuzzy network subsets to be stored in a private fuzzy content network.

Users of the Epiture software system may directly edit their personal fuzzy networks, including the names or labels associated with content objects and topic objects, as well as other meta-information associated with content and topic objects. The screenshot 770 of FIG. 38 features a "personal topics" icon, allowing the user to explicitly edit the network, thus generating an explicitly requested structural subset 280. Users may also create new links among content and topics in their personal fuzzy network, alter the degree of relationship of existing links, or delete existing links altogether, to name a few features of the Epiture software system.

Users may selectively share their personal fuzzy networks by allowing other users to have access to their personal networks. Convenient security options may be provided to facilitate this feature.

Usage Behavior Information

Figure 39:
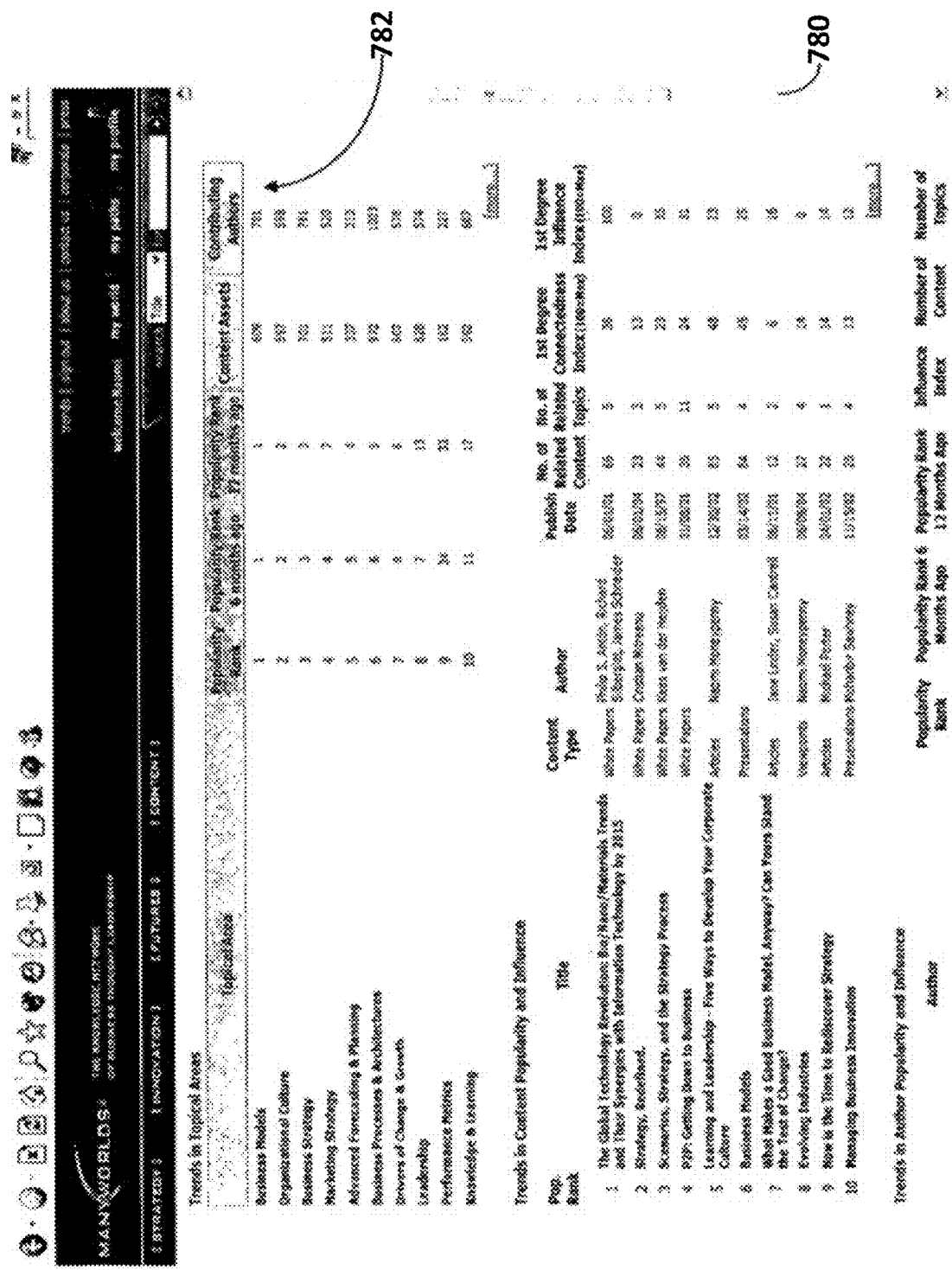
FIG. 39 is a screen image of the Epiture "Trends" function, according to some embodiments.

Users of the Epiture software system may have the ability to review personal, sub-community or community usage behaviors over time. This may include trends related to popularity, connectedness, influence or any other relevant usage metric. FIG. 39 is a screenshot 780 showing trend information display functionality associated with the Epiture software system.

Figure 40:
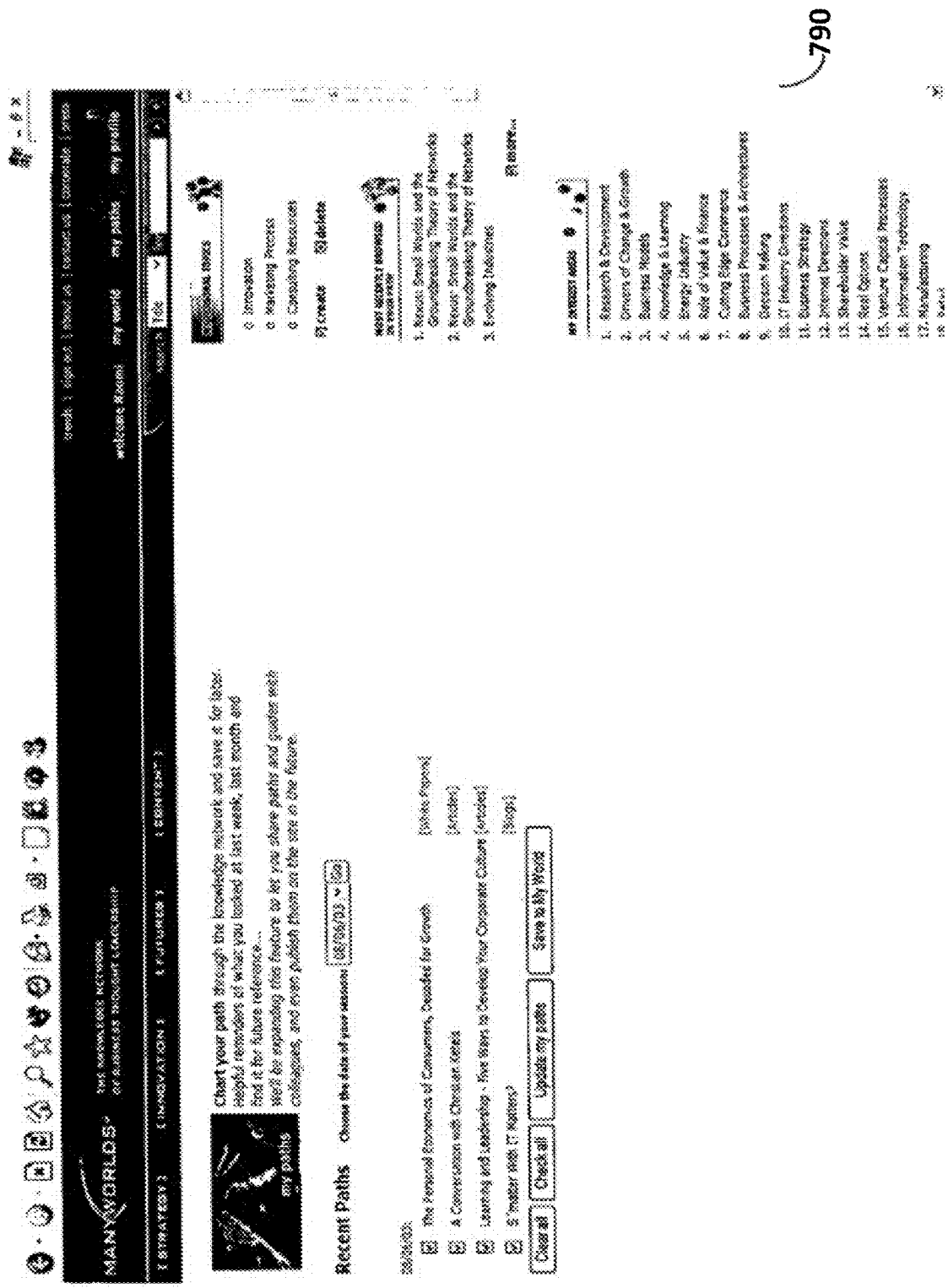
FIG. 40 is a screen image of the Epiture "MyPaths" function, according to some embodiments.

Navigational histories, such as access paths, may be available for review, with capabilities for making queries against the histories though application of selection criteria. FIG. 40 depicts a screenshot 790. The screenshot 790 is an example of navigational usage behavior information display and query functions associated with the "MyPaths" function of the Epiture software system. With appropriate authorizations and permissions, users may be able to access any other usage behaviors, such as online information accesses, traffic patterns and click streams associated with navigating the system structure, including buying and selling behaviors; physical locational cues associated with stationary or mobile use of the system; collaborative behaviors among system users that include written and oral communications, and among and with groups of system users (communities) or system users and people outside of the system; referencing behaviors of system users—for example, the tagging of information for future reference; subscription and other self-profiling behavior of users and associated attributes e.g., subscribing to updates associated with particular aspects of the system or explicitly identifying interests or affiliations, such as job function, profession, organization, etc, and preferences such as representative skill level (for example, novice, business user, advanced etc), preferred method of information receipt or learning style such as visual or audio; and relative interest levels in other communities and direct feedback behaviors, such as the ratings or direct written feedback associated with objects or their attributes such as the objects' author, publisher, etc.

Users may also have access to system usage information that may be captured and organized to retain temporal information associated with usage behaviors, including the duration of behaviors and the timing of the behaviors, where the behaviors may include those associated with reading or writing of written or graphical material, oral communications, including listening and talking, or duration of physical location of a system user, potentially segmented by user communities or affinity groups may be available for review by users.

The above usage behaviors may be available to users in raw form, or in summarized form, potentially after application of statistical or other mathematical functions are applied to facilitate interpretation. This information may be presented in a graphical format.

Adaptive Recommendations in Fuzzy Content Networks

Adaptive recommendations or suggestions may enable users to more effectively navigate through the fuzzy content network. As with other network embodiments described herein, the adaptive recommendations generated from a fuzzy content network may be in the context of a currently accessed content object or historical path of accessed content objects during a specific user session, or the adaptive recommendations may be without context of a currently accessed content object or current session path.

In the most generalized approach, adaptive recommendations in a fuzzy content network combine inferences from user community behaviors and preferences, inferences of sub-community or expert behaviors and preferences, and inferences of personal user behaviors and preferences. Usage behaviors that may be used to make preference inferences include, but are not limited to, those that are described in Table 1. These usage-based inferences may be augmented by automated inferences about the content within individual and sets of content objects using statistical pattern matching of words or phrases within the content. Such statistical pattern matching may include, but not limited to, Bayesian analysis, neural network-based methods, k-nearest neighbor, support vector machine-based techniques, or other statistical analytical techniques.

Community Preference Inferences

Where the structural aspect 210 of the adaptive system 100 or the adaptive recombinant system 800 is a fuzzy content network, user community preferences may be inferred from the popularity of individual content objects and the influence of topic or content objects, as popularity and influence were defined above. The duration of access or interaction with topic or content objects by the user community may be used to infer preferences of the community.

Users may subscribe to selected topics, for the purposes of e-mail updates on these topics. The relative frequency of topics subscribed to by the user community as a whole, or by selected sub-communities, may be used to infer community or sub-community preferences. Users may also create their own personalized fuzzy content networks through selection and saving of content objects and/or topics objects. The relative frequency of content objects and/or topic objects being saved in personal fuzzy content networks by the user community as a whole, or by selected sub-communities, may be used to also infer community and sub-community preferences. These inferences may be derived directly from saved content objects and/or topics, but also from affinities the saved content and/or topic objects have with other content objects or topic objects. Users can directly rate content objects when they are accessed, and in such embodiments, community and sub-community preferences may also be inferred through these ratings of individual content objects.

The ratings may apply against both the information referenced by the content object, as well as meta-information such as an expert review of the information referenced by the content object. Users may have the ability to suggest content objects to other individuals and preferences may be inferred from these human-based suggestions. The inferences may be derived from correlating these human-based suggestions with inferred interests of the receivers if the receivers of the human-based suggestions are users of the fuzzy content object system and have a personal history of content objects viewed and/or a personal fuzzy content network that they may have created.

The physical location and duration of remaining in a location of the community of users, as determined by, for example, a global positioning system or any other positionally aware system or device associated with users or sets of users, may be used to infer preferences of the overall user community.

Sub-Community and Expert Preference Inferences

Community subsets, such as experts, may also be designated. Expert opinions on the relationship between content objects may be encoded as affinities between content objects. Expert views may be directly inferred from these affinities. An expert or set of experts may directly rate individual content items and expert preferences may be directly inferred from these ratings.

The history of access of objects or associated meta-information by sub-communities, such as experts, may be used to infer preferences of the associated sub-community. The duration of access or interaction with objects by sub-communities may be used to infer preferences of the associated sub-community.

Experts or other user sub-communities may have the ability to create their own personalized fuzzy content networks through selection and saving of content objects. The relative frequency of content objects saved in personal fuzzy content networks by experts or communities of experts may be used to also infer expert preferences. These inferences may be derived directly from saved content objects, but also from affinities the saved content objects have with other content objects or topic objects.

The physical location and duration of remaining in a location of sub-community users, as determined by, for example, a global positioning system or any other positionally aware system or device associated with users or sets of users, may be used to infer preferences of the user sub-community.

Personal Preference Inferences

Users may subscribe to selected topics, for the purposes of, for example, e-mail updates on these topics. The topic objects subscribed to by the user may be used to infer personal preferences. Users may also create their own personalized fuzzy content networks through selection and saving of content objects. The relative frequency of content objects saved in personal fuzzy content networks by the user may be used to infer the individual's personal preferences. These inferences may be derived directly from saved content objects, but also from affinities the saved content objects have with other content objects or topic objects. Users may directly rate content objects when they are accessed, and in such embodiments, personal preferences may also be inferred through these ratings of individual content objects.

The ratings may apply against both the information referenced by the content object, as well as any of the associated meta-information, such as an expert review of the information referenced by the content object. A personal history of paths of content objects viewed may be stored. This personal history may be used to infer user preferences, as well as tuning adaptive recommendations and suggestions by avoiding recommending or suggesting content objects that have already been recently viewed by the individual. The duration of access or interaction with topic or content objects by the user may be used to infer preferences of the user.

The physical location and duration of remaining in a location of the user as determined by, for example, a global positioning system or any other positionally aware system or device associated with the user, may be used to infer preferences of the user.

Adaptive Recommendations and Suggestions

Adaptive recommendations in fuzzy content networks combine inferences from user community behaviors and preferences, inferences of sub-community or expert behaviors and preferences, and inferences of personal user behaviors and preferences as discussed above, to present to a fuzzy network user or set of users one or more fuzzy network subsets (one or more objects and associated relationships) that users may find particularly interesting given the user's current navigational context. These sources of information, all of which are external to the referenced information within specific content objects, may be augmented by search algorithms that use text matching or statistical pattern matching or learning algorithms to provide information on the likely themes of the information embedded or pointed to by individual content objects.

Figure 41:
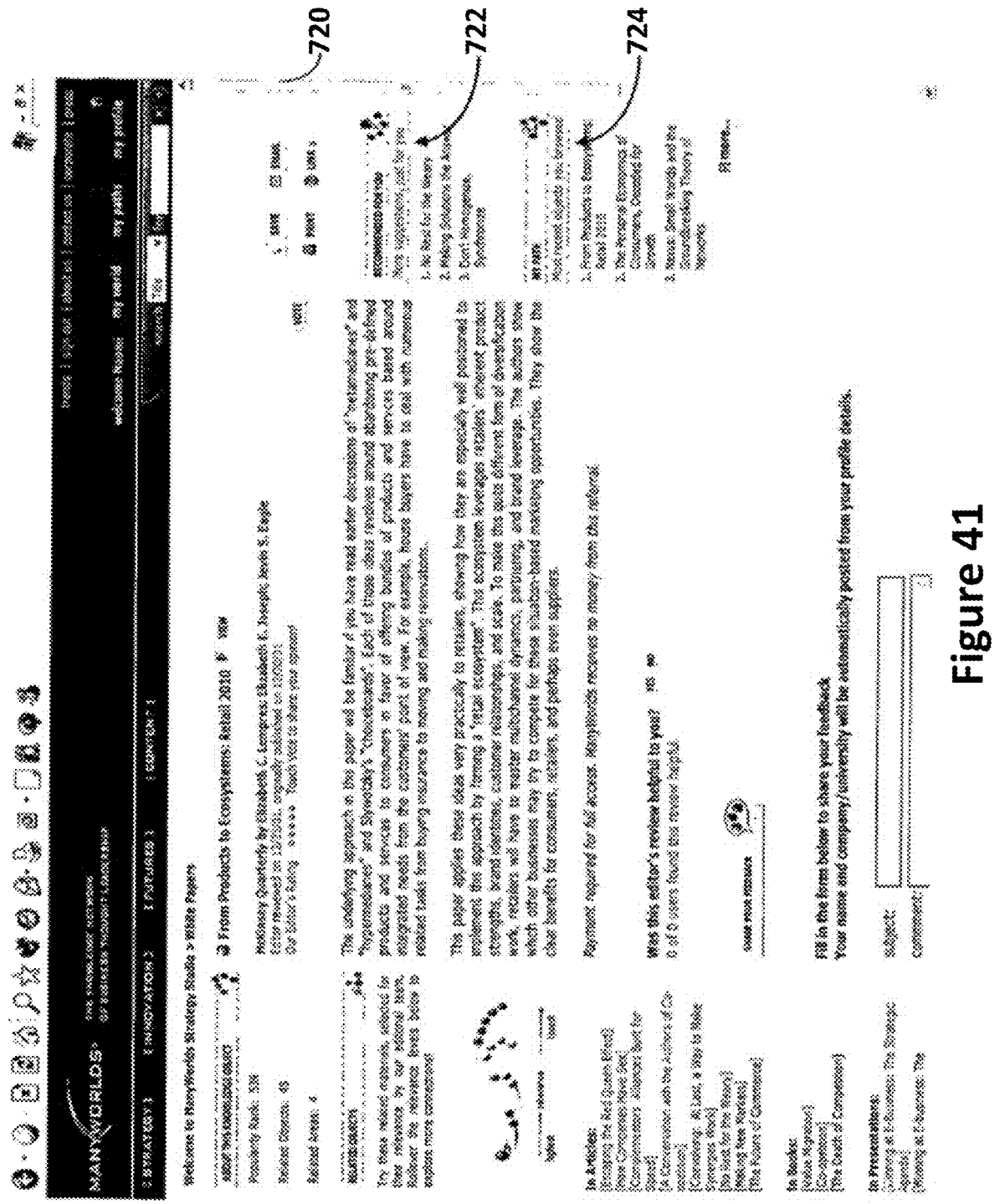
FIG. 41 is a screen image of the Epiture adaptive recommendations function, according to some embodiments.

The navigational context for a recommendation may be at any stage of navigation of a fuzzy network (e.g., during viewing a particular content object) or may be at a time when the recommendation recipient is not engaged in directly navigating the fuzzy network. In fact, the recommendation recipient need never have explicitly used the fuzzy network associated with the recommendation. As an example, FIG. 41 depicts in-context, displayed adaptive recommendations associated with the Epiture system.

Some inferences will be weighted as more important than other inferences in generating a recommendation, and theses weightings may vary over time, and across recommendation recipients, whether individual recipients or sub-community recipients. For example, characteristics of content and topics explicitly stored by a user in a personal fuzzy network would typically be a particularly strong indication of preference as storing network subsets requires explicit action by a user. In most recommendation algorithms, this information will therefore be more influential in driving adaptive recommendations than, say, general community traffic patterns in the fuzzy network.

The recommendation algorithm may particularly try to avoid recommending to a user content that the user is already familiar with. For example, if the user has already stored a content object in a personal fuzzy network, then the content object might be a very low ranking candidate for recommending to the user. Likewise, if the user has recently already viewed the associated content object (regardless of whether it was saved to his personal fuzzy network), then the content object would typically rank low for inclusion in a set of recommended content objects. This may be further tuned through inferences with regard to the duration that an associated content object was viewed (for example, it may be inferred that a lengthy viewing of a content object is indicative of increased levels of familiarity.

The algorithms for integrating the inferences may be tuned or adjusted by the individual user. The tuning may occur as adaptive recommendations are provided to the user, by allowing the user to explicitly rate the adaptive recommendations. The user may also set explicit recommendation tuning controls to tune the adaptive recommendations to her particular preferences. For example, a user might guide the recommendation function to place more relative weight on inferences of expert or other user communities' preferences versus inferences of the user's own personal preferences. This might be particularly true if the user was relatively inexperienced in the particular domain of knowledge. As the user's experience grew, he might adjust the weighting toward inferences of the user's personal preferences versus inferences of expert preferences.

Fuzzy network usage metrics described above such as popularity, connectedness, and influence may be employed by the recommendation algorithm as convenient summaries of community, sub-community and individual user behavior with regard to the fuzzy network. These metrics may be used individually or collectively by the recommendation algorithm in determining the recommended network subset or subsets to present to the recommendation recipient.

Adaptive recommendations which are fuzzy network subsets may be displayed in variety of ways to the user. They may be displayed as a list of content objects (where the list may be null or a single content object), they may include content topic objects, and they may display a varying degree of meta-information associated with the content objects and/or topic objects. Adaptive recommendations may be delivered through a web browser interface, through e-mail, through instant messaging, through XML-based feeds, RSS, or any other approach in which the user visually or acoustically interprets the adaptive recommendations. The recommended fuzzy network subset may be displayed graphically. The graphical display may provide enhanced information that may include depicting linkages among objects, including the degree of relationship, among the objects of the recommended fuzzy network subset, and may optionally indicate through such means of size of displayed object or color of displayed object, designate usage characteristics such as popularity of influence associated with content objects and topic objects in the recommended network subset. Adaptive recommendations may be delivered for interpretation of users by other than visual senses; for example, the recommendation may be delivered acoustically, typically through oral messaging.

The recommended structural subsets 280, combinations of topic objects, content objects, and associated relationships, may constitute most or even all of the user interface, which may be presented to a system user on a periodic or continuous basis. Such embodiments correspond to embodiment variations of 2130, 2140, 2150 and 2160 of the framework 2000 in FIG. 42, below.

In addition to the recommended fuzzy network subset, the recommendation recipient may be able to access information to help gain an understanding from the system why the particular fuzzy network subset was selected as the recommendation to be presented to the user. The reasoning may be fully presented to the recommendation recipient as desired by the recommendation recipient, or it may be presented through a series of interactive queries and associated answers, as a recommendation recipient desires more detail. The reasoning may be presented through display of the logic of the recommendation algorithm. A natural language (such as English) interface may be employed to enable the reasoning displayed to the user to be as explanatory and human-like as possible.

In addition to adaptive recommendations of fuzzy network subsets, adaptive recommendations of some set of users of the fuzzy network may be determined and displayed to recommendation recipients, typically assuming either implicit or explicit permission is granted by such users that might be recommended to other users. The recommendation algorithm may match preferences of other users of the fuzzy network with the current user. The preference matches may include the characteristics of fuzzy network subsets stored by users or other fuzzy network referencing, their topic subscriptions and self-profiling, their collaborative patterns, their direct feedback patterns, their physical location patterns, their fuzzy network navigational and access patterns, and related temporal cues associated with these usage patterns. Information about the recommended set of users may be displayed to a user. This information may include names, as well as other relevant information such as affiliated organizations and contact information. It may also include fuzzy network usage behavioral information, such as, for example, common topics subscribed to, common physical locations, etc. As in the case of fuzzy network subset adaptive recommendations, the adaptive recommendations of other users may be tuned by an individual user through interactive feedback with the system.

Adaptability/Extensibility Framework

FIG. 42 depicts an adaptability/extensibility framework 2000 used to distinguish the adaptive system 100 and the adaptive recombinant system 800 from the prior art, described herein as an "identified system." The framework 2000 is a two-dimensional representation comprising a vertical dimension 2002 and a horizontal dimension 2004, each dimension having four categories. The vertical dimension 2002 of the framework 2000 indicates the "degree of adaptiveness" of the identified system. The "degree of adaptiveness" is the degree to which the identified system is adaptive to individual users or to communities of users of the system.

The vertical dimension 2002 includes four categories across a range, the first category being least adaptive and the fourth category being the most adaptive. The categories are: non-adaptive (does not dynamically customize); displays adaptive recommendations 250 (where "displays" includes not only visual delivery of adaptive recommendations, but delivery in other modes, such as audio); provides adaptive recommendations 250 that update structure or content (where the structure and/or content of the system are dynamically updated); and provides a continuous, fully adaptive interface. The adaptive system 100 and the adaptive recombinant system 800 are capable of all degrees of adaptiveness depicted in the framework 2000, including providing a continuous, fully adaptive interface.

The horizontal dimension 2004 of the framework 2000 represents the degree of extensibility of the identified system. The "degree of extensibility" or "degree of portability" denotes the ability to "syndicate" the system 100 or subsets of the system 100, as well as the ability to create combinations of systems. Syndication, as used herein, describes ability to share systems or portions of systems, which may include actual transfer of the system structural and content aspects across computer and communications network hardware, or may describe the virtual transfer of a system on a particular set of computer hardware. Recall that a structural subset 280 is a portion of the structural aspect 210 of a system, including one or more objects 212 and their associated relationships 214, which may be replicated (see FIG. 4). Structural subsets may be syndicated by the adaptive recombinant system 800.

The horizontal dimension 2004 includes four categories across a range, the first category being least extensible and the fourth category being the most extensible. The categories are: no syndication (the identified system has no ability to share content); individual content syndication (individual items of content within the identified system can be shared); structural subset syndication (structural subsets of the identified system can be shared); and recombinant structures syndication (structural subsets of the identified system can be shared and combined to create new systems). The adaptive recombinant system 800 is capable of all degrees of extensibility depicted in the framework 2000, including the most portable feature, recombinant structures syndication.

The framework 2000 is divided into sixteen numbered blocks, arranged according to their relationship to the horizontal dimension 2002 (degree of adaptiveness) and the vertical dimension 2004 (degree of extensibility). The majority of prior art systems are confined to the lower left portion of the framework 2000. For example, most prior art system are non-adaptive and include no syndication capabilities (block 2010). Current computer operating systems (e.g. Microsoft XP™), business productivity applications (e.g., Microsoft Office™), enterprise applications (e.g., SAP), and search utilities (e.g., Google®) are associated with block 2010 of the framework 2000.

Some prior art systems syndicate items of content or sets of content files. These may be based on a central syndication clearinghouse (e.g., Napster), or may be more purely peer-to-peer in operation (e.g., Gnutella). Such systems are associated with block 2020 of the framework 2000.

Other prior art systems provide users with merchandise recommendations based on their buying habits, as well as the buying habits of customers who have purchased common merchandise (e.g., Amazon.com®). However, these systems do not truly deliver adaptive recommendations as defined herein, whether by displaying adaptive recommendations 250 (block 2050), updating structure or content (block 2090) or providing a continuous, fully adaptive interface (block 2130). This is because, among other reasons, the scope of the usage behaviors tracked by such prior art systems is limited to purchasing and associated behaviors.

In contrast, for the adaptive system 100 and the adaptive recombinant system 800, more generalized system usage behaviors 247 are tracked and used to deliver adaptive recommendations 250 to the user 200 and to the adaptive (recombinant) system itself. Thus, prior art systems such as Amazon.com are deemed non-adaptive (block 2010) in the framework 2000. Blocks 2010 and 2020 of the framework 2000 thus represent the extent of prior art system capabilities with regard to system adaptation (vertical dimension 2002) and portability (horizontal dimension 2004).

In contrast, the adaptive recombinant system 800 includes the adaptability and portability associated with the remaining blocks of the framework 2000. For example, the adaptive recombinant system 800 is capable of syndicating non-adaptive structural subsets 280 of the system 800 (block 2030), as well as syndicating non-adaptive recombinant structures (block 2040). Thus, the adaptive recombinant system 800 exhibits a high degree of extensibility, fully covering the horizontal dimension 2004 of the framework 2000.

The vertical dimension 2002 is likewise embodied both by the adaptive system 100 and the adaptive recombinant system 800. While the adaptive system 100 displays adaptive recommendations 250 where no syndication occurs (block 2050), the adaptive recombinant system 800 further displays adaptive recommendations 250 where individual content is syndicated (block 2060), where structural subsets 280 are syndicated (block 2070) and where recombinant structures are syndicated (block 2080).

Moving up the vertical dimension 2002, the adaptive system 100 provides adaptive recommendations 250 that update the structural aspect 210 and/or the content aspect 230 of the system where there is no syndication (block 2090), and the adaptive recombinant system 800 provides adaptive recommendations that update the structural or content aspects where individual content is syndicated (block 2100), where structural subsets 280 are syndicated (block 2110), and where recombinant structures are syndicated (block 2120).

Finally, the adaptive recombinant system 800 provides a continuous, fully adaptive interface for all four categories of syndication (blocks 2130, 2140, 2150, and 2160) while the adaptive system 100 does so where there is no syndication (block 2130). Thus, the adaptive system 100 and the adaptive recombinant system 800 provide various degrees of adaptiveness and extensibility, as represented in the framework 2000.

Sample Recommendations Function and Algorithm

In this example, two types of adaptive recommendations are delivered to the user. The adaptive recommendations are calculated by a set of algorithms based on the systems objects being currently navigated, the relationships of the currently accessed object, the user's navigation path, profile preferences, community membership and level of relevance depending on context and the user's personal library of referenced objects. Recall that a 'user' may refer to not only humans, but to another system or adaptive network. In other words, two or more adaptive systems may be "users" of each other.

Two types of adaptive recommendations based on a fuzzy content network structure are described in Table 4. One skilled in the art may apply other variations of adaptive recommendations and associated algorithms.

TABLE 4

Two Recommendations Algorithms

| Type | Delivery | characteristics |
|---|---|---|
| in-context (suggestions) | when user is accessing or interacting, accessing, or updating content object | may be delivered in real-time available in display pages for retrieval/editing may be optimized for responsiveness and "fast" learning of user preferences |
| out-of-context (recommendations) | no explicit access of content object by user | inferences may be updated in real time or periodically available in display pages for retrieval may be optimized for accuracy and |

The first adaptive recommendations type, in-context recommendations, or suggestions, are delivered to the user when the user is interacting, accessing, or updating a content object. In-context recommendations may be delivered in real time, may be displayed for retrieval and editing, and may be optimized for responsiveness and the "fast" learning of the user's preferences.

Figure 43:
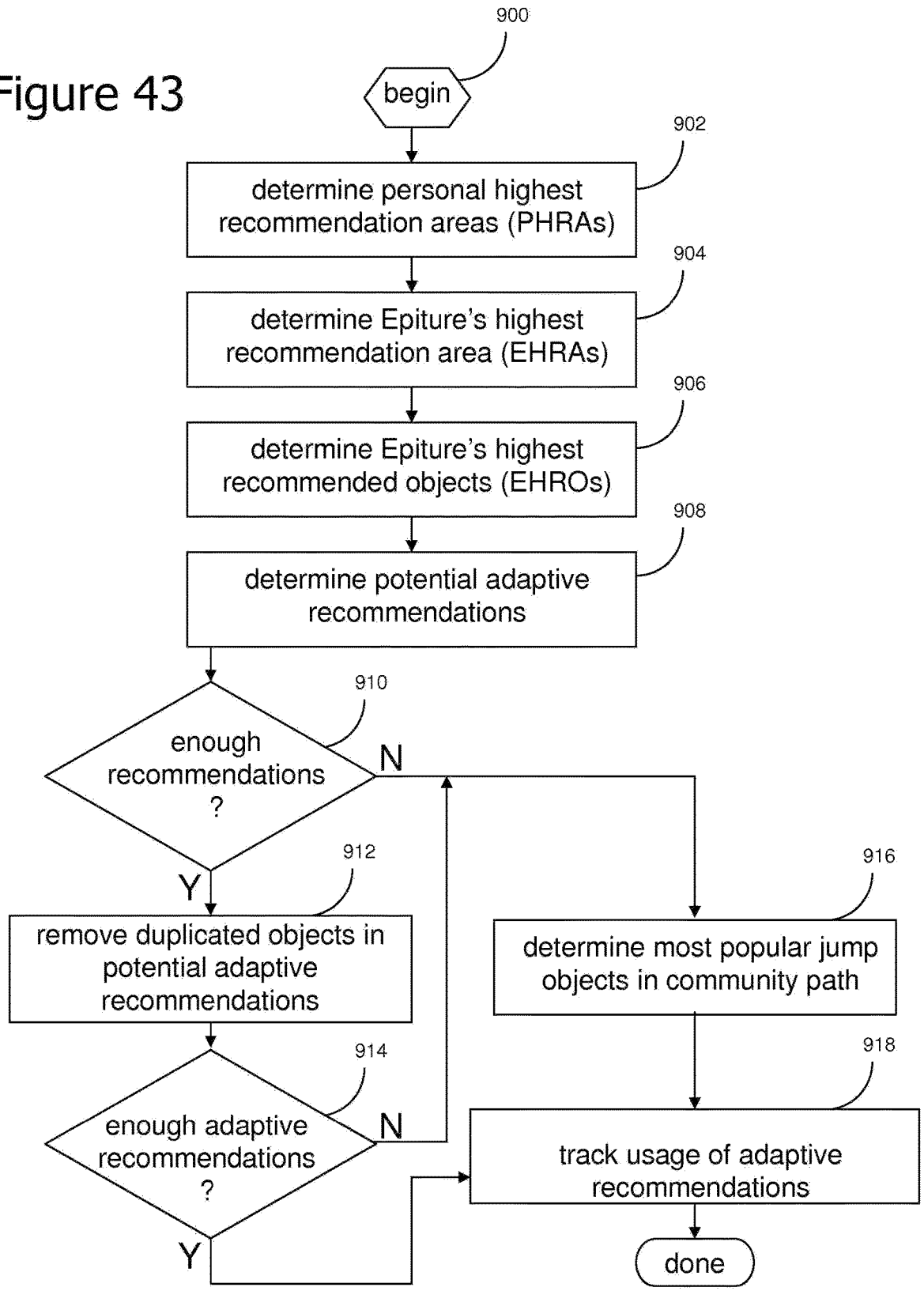
FIG. 43 is a flow diagram of the adaptive recommendations function of the Epiture software system, according to some embodiments.

The second adaptive recommendations type, out-of-context recommendations, is a "push" recommendation approach. Based on inferences about the user's preferences, the network is aligned to adapt to the preferences. The out-of-context recommendations thus "surprise" the user with recommendations of relevant objects of interest without specific explicit context from the user. Relevant characteristics for out-of-context recommendations include the real-time or periodic updating of inferences and the ability to provide adaptive recommendations in display pages or via other modes of communication for retrieval. Further the out-of-context recommendations algorithm may be optimized for accuracy and understanding of user preferences Adaptive Recommendations Function Example FIG. 43 is a flow diagram depicting the operation of an adaptive recommendations function 900 used in the Epiture software system, according to some embodiments. The Epiture software system is one implementation of an adaptive recombinant system, such as the system 800 depicted in FIG. 18. The network described in this example is a fuzzy content network. Recall that the adaptive recommendations function includes algorithms for generating adaptive recommendations to a user in the form of structural subsets 280.

The following data is used by the adaptive recommendations function 900 in generating recommendations:
1) the communities that a user is a member of
2) relationships between those communities and user's preferences (including temporal dimensions that may indicate strengthened or weakened interest in those communities)
3) a user's or other pre-defined system explicit preference of those communities in this context (e g, business rules for a process, novice vs advanced users),
4) the user's personal topics (where objects of high relevance have been 'saved' for future explorations) and the relationships between those topics
5) the content in those topics and their interrelations, or personal highest recommendation objects.

The adaptive recommendations function 900 begins by determining personal highest recommendation areas, or PHRAs of the user (block 902). PHRAs are generated by determining the highest relevance sums of co-topic-community relationships. To illustrate this step, Table 5 includes an abbreviated matrix of topics and communities on one axis versus content objects and topic objects on the other matrix, with numerical relationships between the two axes.

TABLE 5

Relationships between objects in fuzzy content network

|  | topic A | topic B | topic C | community X |
|---|---|---|---|---|
| object 1 (article) | 5 | 3 | 2 | 0 |
| object 2 (presentation) | 1 | 4 | — | 5 |
| object 3 (book) | 3 | 3 | 5 | 2 |
| topic A | — | 3 | — | 5 |
| total | 9 | 12 | 7 | 12 |

In this limited example, there are three topics, topic A, topic B, and topic C, and one community, community X, that have varying degrees of relationship (rated between 1 and 5) to other objects in the system: object 1 (an article), object 2 (a presentation), object 3 (a book), and topic A. Calculating the highest sum of relationships for the particular context (total row) results in the generation of PHRAs.

In Table 5, topic B and community X have the highest relationship sums thus two PHRAs are found in this example. This method will often generate many PHRAs, which sometimes may be too many to make useful suggestions from. For example, there may be a dozen or more PHRAs with the same value. In this case, the tie breakers are the data that informs on relationships between topics and communities.

For example, in Table 5, topic A has a strong relationship (5) to community X. Topic A itself has a high total score. Thus, the adaptive recommendations function 900 assigns a dynamic weighting to topic A's relevance to community X, to strengthen community X's result. In this case, if it was desirable to have only one PHRA, community X would be chosen. In some embodiments, the top 3-5 PHRAs are selected by the adaptive recommendations function 900.

Building on this procedure, the storing of the dynamic weightings generated in this process can be useful as an additional recommendation mechanism. This approach allows the adaptive recommendations function 900, at the end of processing, to compare which recommendation is actually selected by the user from the top suggestions generated. If there is a discrepancy or convergence, the weightings may be examined and used as a way to strengthen or weaken the relationships between topics, objects and communities for this user's particular context.

The adaptive recommendations function 900 also determines Epiture's highest recommendation area, or EHRA (block 904). Recall that, in the adaptive recombinant system 800, relationships between objects, topics and communities, may be made by experts. There may also be explicit business rules in the system to conform to, for example in the form of a business process. In addition, the relationship context may be delivered from another fuzzy content network or instance of the adaptive recombinant system, in particular when 'training' a new knowledge network or integrating existing networks. The Epiture software system includes these features in determining EHRAs.

A set of Epiture's highest recommendation areas (EHRA) may be generated by selecting related topics or communities with higher relevance values to the current object. The EHRAs are weighted appropriately to the situation, either by system rules, or by user preferences.

The adaptive recommendations function 900 also determines Epiture's highest recommended objects (block 906). Again, this step uses relationships already in existence in the system, either an average across all relationships and quality ratings, or tuned to select a particular set of relationship types or quality ratings. From these data, a set of Epiture's highest recommendation objects (EHRO) may be generated by selecting related content objects with higher relevance values (with relevance defined by context of both the object in question and system 'priorities') to the current object.

Although steps 902, 904, and 906 are presented in a particular order in FIG. 43, they may be implemented by the adaptive recommendations function 900 in a different order than the one shown. The adaptive recommendations function 900 next combines the PHRA. EHRA and EHRO data to determine what will be recommended to the user (block 908). Initially, if a set of objects score highly in both PHRA and EHRA, then they will be the objects recommended first. Depending on the amount of recommendation results that are prespecified by the adaptive recommendations function, this initial set of recommended objects may be sufficient.

If not, however, the adaptive recommendations function 900 determines whether it can find any objects in EHRO that also exist in the PHRA. If so, those results will be returned and the operation ends even though the selected objects are a second tier of the recommended objects. To ensure that the user realizes this, relevance weighting may be assigned, and graphically indicated if needed.

A third tier of recommended objects may be found by finding any objects in the EHRO that exist in the EHRA, using quality, relationships types and values and other attributes as guides for making the selection. If a sufficient set of recommendation objects have been found (the "yes" prong of block 910), the adaptive recommendations function 900 removes duplicated objects in the potential recommendations determined thus far (block 908). This step is particularly relevant where the users of the Epiture software system are human users who have been browsing the system for some time period. Such users generally do not wish to be recommended content they have already read, visited, or used. If the user has already visited some of the selected recommended objects within a predetermined time period, say, in the last 24 hours, or, if some of recommended objects are already in the user's personal topic library, the adaptive recommendations function 900 determines the object to b e unnecessary to recommend. Thus, such objects are removed from the recommendation object set.

Where objects removed in this manner cause the available adaptive recommendations to be insufficient or empty (the "no" prong of block 914), or where enough adaptive recommendations were not produced initially (the "no" prong of block 910), the adaptive recommendations function 900 proceeds to determine the most popular jump objects in the path of a community (block 916).

The adaptive recommendations function 900 examines the paths of other users who have browsed the object. Given criteria such as similar community membership to the current user, content quality rating and distribution, overall popularity, and other attributes, it is determined which objects to recommend based on prior usage. This fourth tier of recommendation objects (besides PHRAs, EHRAs, and EHROs) is designated as a second set of Epiture's highest recommended objects or EHRO2.

This step (block 916) may be helpful in the case of integrating two or more networks together. Since the relationship context and attributes of the objects in the network may be 'carried' over or ported into the new network, the objects may 'look' for their prior relationships and segment based on usage criteria. In addition, influence and other metrics and attribute patterns may be used to determine similarities between objects. Thus, the adaptive recommendations function 900 may connect objects which have not been in contact before, providing the user a targeted recommendation, and generating a relationship between those objects That newly formed relationship may cascade to affect other objects in the system such as communities and topics.

Finally, the adaptive recommendations function 900 may track usage of adaptive recommendations (block 918). As the embedded algorithms are optimized for speed and real-time performance for in-context recommendations, the 'understanding' and true relevance (as inferred from user usage behavior) of the adaptive recommendations may be processed later. As such, tracking the selection and usage of adaptive recommendations at this time may be beneficial. Criteria such as placement position on a list or other display mechanism, determined (estimated) relevance as predicted by the algorithm versus first selections by the user, and choice of object type (such as article, subject matter expert, multimedia, image etc), are just a few examples of how the adaptive recommendations function may self-monitor its performance. This performance analysis may ultimately generate better quality recommendations for the user, and be used in updating system structure such as EHRA inputs. Or, the system may be self-policing, in effect, making changes as usage data builds up.

It should be noted that the adaptive recommendations function 900 depicted in FIG. 43 is a simplified embodiment of the adaptive recommendations function 240, as one algorithm of possibly many is examined. Many complex variations of the recommendations algorithms may be implemented, in accordance with the descriptions of the adaptive system 100 of FIG. 1 and the adaptive recombinant system 800 of FIG. 18, above.

Further Example Embodiment Description

Figure 45:
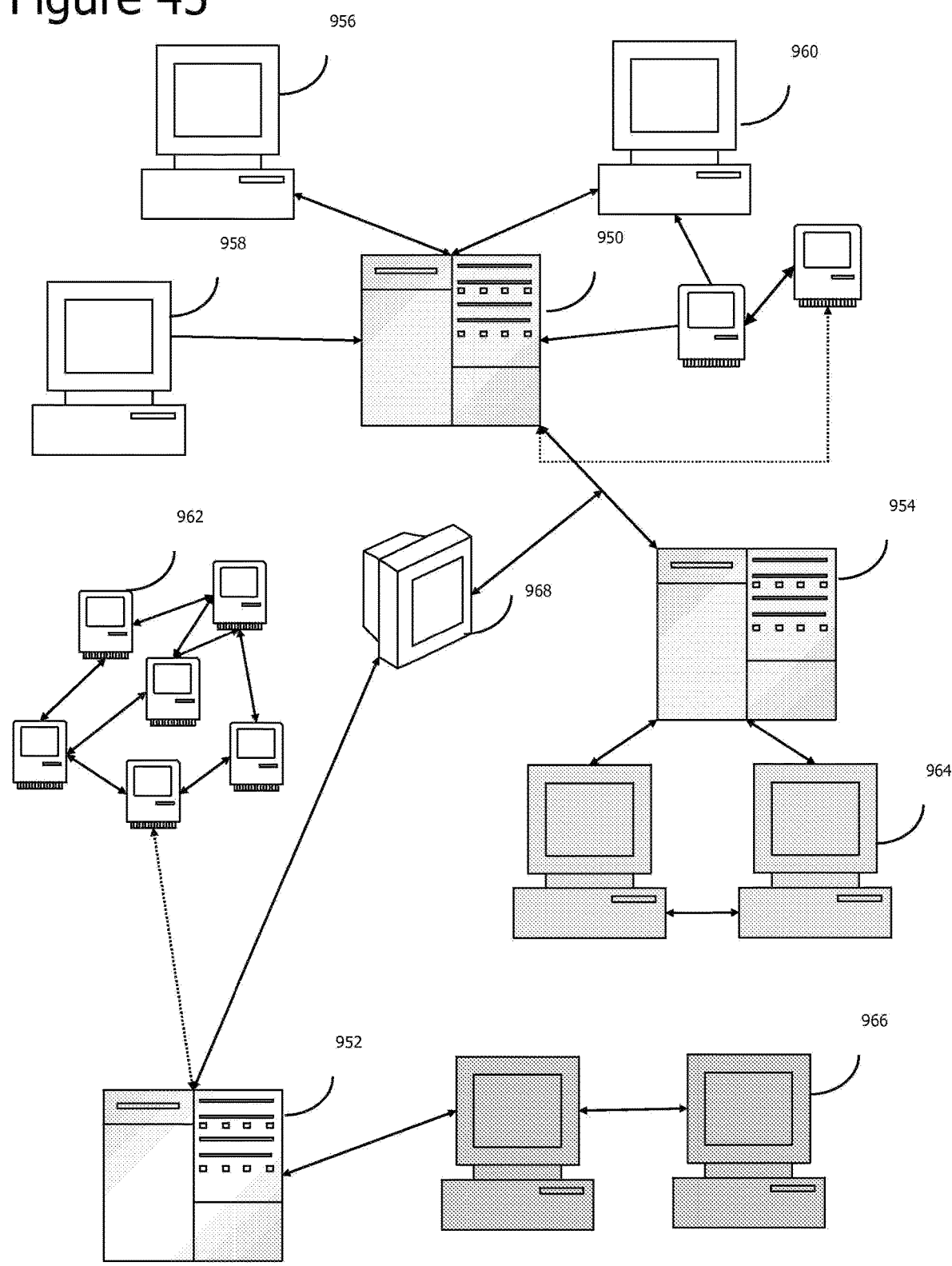
FIG. 45 is a diagram of various computing device topologies, according to some embodiments.

The screenshot 770 also depicts a user personal library function 714, denoted "My Personal Topics," for a particular user. A screenshot 720 in FIG. 45 illustrates the use of the adaptive recommendations function, as shown in a "Recommended For You" graphic 722, with a list of suggestions. A "My Path" graphic 724 also with a list, represents the path of objects the user has already browsed. The recommendations in 722 adapt as the user browses different objects.

In the screen mage 790 of FIG. 40, the 'MyPath' function represents the journey a user has made in the network during their session. The user may browse the list of objects that they have visited during a session. There are further options to save an object as part of their MyWorld personal library and also to remove an object from their path. The MyPath function way be useful to users in identifying areas of the network they have browsed before, and users may also elect to share a specific path or all paths with other users of system.

Path data can be used to strengthen adaptive recommendations on an automatic basis, while also contributing to input of an automatic or semi-automatic recommendation for the setup of a new community or new topical area.

Cumulative usage data may also be of interest to users of the system as illustrated in the screen image 780 of FIG. 39. Table 782 shows an example of usage patterns shown on a temporal bases to reflect amount of interest in certain topical areas. While human users of the system can be easily overwhelmed with the amount of statistical information generated by usage data of many different kinds, the screen image displays the information in a manner so as to express multifaceted data for input into its adaptive recommendation functions.

Automatic Fuzzy Content Network Maintenance

The adaptive recommendations function and related sets of algorithms, in conjunction with the fuzzy network maintenance functions, may be used to automatically or semi-automatically update and enhance the fuzzy content network. These functions may be employed to determine new affinities and the appropriate degree of relationship among fuzzy network objects in the fuzzy network as a whole, within personal fuzzy network subsets, or sub-community-specific fuzzy network subsets. The automatic updating may include potentially setting a relationship between any two objects to zero (effectively deleting a relationship link).

The recommendation function and fuzzy network maintenance functions may operate completely automatically, performing in the background and updating affinities independently of human intervention, or the function may be used by users or special experts who rely on the adaptive recommendations to provide guidance in maintaining the fuzzy network as a whole, or maintaining specific fuzzy network subsets.

In either an autonomous mode of operation, or in conjunction with human expertise, the recommendation function may be used to integrate new content or content objects into the fuzzy content network.

As in the case of adaptive recommendations that are delivered to recipients to enhance their ability to effectively navigate and use the system, adaptive recommendations that function to update the fuzzy content network include algorithms that make inferences from the usage behaviors of system users. These inferences may be at the community level, sub-community level, or individual user level. Usage behaviors that may be included in the inferencing include online information accesses, traffic patterns and click streams associated with navigating the system structure, including buying and selling behaviors; physical locational information associated with stationary or mobile use of the system; collaborative behaviors among system users or systems users and people outside the system, that include written and oral communications; referencing behaviors of system users—for example, the tagging of information for future reference; subscription and other self-profiling behavior of users; and direct feedback behaviors, such as the ratings or direct written feedback associated with objects or their attributes such as the objects' author, publisher, etc. The algorithms may also use information associated with temporal information associated with usage behaviors, including the duration of behaviors and the timing of the behaviors, where the behaviors may include those associated with reading or writing of written or graphical material, oral communications, including listening and talking, or duration of physical location of a system user.

In some embodiments, inferences regarding a plurality of usage behaviors may be used to adjust relationships and associated relationship values and indicators, as explained in the sample embodiment above. These fuzzy network structural modifications may be applied to multiple relationship types. Navigational access information may be used by the algorithms; that is, the relative level of traffic between two objects (each either a content object or a topic object) will influence the degree of relationship between the two objects. However, access information alone is likely to be insufficient for best results as navigation accesses are highly influenced by the current system structure, and therefore current structures would tend to be reinforced, limiting the level of adaptation. Therefore, other or additional behavioral information is preferentially used to overcome this bias. For example, duration of viewing objects typically provides a better indication of value of an object to a user than does just an object access, as does, for example, reference and reference organization cues, collaboration cues, and direct feedback. Therefore, this additional behavioral information may be used to adjust the strengths of relationships among objects.

As an example, where referenced or tagged information can be organized by users, the system may scan the referenced information and how it is organized, and the frequency of the organizational structures among users, to determine a preliminary degree of relationships in the system. This may be augmented by information associated with navigational accesses and the duration of the accesses.

Figure 44A:
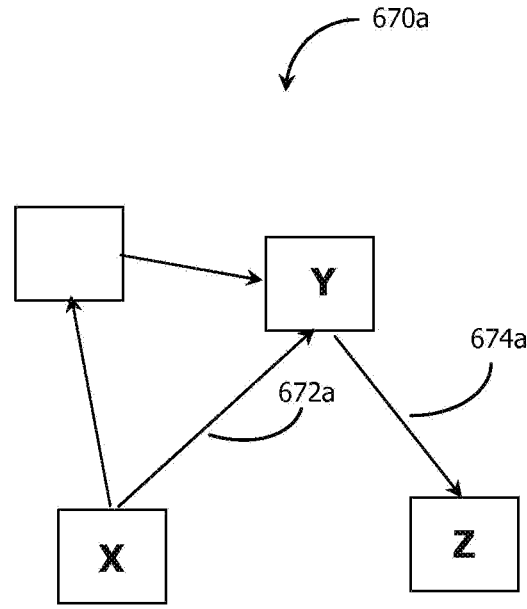
FIGS. 44A and 44B are block diagrams illustrating fuzzy network structural modifications through application of adaptive recommendation functions, according to some embodiments.
Figure 44B:
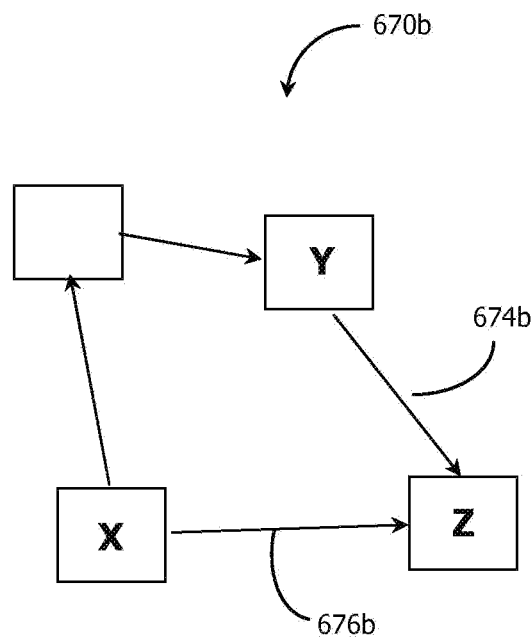

As a simplified example, FIG. 44A depicts a simple fuzzy network 670a before application of the recommendation function and associated fuzzy network maintenance functions. FIG. 44B depicts fuzzy network 670b, resulting from the application of the recommendation function and associated fuzzy network maintenance functions to fuzzy network 670a. (For the sake of simplicity, relationship indicators are not shown.)

The fuzzy network 670a may have a popular access path 672a from Node X to Node Y, which in turn has a popular access path 674a to Node Z. Assuming the existing relationships along that path are of similar strength, it might suggest, without any additional information, that these relationships should perhaps be strengthened due to the high popularity of the path. However, more usage behavioral information may suggest a different fuzzy network updating approach. For example, the duration of accesses of Node X and Node Z were generally significantly higher than for Node Y, a better structural update might be to increase, or establish, the relationship between Node X and Node Z, as is shown in the fuzzy network 670b. After application of an algorithm that incorporates the durational usage behavioral cues, a relationship 676b is established between Node X and Node Z. In addition, in this example, the former relationship 672a between Node X and Node Y is deleted (in practice, it might just be weakened in strength).

The structural transformation from fuzzy network 670a to 670b as shown would be even more reinforced if additional usage behavioral information supported reinforced the access durational-based inferences on preferences. For example, if Node X and Node Z were more frequently referenced by users than Node Y, and were organized such as to imply close affinity (for example, stored in the same personal topical area). This would be more confirming information to strengthen the relationship between Node X and Node Z, and to weaken or eliminate the relationship between Node X and Node Y.

The relationship updating algorithm may temper potential relationship updating, including adding new relationships, with global considerations related to optimal connections among network objects. For example, too few relationships, or relationships with insufficient spread of strength values tend to inhibit effective navigation, but on the other hand too many relationships also is not optimal. The algorithm may strive to maintain an optimal richness of relationships while updating the fuzzy content network based on usage characteristics. The algorithm may use preferential distributions based on fuzzy network metrics such as connectedness and influence to optimize the fuzzy network relationship topologies.

The recommendation function or related algorithms, in conjunction with the fuzzy content network maintenance functions, may also be extended to scan, evaluate, and determine fuzzy network subsets that have special characteristics. For example, the recommendation function or related algorithms may suggest that certain of the fuzzy network subsets that have been evaluated are candidates for special designation. This may include being a candidate for becoming a topical area. The recommendation function may suggest to human users or experts the fuzzy network subset that is suggested to become a topical area, along with existing topical areas that are deemed by the recommendation function to be "closest" in relationship to the new suggested topical area. A human user or expert may then be invited to add a topic, along with associated meta-information, and may manually create relationships between the new topic and existing topics. Statistical pattern matching or learning algorithms used to identify such fuzzy network subsets may include, but are not limited to, semantic network techniques, Bayesian analytical techniques, neural network-based techniques, k-nearest neighbor, support vector machine-based techniques, or other statistical analytical techniques.

The algorithms may apply fuzzy network usage behaviors, along with user community segmentations, to determine new topical areas. The algorithms may be augmented with global considerations related to optimal topologies of fuzzy network structures so as to deliver the most effective usability. For example, too many topics, or topics not sufficiently spread across the over domain of information or knowledge addressed by the system, tend to inhibit effective navigation and use. The algorithm may strive to maintain an optimal richness of topical areas. The algorithm may use preferential distributions based on fuzzy network metrics such as connectedness and influence to optimize the fuzzy network relationship topologies. This approach may also be employed in suggesting topical areas for deletion.

Or, the recommendation function or related algorithms, in conjunction with the fuzzy content network maintenance functions, may automatically generate the topic object and associated meta-information, and may automatically generate the relationships and relationship indicators and their values between the newly created topic object and other topic objects in the fuzzy network.

In some embodiments this capability may be extended such that the recommendation function or related algorithms, along with fuzzy network maintenance functions, automatically maintain the fuzzy network and identified fuzzy network subsets. The recommendation function may not only identify new topical areas, generate associated topic objects, associated relationships and relationship indicators among the new topic objects and existing topic objects, and the associated values of the relationships indicators, but also identify topic objects that are candidates for deletion, and in some embodiments may automatically delete the topic object and its associated relationships.

The adaptive recommendations function, in conjunction with the fuzzy network maintenance functions, may likewise identify content objects that are candidates for deletion, and may automatically delete the associated content objects and their associated relationships.

In this way the adaptive recommendations function or related algorithms, along with the fuzzy content network maintenance functions, may automatically adapt the structure of the fuzzy network itself on a periodic or continuous basis to enable the best possible experience for the fuzzy network's users.

As in network embodiments, when a new fuzzy content network is initialized, the adaptive recommendation function may also serve as a training mechanism for the new network. Given a distribution of content, relationships and relationships types, metrics and usage behaviors associated with scope, subject and other experiential data of other fuzzy content networks, a module of the adaptive recommendation function may automatically begin assimilation of content objects into a fuzzy content network, with intervention as required by humans. Clusters of newly assimilated content objects may enable inferences resulting in the suggestion of new topical objects and communities, and associated relationship types and indicators may also be automatically created and updated. This functionality of the adaptive recommendation engine may also be applied when two or more fuzzy content networks are brought together and require integration.

Each of the automatic steps listed above may be interactive with human users and experts as desired.

Social Network Analysis in Fuzzy Content Object Networks

Social network analysis may be conducted with adaptive recombinant system 800 in multiple ways. First, the representation of a person or people may be explicitly through content objects in the fuzzy content network. Special people-type content objects may be available, for example. Such a content object may have relevant meta-information such as an image of the person, and associated biography, affiliated organization, contact information, etc. The content object may be related to other content objects that the person or persons personally contributed to, topics that they have particular interest or expertise in, or any other system objects with which the person or persons have an affinity. Tracking information associated with access to these content objects by specific users, and/or user sub-communities may be determined as described above.

Furthermore, collaborative usage patterns may be used to understand direct communications interactions among persons, in addition to indirect interactions (e.g., interactions related to the content associated with a person). The physical location of people may be tracked, enabling an inference of in-person interactions, in addition to collaborations at a distance.

Second, specific people may be associated with specific content and topic objects—for example, the author of a particular content object. These people may or may not have explicit associated people-type content objects. Metrics related to the popularity, connectedness, and influence of a person's associated content may be calculated to provide measurement and insights associated with the underlying social network. The associations with content objects may be with a group of people rather than a single individual such as an author. For example, the metrics may be calculated for organizations affiliated with content objects. An example is the publisher of the associated content.

In either of the approaches described above, report-based and graphical-based formats may be used to display attributes of the underlying social network. These may include on-line or printed displays that illustrate how communities or sub-communities of users directly access a set of people (through the associated content objects), or indirectly through associated content affiliated with the set of people.

Adaptive Processes and Process Networks

The adaptive system 100 and the adaptive recombinant system 800 enable the effective implementation of computer-based or computer-assisted processes. Processes involve a sequence of activity steps or stages that may be explicitly defined, and such sequences are sometimes termed "workflow." These processes may involve structures that require, or encourage, a step or stage to be completed before the next step or stage may be conducted. Additional relevant details on process-based applications and implementations of adaptive networks is disclosed in U.S. Provisional Patent Application, No. 60/572,565, entitled "A Method and System for Adaptive Processes," which is incorporated herein by reference, as if set forth in its entirety.

A set of relationships and associated relationship indicators may be employed to designate process flows among objects in a fuzzy network, or fuzzy content network. The existence of a process relationship between object x and object y implies that x precedes y in a specified process. A process relationship may exist between object x and a plurality of other objects. In these embodiments, a user may have a choice of multiple process step options from an originating process step. The values of a plurality relationship indicators associated with the process relationships between an object and a plurality of objects may be different.

A plurality of process relationship indicators may be designated among the objects in a fuzzy content network, which enables objects to be organized in a plurality of processes.

Display functions enable a user to navigate through a fuzzy network or fuzzy network subset via objects that have process relations between them. At each process step, corresponding to accessing the corresponding object, the user may have the ability to navigate to other related objects, which can be advantageous in providing the user with relevant information to facilitate executing the corresponding process step.

Fuzzy processes may be organized into fuzzy sub-processes through selection of a subset of objects corresponding to a contiguous set of process steps, along with all other objects related to the process step objects, or more generally, as the set of all objects within a specified fractional degrees of separation from each of the process step objects.

New fuzzy processes may be generated by combining fuzzy process sub-networks into new fuzzy process networks using the fuzzy network union, intersection and other operators.

FIG. 45 depicts various hardware topologies that the adaptive system 100 or the adaptive recombinant system 800 may embody. Servers 950, 952, and 954 are shown, perhaps residing a different physical locations, and potentially belonging to different organizations or individuals. A standard PC workstation 956 is connected to the server in a contemporary fashion. In this instance, the systems 100 or 800 may reside on the server 950, but may be accessed by the workstation 956. A terminal or display-only device 958 and a workstation setup 960 are also shown. The PC workstation 956 may be connected to a portable processing device (not shown), such as a mobile telephony device, which may be a mobile phone or a personal digital assistant (PDA). The mobile telephony device or PDA may, in turn, be connected to another wireless device such as a telephone or a GPS receiver.

FIG. 45 also features a network of wireless or other portable devices 962. The adaptive system 100 or the adaptive recombinant system 800 may reside, in part or as a whole, on all of the devices 962, periodically or continuously communicating with the central server 952, as required. A workstation 964 connected in a peer-to-peer fashion with a plurality of other computers is also shown. In this computing topology, the systems 100 or 800, as a whole or in part, may reside on each of the peer computers 964.

Computing system 966 represents a PC or other computing system which connects through a gateway or other host in order to access the server 952 on which the systems 100 or 800 reside. An appliance 968, includes software "hardwired" into a physical device, or may utilize software running on another system that does not itself host the systems 100 or 800. The appliance 968 is able to access a computing system that hosts an instance of the system 100 or 800, such as the server 952, and is able to interact with the instance of the system 100 or 800.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. An apparatus, comprising:
at least one storage device configured to store:
two or more objects to represent two or more users, respectively;
a usage aspect reflecting a clustering of use and associated usage behaviors of the two or more users interacting with an adaptive system; and
a structural aspect denoting a collection of system objects that are part of the adaptive system, wherein the system objects include one or more computer applications, executable code, or one or more references to the one or more computer applications; and
wherein the adaptive system includes a recommendation function including at least one algorithm usable to generate a recommendation following an update to the structural aspect, wherein the update is based, at least in part, on captured usage information collected by tracking user interactions with the adaptive system;
wherein the apparatus further comprises a processor configured to execute the at least one algorithm, and wherein the at least one algorithm includes:
a preference inferring algorithm to infer preferences based at least in part on the captured usage information, wherein the recommendation is generated based at least in part on the inferred preferences, or
a recommendation optimization algorithm using statistical pattern matching of words, phrases or representations, in written, audio, or pictorial format, within content accessible to the adaptive system, wherein the recommendation is generated based at least in part on a result of the statistical pattern matching.

2. The apparatus of claim 1, wherein at least one of the usage behaviors is associated with either a user of the two or more users, one or more user communities, or the user and one or more user communities simultaneously, wherein the user comprises a single-member subset of the two or more users and a community of the one or more user communities comprises a multiple-member subset of the two or more users.

3. The apparatus of claim 1, further comprising a function to generate a social network representation, wherein the social network representation comprises a plurality of users of the two or more users and at least one affinity between different objects of the two or more objects.

4. The apparatus of claim 1, further comprising a function to determine the at least one affinity, the function to determine the affinity comprising:
means to apply usage behavior categories, wherein the usage behavior categories are selected from a group consisting of navigation and access patterns, collaborative patterns, direct feedback patterns, subscription patterns, self-profiling patterns, reference patterns, physical location patterns, and usage temporal patterns.

5. The apparatus of claim 1, further comprising:
a structural aspect comprising a fuzzy network structure, wherein the fuzzy network structure comprises a plurality of objects of the two or more objects, wherein the plurality of objects have one or more relationships types, and one or more relationships associated with each relationship type, each relationship being unidirectional or bidirectional, and each direction of each relationship has an associated relationship indicator, wherein the relationship indicators associated with each direction are not necessarily the same magnitude.

6. The apparatus of claim 5, further comprising a relationship representing a process sequence between a first object and a second object of the plurality of objects.

7. The apparatus of claim 6, further comprising a function to combine a plurality of process networks.

8. The apparatus of claim 1, wherein at least one usage behavior of the associated usage behaviors is associated with a user of the two or more users tagging an object of the two or more objects.

9. The apparatus of claim 8, further comprising a function that automatically modifies the structural element to:
generate a new relationship,
modify an existing relationship, delete an existing relationship, add an object to the two or more objects,
modify an object of the two or more objects, or
delete an object of the two or more objects.

10. The apparatus of claim 1, wherein the recommendation function is usable to generate a recommendation in response to a request by a user of the two or more users.

11. A method, comprising:
accessing, using a processing device, at least one storage device configured to store:
two or more objects to represent two or more users, respectively;
a usage aspect reflecting a clustering of use and associated usage behaviors of the two or more users interacting with an adaptive system; and
a structural aspect denoting a collection of system objects that are part of the adaptive system, wherein the system objects include one or more computer applications, executable code, or one or more references to the one or more computer applications;
updating the structural aspect of the adaptive system based, at least in part, on captured usage information collected by tracking user interactions with the adaptive system; and
wherein the adaptive system includes a recommendation function including at least one algorithm usable to generate a recommendation following said updating the structural aspect;
wherein the processing device is configured to execute the at least one algorithm, and wherein the at least one algorithm includes:
a preference inferring algorithm to infer preferences based at least in part on the captured usage information, wherein the recommendation is generated based at least in part on the inferred preferences, or
a recommendation optimization algorithm using statistical pattern matching of words, phrases or representations, in written, audio, or pictorial format, within content accessible to the adaptive system, wherein the recommendation is generated based at least in part on a result of the statistical pattern matching.

12. The method of claim 11, further comprising:
inferring the associated usage behavioral patterns based, at least in part, on changes in the physical location of a user of the two or more users.

13. The method of claim 11, further comprising:
inferring the associated usage behavioral patterns based, at least in part, on a duration a user of the two or more users remains at a physical location.

14. The method of claim 13, further comprising:
automatically determining the physical location that is associated with the at least one user by applying a global positioning system.

15. The method of claim 11, wherein the two or more users include a first user and a second user, and the method further comprises:
inferring the associated usage behavioral patterns based, at least in part, on a physical proximity of the first user to the second user.

16. The method of claim 11, further comprising:
inferring the associated usage behavioral patterns based, at least on part, on a proximity of a user of the two or more users to a physical object.

17. The method of claim 11, wherein the generated recommendation includes at least one content object comprising an advertisement.

18. The method of claim 17, further comprising:
delivering the at least one content object comprising the advertisement to a mobile device associated with a user of the two or more users.

19. The method of claim 18, further comprising:
recursively updating the structural aspect of the adaptive system based at least in part on tracking user interactions with the at least one content object comprising the advertisement.

* * * * *